(12) United States Patent
Place et al.

(10) Patent No.: US 7,067,145 B2
(45) Date of Patent: *Jun. 27, 2006

(54) USE OF ARACHIDONIC ACID FOR ENHANCED CULTURING OF FISH LARVAE AND BROODSTOCK

(75) Inventors: Allen R. Place, Baltimore, MD (US); Moti Harel, Baltimore, MD (US)

(73) Assignee: University of Maryland Biotechnology Institute, Baltimore, MD (US)

( * ) Notice: Subject to any disclaimer, the term of this patent is extended or adjusted under 35 U.S.C. 154(b) by 687 days.

This patent is subject to a terminal disclaimer.

(21) Appl. No.: 09/949,104

(22) Filed: Sep. 7, 2001

(65) Prior Publication Data

US 2002/0110582 A1 Aug. 15, 2002

Related U.S. Application Data

(60) Provisional application No. 60/230,802, filed on Sep. 7, 2000.

(51) Int. Cl.
*A61K 47/00* (2006.01)

(52) U.S. Cl. .................. 424/439; 424/442; 424/489; 424/498; 424/520; 424/523; 426/1; 426/2; 426/72; 426/805

(58) Field of Classification Search .............. 424/442, 424/520, 523; 426/489, 498, 1, 2, 72, 805
See application file for complete search history.

(56) References Cited

U.S. PATENT DOCUMENTS

| | | | |
|---|---|---|---|
| 5,539,133 A | 7/1996 | Kohn et al. | |
| 5,583,019 A | 12/1996 | Barclay | |
| 6,261,590 B1 * | 7/2001 | Place et al. | 424/442 |
| 6,372,460 B1 * | 4/2002 | Gladue et al. | 435/134 |

FOREIGN PATENT DOCUMENTS

| | | |
|---|---|---|
| WO | WO 99/06585 | 2/1999 |
| WO | WO 99/65327 | 12/1999 |

OTHER PUBLICATIONS

Abou–Samra, A. B., Catt, k.J., and Aguilera, G. 1986. Role of arachidonic acid in the regulation of adrenocorticotropin release from rat anterior pituitary cell cultures. Endocrinology 119:1427–1431.

Ainsworth, A. J., Dexiang, C. and Waterstrat, P. R. 1991. High physiological concentrations of cortisol in vivo can initiate phagocyte suppression. J. Aquat. Anim. Health 3:41–47.

Anderson, D. P. 1992. Immunostimulants, adjuvants and vaccine carriers in fish: applications to aquaculture. Annu. Rev. Fish Dis. 2:281–307.

Ando, H., Hasegawa, M., Ando, J. and Urano, A. 1999. Expression of salmon corticotropin–releasing hormone precursor gene in the preoptic nucleus in stressed rainbow trout. Gen. Comp. Endocrinol. 113:87–95.

Andrews, J. H. and Harris, R. F. 1986. r–and K–selection in microbial ecology. Adv. Microb. Ecol. 9:99–147.

Balm, P. H. M. 1997. Immune–endocrine interactions. In: Fish Stress and Health in Aquaculture vol. 62, pp. 195–221. Edited by G. K. Iwama, A. D. Pickering, J. P. Sumpter and C. B. Schreck. Cambridge University Press, Cambridge, UK.

Barry, T. P., Malison, J. A., Held, J. A. and Parrish, J.J. 1995. Ontogeny of the cortisol stress response in larval rainbow trout. Gen. Endocricol. 97:57–65.

Barton, B. A. and Iwama, G. K. 1991. Physiological changes in fish from stress in aquaculture with emphasis on the response and effects of corticosteroids. Annu. Rev. Fish Dis. 1:3–26.

Bell, S. J., Chavali, S., Bistrian, B. R., Connolly, C. A., Utsunomiya, T. and Forse, R. A. 1996. Dietary fish oil and cytokine and eicosanoid production during human immunodeficiency virus infection. JPEN J Parenter Enteral Nutr 20:43–9.

Bernardini, R., Calogero, A. E., Mauceri, G. and Chrousos, G. P. 1990. Rat hypothalamic corticotropin–releasing hormone secrition in vitro is stimulated by interleukin–1 in an eicosanoid–dependent manner. Life Sci. 47:1601–1607.

Bernardini, R., Chiarenza, A., Calogero, A. E., Gold, P. W. and Chrousos, G. P. 1989. Arachidonic acid metabolites modulate rat hypothalamic corticotropin–releasing hormone secrition in vitro.

Blazer, V. S. 1992. Nutrition and disease resistance in fish. Annu. Rev. Fish Dis. 2:309–323.

(Continued)

*Primary Examiner*—Gary Kunz
*Assistant Examiner*—Ernst V. Arnold
(74) *Attorney, Agent, or Firm*—Marianne Fuierer; Tristan A. Fuierer; Steven J. Hultquist

(57) ABSTRACT

A method of enhancing a culturing characteristic of fish larvae, including administering to said larvae in a nutritional diet essential fatty acids including DHA and AA in a ratio effective to enhance the culturing characteristic of such fish larvae relative to a corresponding nutritional diet lacking DHA and AA. The culturing characteristic may be at least one of stress resistance, immunoresistance, hatching rate, and growth rate. In a preferred aspect, the DHA and AA together comprise from about 10 to about 30% of total fatty acids in enrichment lipids, and the dietary ratio of DHA: AA is less than 10. The invention also contemplates a method of operating an aquaculture facility, including growing heterotrophic algae and/or fungi in a fermentor under growth conditions therefor, to produce a heterotrophic cellular product containing DHA and AA, and feeding the heterotrophic cellular product and/or one or more components thereof to (i) fish larvae and/or broodstock in the aquaculture facility, or (ii) live food subsequently fed to such fish larvae.

16 Claims, 12 Drawing Sheets

OTHER PUBLICATIONS

Buschbeck, M., Ghomahschi, F., Gelb, M. H., Watson, S. P. and Borsch–Haubold, A. G. 1999. Stress stimuli increase calcium–induced arachidonic acid release through phosphorylation of cytosolic phospholipase A2. Biochem. J. 344:359–366.

Calder, P. C. 1998. Immunoregulatory and anti–infammatory effects of n–3 polyunsaturated fatty acids, Braz. J. Med. Biol. Res. 31:467–490.

Calder, P. C., Bond, J. A., Harvey, D. J., Gordon, S. and Newsholme, E. A. 1990. Uptake and incorporation of saturated and unsaturated fatty acids into macrophage lipids and their effect upon macrophage adhesion and phagocytosis. Biochem. J. 269:807–14.

Cambronero, J. C., Rivas, F. J., Borrel, J. and Guaza, C. 1992. Role of arachidonic acid metabolism on corticotropin–releasing factor (CRF)–release induced by interleukin–1 from superfused rat hypothalami. J. Neuroimmunol. 39:57–66.

Castell, J. D., Bell, J. G., Tocher, D. R. and Sargent, J. R. 1994. Effects of purified diets containing different combinations of arachidonic and docosahexaenoic acids on survival, growth and fatty acid composition of juvenile turbot (Scophthalmus maximus). Aquaculture 128:315–333.

Clearwater, S. J. and Pankhurst, N. W. 1994. Reproductive biology and endocrinology of female red gurnard (Chelidonichthys kumu) from the Hauraki Gulf, New Zealand. Australian J. of Marine and Freshwater Res. 45:131–139.

Demers, N. D. and Bayne, C. J. 1997. The immediate effects of stress on hormones and plasma lysozyme in rainbow trout. Dev. Comp. Immunol. 21:363–373.

Dhabhar, F. S., Miller, A. H., McEwen, B. S. and Spencer, R. L. 1996. Stress–induced changes in blood leukocyte distribution, Role of Adrenal steroid hormones, J. Immunol. 157:1638–1644.

Ellis, A. E. 1988. Ontogeny of the immune system in teleost fish. In: General principles of fish vaccination pp. 20–31. Edited by A. E. Ellis. Academic Press, New York.

Estevez, A., Ishikawa M. and Kanazawa, A. 1997, effects of arachidonic acid on pigmentation and fatty acid composition of Japanese flounder (Paralichthys olivaceus). Aqua. Res. 28:279–289.

Estevez, A., McEvoy, L. A., Bell, J. G. and Sargent, J. R. 1999. Growth, survival, lipid composition and pigmentation of turbot (Scophthalmus maximus) larvae fed live–prey enriched in arachidonic and eicosapentaenoic acids. Aquaculture 180:321–343.

Farndale, B. M., Bell, J. G., Bruce, M. P., Bromage, N. R., Oyen, F., Zanuy, S. and Sargent, j. R. 1999, Dietary lipid composition affects blood leucocyte fatty acid compositions and plasma eicosanoid concentrations in European sea bass (Dicentrarchus labrax). Aquaculture 179:335–350.

Fletcher, T. C. 1997. Dietary effects on stress and health. In: Fish Stress and Health in Aquaculture vol. 62, pp. 223–246. Edited by G. K. Iwama, Pickering A. D., Sumpter J. P. and Schreck C. B. Cambridge University Press, Cambridge, UK.

Folch J., Lees, M. and Stanley, G. H. S. 1957. A simple method for the isolation and purifcation of total lipids from animal tissues. Journal of Biological Chemistry 226:497–509.

Freas, W. and Grollman, S. 1980. Ionic and osmotic influences on prostaglandin release from the gill tissue of a marine bivalve (Modiolus demissus). J. Exp. Biol. 84:169–185.

Galli, C. and Maragoni, F. 1997, Recent advances in the biology of n–6 fatty acids. Nutrition 13:978–85.

Gapasin, R. S. J., Bombeo, R., Lavens, P., Sorgeloos, P. and Nelis, H. 1998. Enrichment of live food with essential fatty acids and vitamin C: effects on milkfish (Chanos chanos) larval performance. Aquaculture 162:3–4.

Harbige, L. S. 1998. Dietary n–6 and n–3 fatty acids in immunity and autoimmune disease, Proc. Nutr. Soc. 57:555–62.

Hardie, L. J., Fletcher, T.C. and Secombes, C. J. 1991, The effect of dietary vitamin C on the immune response of the Atlantic Salmon (Salmo salar L.). Aquaculture 95:201–214.

Jeney, G. and Anderson, D. P. 1993a. Enhanced immune response and protection in rianbow trout to Aeromonas salmonicida bacterin following prior immersion in immunostimulants. Fish Shelfish Immunol. 3:51–58.

Jeney, G. and Anderson, D. P. 1993b. Glucan injection or bath exposure given alone or in combination with a bacterin enhance the none–specific defence mechanisms in rainbow trout (Oncorhynchus mykiss). Aquaculture 116:315–329.

Jeny, G., Galeotti, M., Volpatti, D., Jeney, Z. and Anderson, D. P. 1997. Prevention of stress in rainbow trout (Oncorhynchus mykiss) fed diets containing different doses of glucan. Aquaculture 154:1–15.

Johnston, P. V. 1985, Dietary fat, eicosanoids, and immunity. Adv. Lipid Res. 21:103–141.

Kanazawa, A. 1997. Effects of docosahexaenoic acid and phospholipids on stress tolerance of fish. Aquaculture 155:1–4.

Kang, L. T., Philips, T. M. and Vanderhoek, J. Y. 1999. Novel membrane target proteins for lipoxygenase–derived mono(S)hydroxy fatty acids. Biochim. Biophys. Acta. 1438:388–398.

Kelly, D. S., Taylor, P.C., Nelson, G. J., Schmidt, P. C., Ferretti, A., Erickson, K. L., Yu, R., Chandra, R. K. and Mackey, B. E. 1999. Docosahexaenoic acid ingestion inhibits natural killer cell activity and production of inflammatory mediators in young healthy men. Lipids 34:317–24.

Khalfoun, B., Thibault, F., Watier, H., Bardos, P. and Lebranchu, Y. 1997. Docosahexaenoic and eicosapentaenoic acids inhibit in vitro human endothelial cell production of interleukin–6. Adv. Exp. Med. Biol. 400B:589–597.

Kiron, V., Fukuda, H., Takeuchi, T. and Watanabe, T. 1995. Essential fatty acid nutrition and defence mechanisms in rainbow trout (Oncorhynchus mykiss), Comp. Biochem. Physiol., A:361–367.

Kraul, S., Brittain, K., Cantrell, R., Nagao, T., Ako, H., Ogasawara, A. and Kitagawa, H. 1993. Nutritional factors affecting stress resistance in the larval mahimahi (Coryphaena hippurus). J. World Aquacult. Soc. 24:186–193.

Kuhn, E. R., Geris, K. L., van der Geyten, S., Mol, K. A. and Darras, V. M. 1998. Inhibition and activation of the thyroidal axis by the adrenal axis in vertebrates. Comp. Biochem. Physiol., A. 120:169–174.

Lall, S. P. and Bishop, F. J. 1979. Studies on the nutrient requirements of rainbow trout (Salmo gairdneri) grown in sea water and fresh water. In: Advances in Aquaculture pp. 580–584. Edited by T. V. R. Pillay and W. A. Dill. Fishing News Books, Farnham, England.

Leray, C., Chpelle, S., Duportail, G. and Florentz, A. 1984. Changes in fluidity and 22:6n–3 content in phospholipids of trout intestinal brush–border membrane as related to environmental salinity. Biochim. Biophysic. Acta. 778:233–238.

Mazeaud, M. M., Mazeaud, F. and Donaldson, E. D. 1994. Primary and secondary effects of stress in fish: some new data with a general review. Trans. Am. Fish. Soc. 106:201–212.

Maziere, C., Conte, M. A., Degonville, J., Ali, D. and Maziere, J. C. 1999. Cellular enrichment with polyunsaturated fatty acids induces an oxidative stress and activates the transcription factors API and NFkappaB. Biochem. Biophys. Res. Commun. 265:116–22.

Mazur, C. F. and Iwama, G. K. 1993. Handling and crowding stress reduces the number of plaque–forming cells in Atlantic salmon. J. Aquat. Anim. Health 5:98–101.

Mehta, R. S., Gunnett, C. A., Harris, S. R., Bunce, O. R. and Hartle, D. K. 1994. High fish oil diet increases oxidative stress potential in mammary gland of spontaneously hypertensive rats, Clin. Exp. Pharmacol. Physiol. 21:881–889.

Mills, D. E., Huang, Y. S., Narce, M. and Poisson, J. P. 1994. Psychosocial stress, catecholamines, and essential fatty acid metabolism in rats, Proc. Soc. Exp. Biol. Med. 205:56–61.

Montero, D., Tort, L., Izquierdo, M. S., Robaina, L. and Vergara, J. M. 1998. Depletion of serum alternative complement pathway activity in gilthead seabream caused by alpha –tocopherol and n–3 HUFA dietary deficiencies. Fish Physiol. Biochem. 18:399–407.

Mughal, M. S. and Manning, M. J. 1986. The immune system of juenile thick–lipped grey mullet (Chelon labrosus R.): Antibody responses to soluble protein antigens. J. Fish Biol. 29:177–186.

Nakahishi, T. 1986. Ontogenetic development of the immune response in the marine teleost (*Sebastiscus marmoratus*). Bull. Jap. Soc. Sci. Fish. Nissuishi 52:473–477.

Noga, E. J., Kerby, J. H., King, W., Aucoin, D. P. and Giesbrecht, F. 1994. quantitative comparison of the stress response of striped bass (*Morone saxatilis*) and hybrid striped bass (*Morone saxatilis X Morone chrysops and Morone saxatilis X Morone americana*). Am. J. Vet. Res. 55:405–409.

Oliver, G., Eaton, C. A. and Campbell, N. 1986. Interaction between Aeromonas salmonicida and peritoneal macrophages of brook trout (*Salvelinus fontinalis*). Vet. Immunol. Immunopathol. 12:223–234.

Palmblad, J. E. 1987. Stress–related modulation of immunity: a review of human studies. Cancer. Detect. Prev. Suppl. 1:57–64.

Palombo, J. D., DeMichele, S. J., Boyce, P. J., Lydon, E. E., Liu, J. W., Huang, Y. S. Forse, R. A., Mizgerd, J. P. and Bistrian, B. R. 1999. Effect of short–term enteral feeding with eicosapentaenoic and gamma–linolenic acids on alveolar macrophage eicosanoid synthesis and bactericidal function in rats. Crit. Care. Med. 27:1908–15.

Pankhurst, N. W. and Sharples, D. F. 1992. Effects of capture and confinement on plasma cortisol concentrations in the snapper (Pagrus auratus). Australian J. of Marine and Freshwater Res. 43:345–356.

Pickering, A. D. and Pottinger, T. G. 1987. Crowding produces prolonged leucopenia in salmonid fish, despite interrenal acclimation. J. Fish Biol. 30:701–712.

Pickering, A. D. and Pottinger, T. G. 1989. Stress and disease resistance in salmonid fish: Effects of elevated plasma cortisol. Fish Physiol. Biochem. 7:253–258.

Raible, M. D. 1999. Color Atlas of Hematology: An Illustrated Field Guide Based on Proficiency. Arch. Pathol. Lab. Med. 123:748.

Rizzo, M. T., Leaver, A. H., Yu, W. M. and Kovacs, R. J. 1999. Arachidonic acid induces mobilization of calcium stores and c–jun gene expression: evidence that intracellular calcium release is associated with c–jun activation. Prostaglandins Leukot. Essent. Fatty Acids 60:187–198.

Rollins–Smith, L. A. 1998. Metamorphosis and the amphibian immune system. Immunol. Rev. 166:221–230.

Ruglys, M. P. 1985. The secondary immune response of young carp (Cyprinus carpio L.) following injection of cortisol. J. Fish Biol. 26:429–434.

Sargent, A., Bell, G., McEvoy, L., Tocher, D. and Estevez, A. 1999. Recent developments in the essential fatty acid nutrition of fish. Aquaculture 177:191–199.

Skjermo, J., Defoort, T., Dehasque, M., Espevik, T., Olsen, Y., Skjaak–Break, G., Sorgeloos, P. and Vadstein, O. 1995. Immunostimulation of juvenile turbot (Scuphthalmus maximus L.) using an alginate with mannuramic acid content administrated via the live food organism Artemia. Fish Shellfish Immunol. 5:531–534.

Tatner, M. F. and Horne, M. T. 1983. Susceptibility and immunity to *vibrio anguillarum* in post–hatching rainbow trout fry (Salmo gairdneri R.). Dev. Comp. Immunol. 7:465–472.

Thompson, I., White, A., Fletcher, T. C., Houlihan, D. F. and Secombes, C. J. 1993. The effect of stress on the immune response of Atlantic salmon (Salmo salar L.) fed diets containing different amounts of vitamin C. Aquaculture 114:1–18.

Thompson, K. D., Tatner, M. F. and Henderson, R. J. 1996. Effects of dietary (n–3) and (n–6) polyunsaturated fatty acid ratio on the immune response of Atlantic salmon (Salmo salar L.). Aquacult. Nutr. 2:21–31.

Tort, L., Gomez, E., Montero, D. and Sunyer, J. O. 1996. Serum haemolytic and agglutinating activity as indicators of fish immunocompetence: Their suitability in stress and dietary studies. Aquacult. Int. 4:31–41.

Tuncer, H. and Harrell, R. M. 1992. Essential fatty acid nutrition of larval striped bass (*Morone saxatilis*) and palmetto bass (M. saxatilis x M. chrysops). Aquaculture 101:1–2.

Uchida, K., Kaneko, T., Tagawa, M. and Hirano, T. 1998. localization of cortisol receptor in branchial chloride cells in chum salmon fry. Gen. Comp. Endo. 109:175–185.

Vadstein, O. 1996. The use of immunostimulation in marine larviculture: possibilities and challenges. Aquaculture 155:401–407.

Watanabe, T. 1993. Importance of docosahexaenoic acid in marine larval fish. J. World Aquacult. Soc. 24:152–161.

Webster, C. D. and Lovell, R. T. 1990. Response of striped bass larvae fed brine shrimp from different sources containing different fatty acid compositions. Aquaculture 90:49–61.

Copeman, L. A., Parrish, C. C., Brown, J. A. & Harel, M. 1999. Effect of Dietary Ratios of DHA, EPA and AA on Early Growth, Survival and Pigmentation of Yellowtail Flounder (*Pleuronectes ferrugineus*). Agriculture Canada, Edition 99–4, pp. 19–21.

Bessonart, M., Izquierdo, M. S., Salhi, M., Hernández–Cruz, C. M., Gonález, M. M., Fernández–Palacios, H. 1999. Effect of dietary arachidonic acid levels on growth and survival of gilthead sea bream (Sparus aurata L.) larvae. Aquaculture 179:265–275.

Harel, Moti and Place, Allen R. 1998. The Nutritional Quality of Live Feeds for Larval Fish. Bulletin of the Aquaculture Association of Canada 98–4, pp. 6–11.

Harel, M., Gavasso, S., Leshin, J., Gubernatis, A. and Place, A. R. 2000. Enhancing the Stress and Non–Specific Immune Response of Larval Striped Bass *Morone Saxatilis* by Dietary Modulation of N–3 and N–6 Series Fatty Acids. Responsible Aquaculture in the New Millennium Special Publication No. 28, p. 269.

Koven, W., Barr, Y., Lutzky, S., Ben–Atia, I., Harel, M., Behrens, P., Weiss R. and Tandler, A. 2000. The Effect of Dietary Arachidonic Acid (20:4N–6) on Growth and Survival Prior to and Following Handling Stress in the Larvae of Gilthead Seabream (Sparus Aurata). Aqua 2000 Conference, Nice, France, p. 346.

Barclay, William and Zeller, Sam 1996. Nutritional Enhancement of n–3 and n–6 Fatty Acids in Rotifers and Artemia Nauplii by Feeding Spray–dried *Schizochytrium* sp. Journal of the World Aquaculture Society. vol. 27, No. 3, pp. 314–322.

Bruce, M., Oyen, F., Bell, G., Asturiano, J. F., Farndale, B., Carrillo, M., Zanuy, S., Ramos, J. and Bromage, N. 1999. Development of broodstock diets for the European Sea Bass (Dicentrarchus labrax) with special emphasis on the importance of n–3 and n–6 highly unsaturated fatty acid to reproductive performance. Aquaculture, vol. 177, No. 1–4, pp. 85–97.

Mourentea, G., et al. Effects of dietary docosahexaenoic acid (DHA; 22:6n–3) on lipid and fatty acid compositions and growth in gilthead sea bream (Sparus aurata L.) larvae during first feeding. Aquaculture 1993, 112, 79–98.*

Castell, J. D., et al. Effects of purified diets containing different combinations of arachidonic and docosahexaenoic acid on survival, growth and fatty acid composition of juvenile turbot (Scophthalmus maximus). Aquaculture 1994, 128, 315–333.*

* cited by examiner

USE OF ARACHIDONIC ACID FOR ENHANCED CULTURING OF FISH LARVAE AND BROODSTOCK

CROSS-REFERENCE TO RELATED APPLICATION

This claims the priority of U.S. Provisional Application No. 60/230,802 filed Sep. 7, 2000 in the named of Allen R. Place and Moti Harel for "THE EFFECT OF VATYING DIETARY RATIOS OF ARACHIDONIC ACID ON LARVALTISSUE OF FISH."

BACKGROUND OF THE INVENTION

This invention relates to the use of arachadonic acid for achieving enhanced cultures of fish larvae and broodstock.

The common practice of transferring fish larvae from controlled hatchery environment to less controlled grow-out systems generally occurs near larval metamorphosis. During this stage of development, larvae are physiologically stressed and the immune response is weak. As a result, heavy mortality frequently occurs. In addition, stressful conditions such as crowding, nutritional deficiencies, and heavy organic and/or metal loads are potent suppressors of the immune system (Mazur and Iwama 1993; Pickering and Pottinger 1989).

The grow-out culture environment can also harbor opportunistic and pathogenic bacteria, which can infect the stressed larvae and reduce growth and survivorship (Andrews and Harris 1986; Vadstein 1996). Many aspects of the stress response and immune function can be modulated by nutritional factors, including vitamins, proteins, lipids, and minerals (reviewed by Chandra 1988; Johnston 1985). Among the most common micro-supplements, antioxidant-vitamins such as C and F appear to increase disease resistance and boost the fish immune system (Blazer 1992; Hardie et al. 1991; Gapasin et al. 1998). Other substances such as yeast glucan (Jeney and Anderson 1993b) and Levamnisole or mannuronic rich alginate (Anderson 1992; Skjermo et al. 1995) are also effective in stimulating the non-specific immune system in fish. Furthermore, numerous studies, mostly in mammals, have suggested that dietary long chain polyunsaturated fatty acids (PUFA) have a well marked influence on the function of both the stress and immune systems (Calder 1998; Galli and Marangoni 1997; Harbige 1998; Mills et al. 1994). In fish however, and especially in their larval stages, the dietary PUFA effect on the stress and the immune systems are less well known (partially reviewed in Kanazawa 1997).

Stress and non-specific immune responses have been demonstrated in fish from early age (Fletcher 1997). Fish larvae, however, do not have a specific immunity that is as well developed as the adult (Mughal and Manning 1986; Ruglys 1985). Fish larvae therefore are dependent on the non-specific immune system as the major line of defense against microorganisms (Ellis 1988). Non-specific protective immunity can be demonstrated in fish larvae as early as 14–16 days post hatch (Botharn and Manning 1981; Tatner and Home 1983). It is believed that the main cellular defense in fish larvae is by phagocytosis, a process that is not as well characterized as other responses such as the inflammatory function of neutrophils and monocytes in the larvae. Stress conditions can depress the immune-function, eliciting neuroendocrine responses along the hypothalamus-pituitary-interrenal (HPI) axis, and resulting in increased levels of catecholamines and glucocorticoid hormones, which in turn induce a wide variety of metabolic and osmotic changes including immunosuppressive effects (Balm 1997; Barton and Iwama 1991).

Diets rich in PUFA are often associated with suppression of the immune system (Kiron et al. 1995; Thompson et al. 1996), but the mechanism for such suppression is not clear. Animal studies have indicated that these fatty acids are cellular targets for oxygen radicals, which break the fatty acids down into several toxic carbonyl compounds. The carbonyl compounds in turn initiate intracellular formation of reactive oxygen species (ROS) and lipid peroxidation products (Maziere et al. 1999).

Changes in dietary levels and the ratio of n-3 and n-6 fatty acids can modulate the production of bioactive lipids, thereby affecting stress and pathogen resistance (Calder et al. 1990; Kiron et al. 1995; Kraul et al. 1993; Palmblad 1987; Tort et al. 1996). Cell enrichment with n-3 and n-6 fatty acids may also affect the immune system through the production of eicosanoids and cytokines (Harbige 1998; Khalfoun et al. 1997), and by reducing lymphocyte proliferation, and monocyte and neutrophil chemotaxis (Ainsworth et al. 1991; Calder 1998; Pickering and Pottinger 1987, respectively).

The n-6 fatty acids, in particular arachidonic acid (AA), play a central role in the production of eicosanoids peroxidation products, as well as initiating the production of ROS. Furthermore, stress stimuli such as free radicals and high osmotic loads induce stress-activated protein kinases (SAPKs) in a wide variety of cells. The induction of SAPKs in turn primes cytosolic phospholipase $A_2$ (cPLA$_2$) to release AA from tissue phospholipids (Buschbeck et al. 1999; Maziere et al. 1999). On the other hand, n-3 PUFAs inhibit the metabolism of n-6 PUFA, thereby promoting a shift toward the formation of less reactive eicosaniods, and diminished superoxide formation (Palombo et al. 1999). Considering the common practice in many hatcheries to feed fish larvae with highly enriched n-3 PUFA diets, the possibility exists that extensive exposure to n-3 PUFA rich lipids may eventually suppress the larval capacity to cope with stressful events and to develop an appropriate non-specific immune response.

Considering nutritional requirements of illustrative specific fish species, the white bass *Morone chrysops* is a freshwater fish species, closely related to the striped bass *Morone saxatilis*. Adults are piscivorus, occupying freshwater habitats and as such may retain and preferentially conserve their limited dietary n-3 HUFA sources. The Morone larvae, in common with many other commercially important marine larval species, are not able to elongate and desaturate n-3 and n-6 precursors into their HUFA metabolites. In fact, of the four marine teleosts including ayu *Plecoglossus altivelis,* red sea bream *Pagrus major* and globefish *fugu rubripes rubripes,* members of this genus demonstrate the lowest conversion rate of C-18:n-3 precursor to its C-20 and C-22 fatty acids metabolites. Thus, larvae must be provided with sufficient levels of HUFA, in order to meet the nutritional requirements for optimal growth.

In light of the known competition between n-6 and n-3 fatty acids series for their common enzymes, the relationship between fatty acid composition in larval body tissue and dietary supplementation of n-6 and n-3 fatty acids is of interest. In fish and mammal brain tissue and eye retinal tissue, docosahexaenoic acid (DHA, 22:6n-3) is the most prominent fatty acid. It has been observed that neuronal differentiation coincides with rapid DHA accumulation in structural phospholipids of the central nervous system. In addition to DHA, arachidonic acid (AA, 20:4n-6) is also a critical component of membrane lipids and is specifically accumulated in brain phospholipids during early development. Arachidonic acid plays an active role in signal transduction both through the production of eicosanoids in whole body tissues, and as a second messenger in neural tissue. Recent studies have shown that dietary supplementation of AA together with DHA inhibited DHA accretion in the phospholipids fraction of tissue lipids. This antagonistic relationship is potentially detrimental to the proper function of brain and neural tissues, where DHA is believed to serve a critical function.

The adverse effects on larval growth and survival because of excessive essential fatty acids (EFAs) in the diet have been previously reported. However, in spite of efforts to establish absolute requirements for AA for some fish species, the combined requirements of AA and DHA, in both absolute and relative amounts, are not known for any species.

As another aspect of aquaculture nutrition relevant to the present invention, fish meal and fish oil currently are the main ingredients in finfish and marine shrimp nutrition. Together they provide a good balance of protein (amino acids) and lipids (long chain n-3 highly unsaturated fatty acids) in a highly digestible energy-dense form. Studies have shown that diets containing fish-based ingredients generally perform better in terms of growth and feed efficiency than diets containing alternative plant based sources. However, as a result of a decreasing supply of fishery byproducts and concomitant concerns about the quality of such byproducts, the aquaculture industry is actively investigating alternative nutrient sources.

The foregoing discussion highlights the continuing need for improved nutritional source materials in the aquaculture industry.

SUMMARY OF THE INVENTION

The present invention relates in one aspect to a method of enhancing a culturing characteristic of fish larvae, comprising administering to said larvae in a nutritional diet essential fatty acids including DHA and AA in a ratio effective to enhance the culturing characteristic of said fish larvae relative to a corresponding nutritional diet lacking DHA and AA.

In another aspect, the invention relates to a method of enhancing growth of fish larvae, comprising administering to said larvae a nutritional diet including essential fatty acids DHA and AA in a ratio DHA:AA that is less than 10, and wherein the DHA and AA together comprise from about 10 to about 30% of total fatty acids in said diet.

A further aspect of the invention relates to a method of enhancing stress resistance of fish larvae to hyperosmotic conditions, comprising administering to said larvae in a nutritional diet essential fatty acids including DHA and AA in a ratio effective to at least partially reduce whole body cortisol levels of said fish larvae below that produced in said larvae in response to exposure to said hyperosmotic conditions when the larvae is fed a corresponding nutritional diet lacking DHA and AA.

Yet another aspect of the invention relates to a method of enhancing stress resistance of fish larvae to a pathogenic infection, comprising administering to said larvae in a nutritional diet essential fatty acids including DHA and AA in a ratio effective to substantially increase blood count of monocytes and neutrophils in exposure to said microbial infection, relative to levels produced by said fish larvae in response to exposure to said pathogenic infection when the larvae is fed a corresponding nutritional diet lacking DHA and AA.

In a further aspect, the invention relates to a method of increasing spawning levels and hatch rates of a broodstock fish, comprising administering to said broodstock a foodstock comprising heterotrophic algal or fungal oil and biomeal having a DHA:AA ratio that is less than 10, and wherein the DHA and AA together comprise from about 10 to about 30% of total fatty acids in said foodstock.

Yet another aspect of the invention relates to a method of operating an aquaculture facility, comprising growing heterotrophic algae and/or fungi in a fermentor under growth conditions therefor, to produce a heterotrophic cellular product containing DHA and AA, and feeding said heterotrophic cellular product and/or one or more components thereof to (i) fish larvae and/or broodstock in the aquaculture facility, or (ii) live food subsequently fed to said fish larvae.

In a compositional aspect, the invention relates in one embodiment to a fish or fish larvae foodstock comprising heterotrophic algal or fungal oil and biomeal having a DHA:AA ratio that is less than 10, and wherein the DHA and AA together comprise from about 10 to about 30% of total fatty acids in said foodstock.

Other aspects, features and embodiments in the invention will be more fully apparent from the ensuing disclosure and appended claims.

BRIEF DESCRIPTION OF THE DRAWINGS

FIG. 6. Absorption efficiency (relative to maximum absorption at zero competition) of dietary DHA and AA by

*Artemia nauplii* as a function of the competition between both fatty acids. Artemia were enriched for 16 h with diets containing equal amount of DHA (21.6% of total fatty acids) but increasing levels of AA (0–26.9% of total fatty acids), or with diets containing equal amount of AA (25.4% of total fatty acids) but increasing levels of DHA (2.6–23.3% of total fatty acids). Data are mean±SEM values, n=3.

Figure 7:
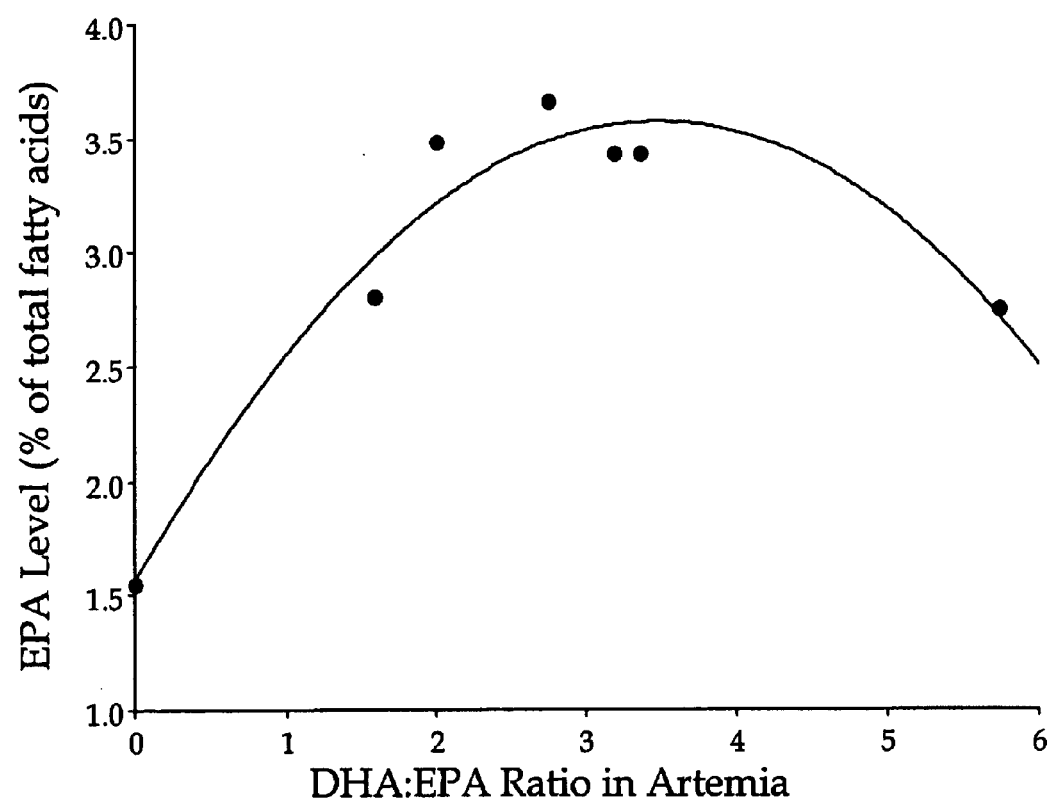

FIG. 7. Relationship between EPA metabolite level and DHA:EPA ratios in Artemia. *Artemia nauplii* were enriched for 16 h with various levels of dietary DHA but no EPA.

Figure 8:
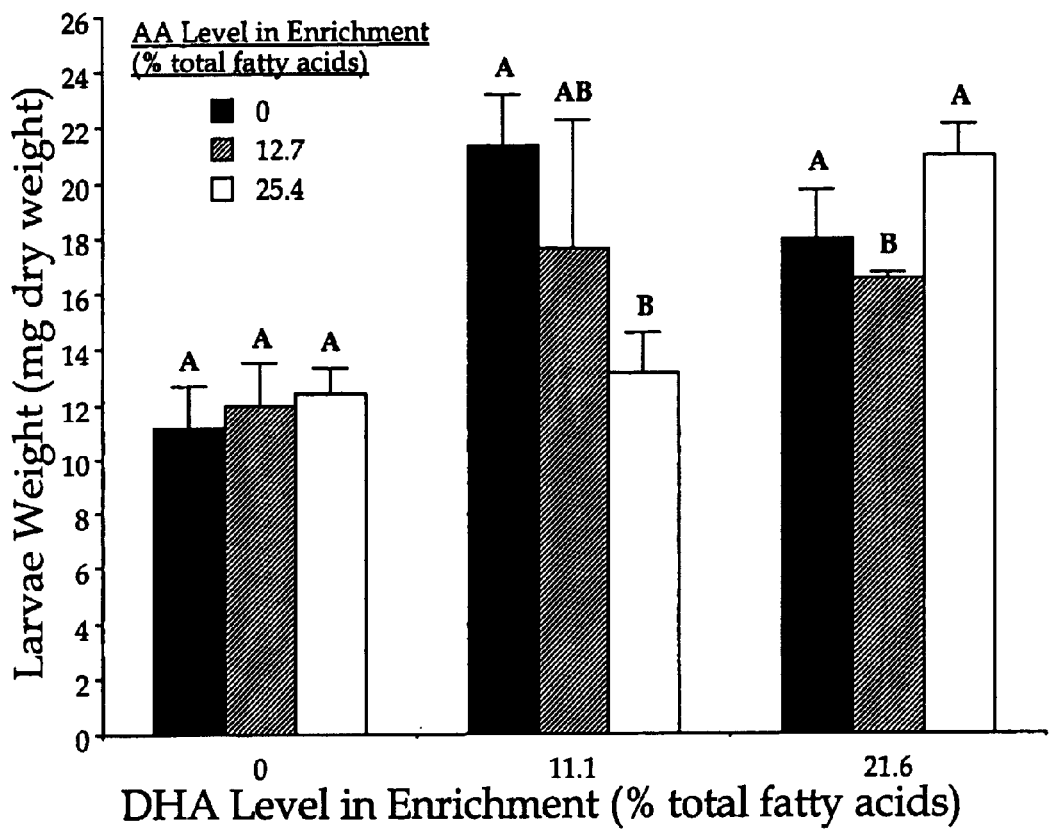

FIG. 8. Weight of white bass larvae after 22 days of feeding on enriched Artemia with varying DHA:AA dietary ratios. Data are mean±SEM values, n=3. columns with different letters indicate significant weight differences within dietary treatments (P<0.05).

Figure 9:
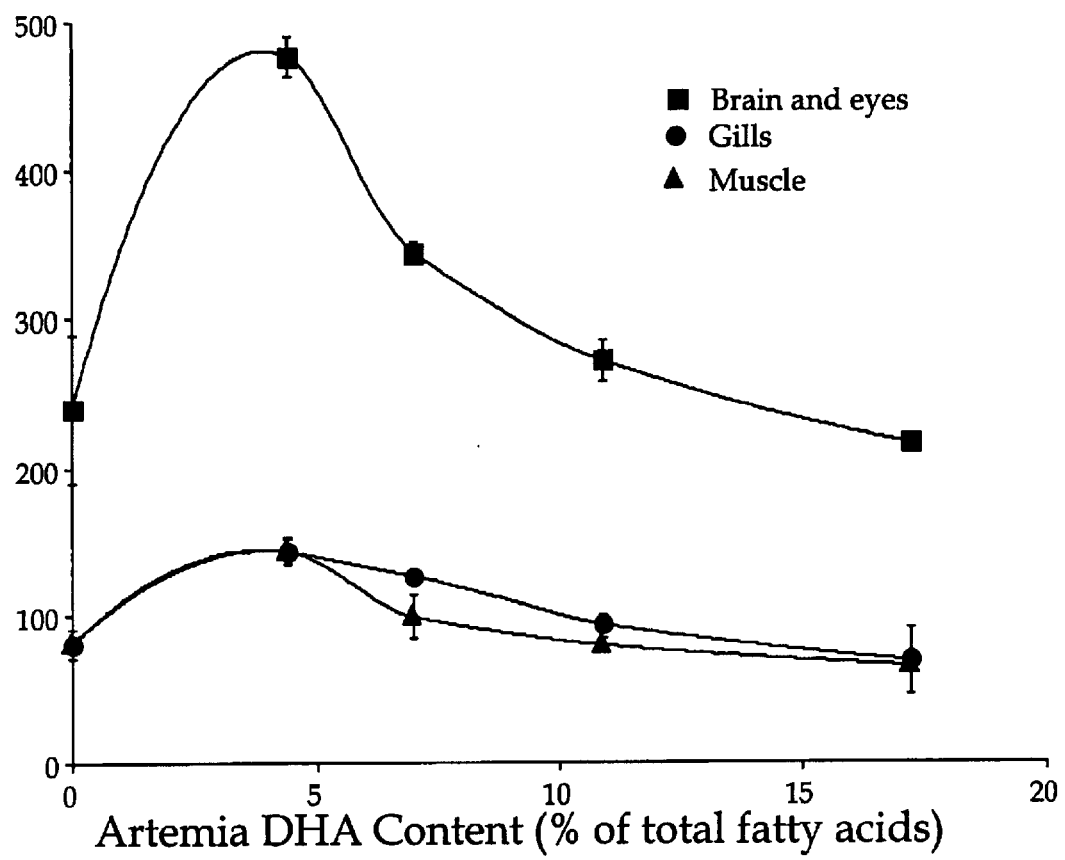

FIG. 9. Selective incorporation of DHA into larvae white bass brain and eye, gills and muscle tissues as a function of increasing dietary content. Larvae were fed for 22 days on Artemia enriched with increasing levels of DHA. Values are calculated from data presented in tables 5, 6 and 7. Data are mean±SEM values for two blocks.

Figure 10:
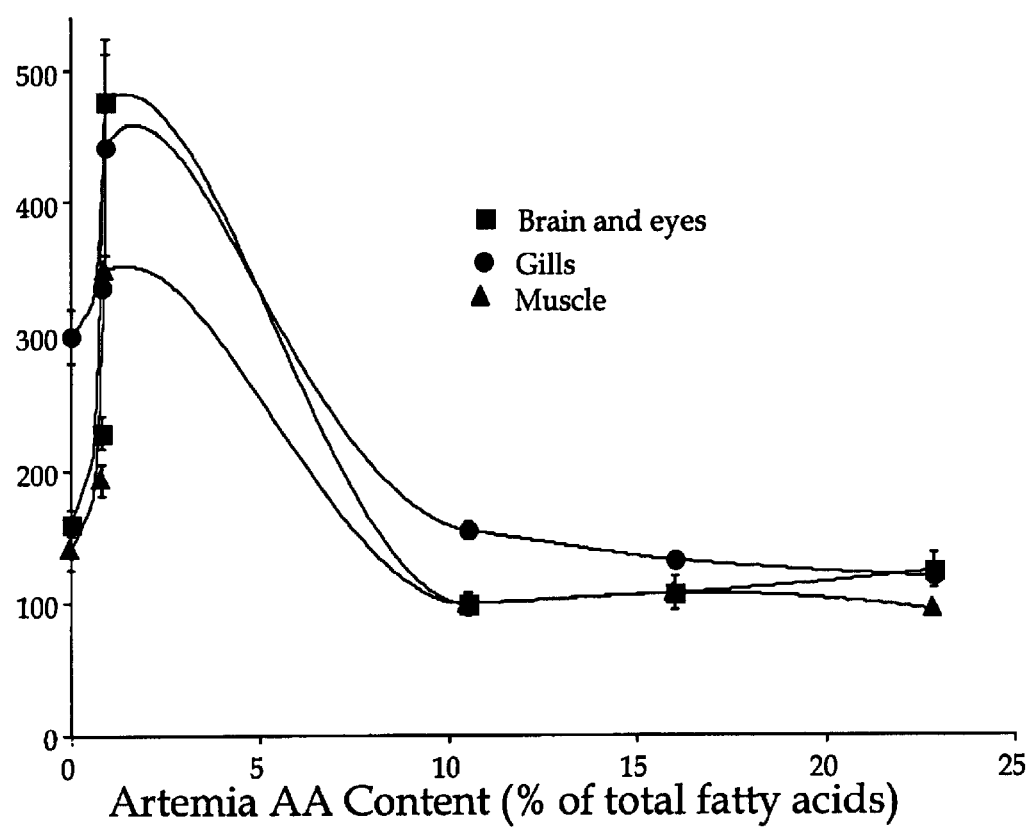

FIG. 10. Selective incorporation of AA into larvae white bass brain and eye, gills and muscle tissues as a function of increasing dietary content. Larvae were fed for 22 days on Artemia enriched with increasing levels of AA. Values are calculated from data presented in tables 5, 6 and 7. Data are mean±SEM values for two blocks.

Figure 11:
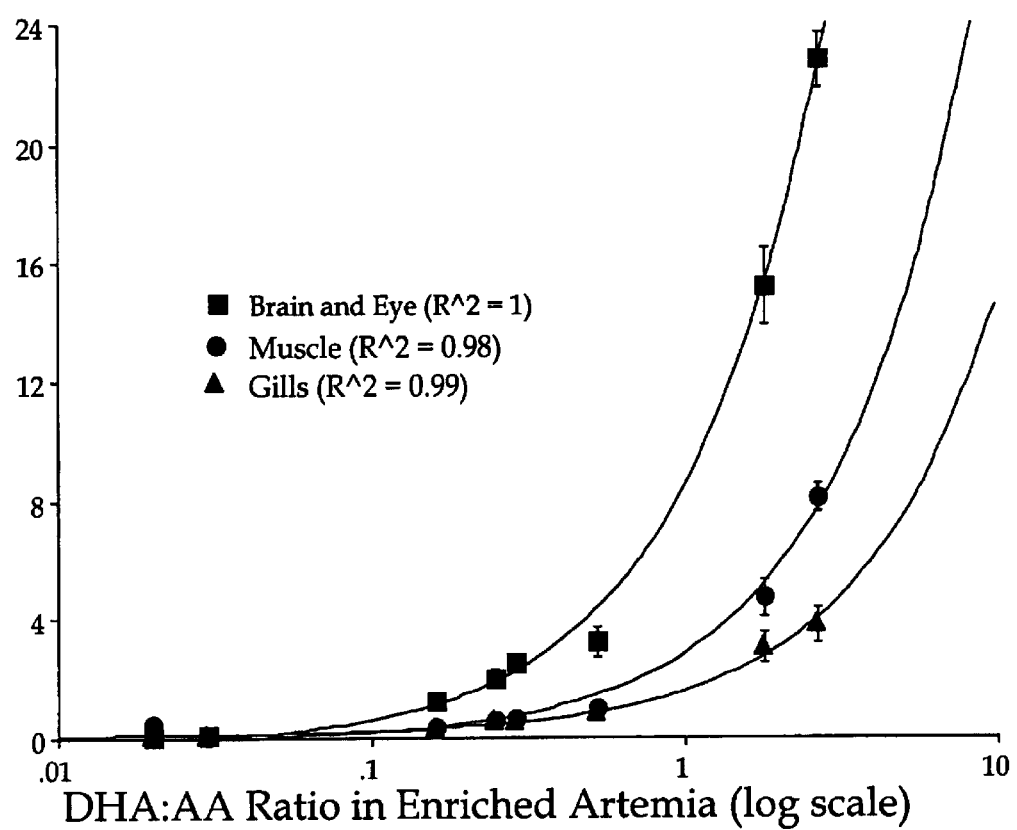

FIG. 11. Relationship between DHA:AA ratios in white bass larvae tissues and their corresponding enriched artemia diet. Values are calculated from data presented in tables 5, 6 and 7. Data are mean±SEM values for two blocks.

Figure 12:
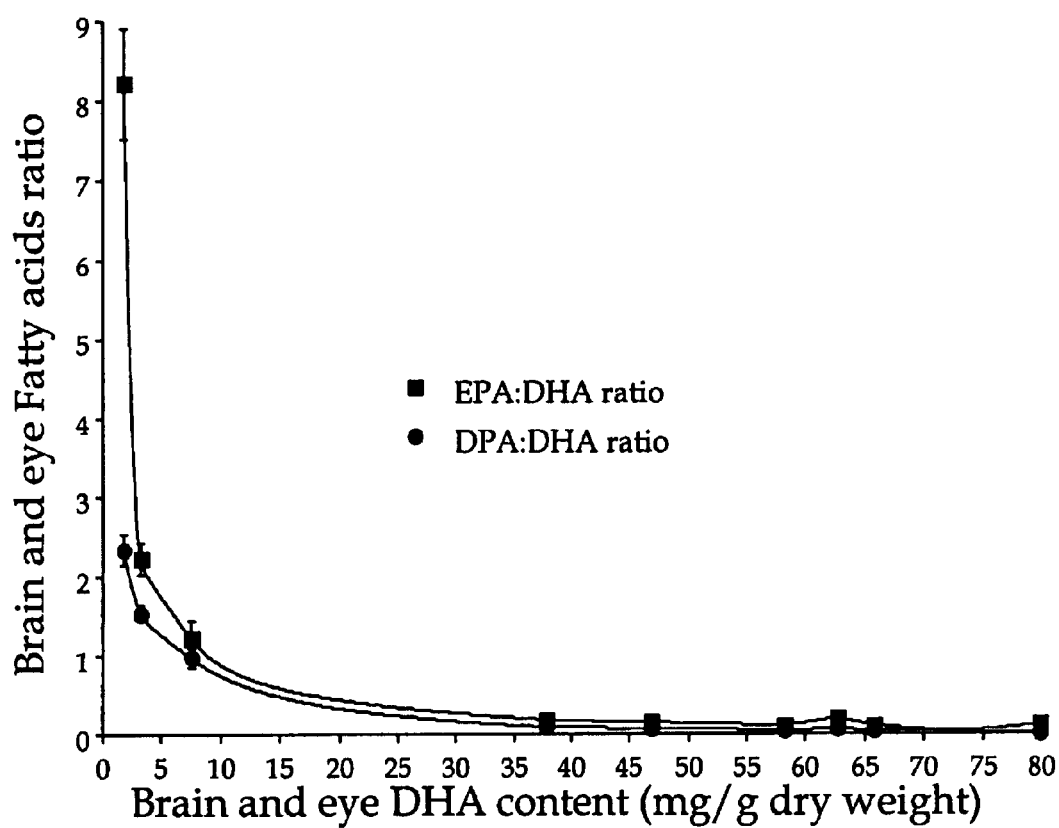

FIG. 12. Dietary DHA and AA effect on growth of striped bass larvae. Larvae were fed from day 24 to day 46 post-hatching with Artemia nauplii enriched with emulsions containing varying proportions of DHA and AA. Error bars indicate the SEM of duplicate treatments. Different letters within each dietary treatment indicate significant difference (p<0.05).

DETAILED DESCRIPTION OF THE INVENTION, AND PREFERRED EMBODIMENTS THEREOF

The disclosures of the following U.S. Provisional Patent Application and U.S. Patent are hereby incorporated herein by reference in their respective entireties: U.S. Provisional Patent Application No. 60/230,802 filed Sep. 7, 2001 in the names of Allen R. Place and Moti Harel for "THE EFFECT OF VARYING DIETARY RATIOS OF ARACHIDONIC ACID ON LARVAL TISSUE OF FISH," and U.S. Pat. No. 5,658,767 entitled "ARACHIDONIC ACID AND METHODS FOR THE PRODUCTION AND USE THEREOF" issued Aug. 19, 1997 in the name of David J. Kyle.

As used herein, the following abbreviations are used:
AA=arachidonic acid,
DHA=docosahexaenoic acid,
DPA=docosapentaenoic acid,
D.W=dry weight,
EFA=essential fatty acids,
EPA=eicosapentaenoic acid,
PUFA=polyunsaturated fatty acids,
ROS=reactive oxygen species, and
Staph-a=formalin-fixed *Staphylococcus aureus*.

Use of DHA and AA for Enhancement of Fish Larval Stress and Defense Mechanisms The present invention in one aspect relates to the use of dietary essential fatty acids (EFAs) to enhance fish larval stress and defense mechanisms, in diets containing varying proportions of docosahexaenoic (DHA) and arachidonic (AA) acids. The dietary regimen of the present invention provides enhancement of resistance to salinity stress of fish larvae.

Using striped bass (*M. saxatilis*) larvae as a representative test species, we have studied the effects of increasing levels of dietary DHA and AA on growth, survivorship, and stress response to hyperosmotic conditions, as measured by whole body cortisol levels, and non-specific immune response to foreign antigens, as measured by the redistribution of circulating blood leukocytes.

As shown by our results for diets containing varying proportions of docosahexaenoic (DHA) and arachidonic (AA) acids, as fed to larval *M. saxatilis* during metamorphosis, and our assessment of the larvae's resistance to salinity stress and bacterial challenge, feeding of DHA alone enhanced larval survival in high salinity challenges. The dietary inclusion of AA with DHA, however, yielded unexpectedly superior survivalship to the use of DHA alone. In the representative larval species, *M. saxatilis*, for example, a dietary regimen including 14.5 mg AA $g^{-1}$ and 11–21.6 mg DHA $g^{-1}$ (mg $g^{-1}$ referring to milligrams of the specific fatty acid per gram of body weight of the larval species) resulted in maximal survivalship.

High dietary AA was found to be generally associated with elevated basal levels of cortisol, while increasing dietary DHA was found to mainly affect the kinetics of the cortisol response to salinity stress exposure. When larvae fed varying proportions of DHA and AA were injected intraperitoneally with formalin fixed *Staphylococcus aureus* in order to measure their non-specific immune response by differential count of lymphocytes, monocytes, and neutrophils in the blood, total lymphocytes, which accounted for the largest portion of the white blood cells (over 70%), were found to decrease dramatically in all challenged larvae during the first 6 hours post injection and then to return to initial levels after 44 hours. Conversely, the proportion of monocytes and neutrophils was found to rise from 14% and 2% up to 28% and 6% of the total circulating leukocytes, respectively, with the largest increase occurring in monocytes and neutrophils in larvae fed a moderate level of both DHA and AA.

Dietary DHA and AA, when provided in balanced ratios and levels in accordance with the present invention, have been found to be effective to enhance larval resistance to stress and pathogen challenges.

In one aspect of our work, the extent to which extreme dietary levels of AA and/or DHA modulate lipid composition in the body tissues and consequently effect growth and survival in freshwater Morone larvae species was examined. White bass (*Morone chrysop*) larvae (day 24–46) were fed *Artemia nauplii* enriched with algal sources of varying proportions of AA and DHA (from 0 to over 20% of total fatty acids). Growth was significantly low (P<0.05) in larvae fed a DHA deficient Artemia diet. Increasing dietary levels of AA was associated with a significant growth inhibition. We discovered, however, that the inhibitory effect of AA on larvae growth was almost completely compensated by the dietary addition of DHA (e.g., at a level of 21.6% DHA of total fatty acids in enrichment lipids). We also found that larval brain/eye tissue accumulated over 10 times more DHA than AA at any dietary ratio, while gill tissue maintained an almost equal preference for both DHA and AA, and that DHA predominance over AA accumulation in larval tissue lipids increased exponentially at higher than 10:1

DHA/AA dietary ratios. Levels of DHA in brain/eye tissue were most sensitive to competition from dietary AA, being displaced from the tissue at rates of 1.02 mg DHA per mg increase in tissue AA. On the other hand, AA levels in gills tissue were most sensitive to dietary changes in DHA levels being displaced at rates of 2.9 mg AA per 1 mg increase in tissue DHA. In our findings, dietary DHA/AA ratios <10:1 promoted high larval growth rate, with maximum regulatory response in tissue essential fatty acids.

Single Cell Heterotrophs for Marine Aquaculture DHA, EPA and AA Enrichment

Selected algae and fungi species were grown under controlled and sterile conditions and both whole intact cells and their residual biomeal or extracted triacylglycerols and phospholipids were used as components in marine larval and broodstock diets.

We found that Crypthecodinium sp. oil and biomeal produced higher levels of DHA and higher DHA/EPA ratios in rotifers and Artemia than other commercial heterotrophic algal biomeal and fish oil based emulsion, and such improved enrichment resulted in enhanced growth and survival of the representative marine larvae species (seabream, European sea bass, Atlantic halibut and striped bass). Inclusion of algal oil and biomeal in the representative species (striped bass) broodstock diets resulted in spawning levels and hatching rates substantially exceeding those obtained with commercial diets. Larval fish diet and broodstock fish diet supplemented with arachidonic acid rich oil obtained from heterotrophically grown fungi, Mortierella sp., was discovered to have significant benefits on the hatching rate and survival of larvae under stressful conditions. Our findings demonstrate the utility of single cell heterotrophs as a partial substitute or replacement for fish based ingredients in aquaculture diets.

Microalgae, which represent an extensive group of photosynthetic and heterotrophic organisms, have heretofore not been applied commercially to replace fish based ingredients, due to their high production cost and culture inefficiency.

We have discovered that heterotrophic algae can be cost-effectively grown in conventional fermentors, in an algal culture under controlled conditions, using an organic carbon source (i.e. glucose) to provide both carbon and energy for growth. This heterotrophic growth approach has several distinct advantages over phototrophic culture. Heterotrophic cultures do not require the substantial investment in lighting and electricity capital and operating costs that are necessary in phototrophic algal growth systems. Costs in present U.S. dollars for production of heterotrophic algal biomass are below $5 kg$^{-1}$, whereas phototrophic algae production costs are up to two orders of magnitude higher. Additional advantages of phototrophic algal production include high cell density operation (e.g., >75 g L$^{-1}$ DW), which reduces harvesting effort, and the ready commercial availability of large-scale growth vessels (up to 500×10$^{-3}$ L) for phototrophic algal production, and associated process technology.

The features and advantages of the present invention are more filly shown by the following examples.

EXAMPLE 1

Larval Rearing

Newly hatched striped bass (M. saxatilis) larvae were obtained from the Aquaculture Research Center (ARC) of the Center of Marine Biotechnology (COMB), University of Maryland. Larvae were raised for 17 days post hatching on rotifers, Bracionus plicatilis (2–5 rotifers ml$^{-1}$), which were grown separately on fresh-water Chlorella sp. paste (0.5 g/10$^6$ rotifers/day, obtained from Martek BioSci. Inc. Columbia, Md.).

Seventeen days post-hatched larvae were randomly distributed in eighteen 60-liter rearing tanks at an initial density of 160 larvae per tank. The rearing tanks were gently aerated and the water volume exchanged 1–2 times per day with biofiltered, UV treated recirculating water. A 14:10 h light-:dark photoperiod cycle was maintained using fluorescent lights (Daylight; 40 watts; 800–1200 lux at the water surface). Temperature was maintained at 24±2° C. and salinity at 2–6 psu. Water quality was monitored daily, and levels of total $NH_3$, unionized $N_{-3}$, $NO_2$ and pH were maintained below 0.2 ppm, 0.001 ppm, 0.3 ppm and at 8.02, respectively, by partial replacement with fresh water.

Newly hatched Artemia nauplii were introduced to the larvae from day 17 until day 24 (once a day at 20–40 nauplii 1$^{-1}$), while rotifer concentration was reduced gradually to a complete removal by day 24.

Larvae then were fed twice daily with Artemia nauplii, enriched with nine dietary emulsions containing varying proportions of DHA and AA.

Formulation of Enrichment Emulsions

A 3×3 factorial design with two nutritional factors (DHA and AA) at three levels each and in duplicate blocks was used. This experimental design allowed for the simultaneous study of the effect of increasing dietary levels of DHA and AA either alone or in various combination of both fatty acids. Nine different emulsions having varying proportions of DHA-rich triacylglycerols from heterotrophically grown algae, Crypthecodinium spp. (0, 11.1 and 21.6 mg g$^{-1}$ lipids) and AA-rich triacylglycerols (3, 14.5 and 24.8 mg g$^{-1}$ lipids) from fungi, Mortierella spp. (DHASCO and ARASCO, Martek BioSci. Columbia, Md.) were formulated.

A mixture of 2% alginic acid, 2% polyoxyethylene sorbitan mono-oleate (Tween-80), 1% ascorbic acid, 1% vitamin-E, 1% silicon based anti-foaming agent (all mad e by Sigma Co. MO) and 5% soy lecithin (80% phosphatidylcholine, Archer Daniels Midland Co., Decatur, Ill.) were added to the oils (all additions made by weight). Oil mixtures were emulsified with an equal amount of distilled water by first homogenizing at low speed (Ultra-turrax T8, IKA Labortechnik, Staufen, Germany) for 15 seconds and then sonicating for additional 15 seconds at one-third of the maximum sonication energy level (Sonifier 450, Branson Sonic Power Company, Danbury, Conn.). Fresh emulsions were prepared on a weekly basis and stored at 4° C. for daily use.

Decapsulated Artemia nauplii (premium grade, Sanders Brine Shrimp Co., Ogden, Utah) were hatched and kept at room temperature for an additional 6–8 h until they reached instar-II stage (complete development of digestive system) before being transferred to the enrichment medium. At time zero (17:00), 0.4 g 1$^{-1}$ of each enrichment emulsion (doses were based on the oil content in the emulsion) was fed to Instar II-stage Artemia nauplii (200,000 nauplii per liter). At 09:00 the following day (after 16 h) half of the nauplii were removed and fed to larvae. An additional 0.2 g 1$^{-1}$ of enrichment emulsion was added, and the remaining nauplii were fed to the larvae at 16:00.

Feeding experiments were terminated on day 46. All larvae were transferred from each rearing tank with an aquarium net and immediately placed in their tank water in 10-liter buckets. Survivorship was determined based on the initial and final count of larvae in each rearing tank. Samples of 40 larvae from each rearing tank were washed with distilled water, dried on paper toweling, placed into test tubes, frozen on dry ice and lyophilized to constant weight.

Larval dry weight was recorded individually to the nearest 0.1 mg (Mettler UMT2, Toledo, Switzerland). Gill tissues were separated from each freeze-dried larvae using sharp forceps, and total lipids extracted according to the method of Folch et al. 1957. The lipid extracts, including internal standards (19:0 and 21:0 fatty acids, NU-Chek-Prep, Inc., Elysian, Minn.) were transmethylated with 5% HCL in methanol (Christie 1989). The fatty acid methyl esters were analyzed using a Hewlett-Packard 5890A gas chromatography, equipped with a flame ionization detector and a 30 m×0.25 mm ID capillary column with 0.25 µm film thickness (DB WAX, J&W Scientific, Folson, Calif.). The integrated peak areas of the fatty acid methyl esters were identified by comparison with known standards and quantified through the use of known amounts of internal standards.

Salinity Stress Test and Sampling Protocol

A group of 30 larvae was promptly transferred from the 10-liter bucket and immediately divided into three 1-liter beakers (ten larvae in each beaker) containing 25-ppt NaCl in dechlorinated fresh water. These hypersaline exposure conditions were established following preliminary tests in which approximately 50% of the larvae survived after 30 minutes exposure. Larval survival at 0, 15 and 30 minutes was recorded, and five larvae at each time interval were quickly removed and sacrificed on dry ice. Samples were washed with chilled distilled water, dried on paper towel, placed into test tubes and lyophilized to constant weight. The dry weight of each hypersaline-exposed larva was recorded to the nearest 0.1 mg. Samples were kept at $-80°$ C. for subsequent whole larva cortisol analysis.

Cortisol Analysis

Cortisol was measured on whole larva using a solid-phase radioimmunoassay (RIA) Coat-A-Count Cortisol kit (DPC, Los Angeles, Calif.) following the manufacturer's procedure. Whole body cortisol was extracted from lyophilized larvae with ethyl ether (Barry et al. 1995). Extraction efficiency was determined by adding 1000 dpm 1,2,6,7-$^3$H-cortisol to each larva sample (specific activity ~67.0 Ci mmol$^{-1}$, Amersham, Piscataway, N.J.). Cortisol extracts were reconstituted in 150 µl RIA buffer (included in the cortisol RIA kit). Cortisol concentration was then determined in 100-µl aliquots. Spiking recovery was measured in unknown samples using three spiking dilutions (1, 3, 7 ng, Cortisol Immulite, DPC, Los Angeles, Calif.). RIA assays were validated by demonstrating parallel dose-response competitive binding curves obtained by serial dilutions of larvae samples with that of cortisol standards. Two additional 20-µl aliquots were taken to determine $^3$H-cortisol recovery.

Stimulation of the Larvae Non-specific Immune System

Fish larvae used for antigen challenge studies were kept in groups of 40 larvae and continually fed their respective experimental diets for an additional 20 days until they reached 66 days post-hatch. The additional 20-days growth period was required to ensure sufficient blood volume to make smears for leukocyte redistribution analysis. Fish larvae were lightly anaesthetized in phenolxyethanol (1:10, 000 v/v, Sigma Chemical Co., St. Louis, Mo.), and injected intraperitoneally with 5 µl of either 5 µl formalin-fixed S. aureus with a protein-A coat (10 mg ml$^{-1}$ Staph-A in 0.8% sterile saline, Sigma Chemical Co., St. Louis, Mo.) or 5 µl 0.8% sterile saline.

Formalin-fixed S. aureus was chosen for challenging the larvae non-specific immune system because it has been shown that injecting dead pathogenic bacteria can enhance bactericidal activity in fish plasma through the elevation of both lysozyme levels and phagocyte function within a suspension of leucocytes (Thompson et al. 1993).

Groups of 20 larvae injected with either formalin-fixed Staph-A or 0.8% saline were placed in separate culture tanks according to their respective diets. Three larvae were randomly sampled from each group at times 0, 6, 18, 44, 93 and 141-h after exposure, for measuring plasma leukocytes redistribution. Blood was obtained by decapitation above the gills, and body fluids were smeared on heparin pre-coated glass slides.

Relative Differential Counts of Blood Leucocytes

Slides containing smears of body fluids were air-dried and stained with Wright's stain. A relative differential count of the three major blood leucocytes (lymphocytes, monocytes and neutrophils) was performed morphologically (Jeney and Anderson 1993a; Raible 1999). Slides were examined by microscope at 100× oil immersion objective (Axioskop, Carl Zeiss, Oberkochen/Wuerttemberg, West Germany) in a zig-zag non-overlapping pattern until a total of 200 leukocytes were counted. Because of the small larval size, the amount of blood that was extracted from each body was not sufficient to record total leucocyte concentration.

Statistical Analysis

Larval feeding experiments were arranged in a complete factorial block design (2 blocks), including DHA and AA in three dietary levels of each. All data were reported as means±SEM. Analysis of variance was used (ANOVA, Statview 4.5, Abacus Concepts, Inc., Berkeley, Calif., 1992) to determine differences in larval survival, weight and cortisol level between and within DHA and AA dietary treatment. Analysis of variance was also used to determine differences in differential counts of blood leucocytes as a function of pathogen injection (control vs. infected larvae), time post injection and dietary treatments. Percentage data were normalized by arcsine transformation prior to analysis. When significant differences between the means were detected, a Bonferroni multiple comparison test was applied. A significance level of 95% ($P<0.05$) was used throughout.

Results

Dietary DHA:AA Effects on Larval Growth

Figure 1:
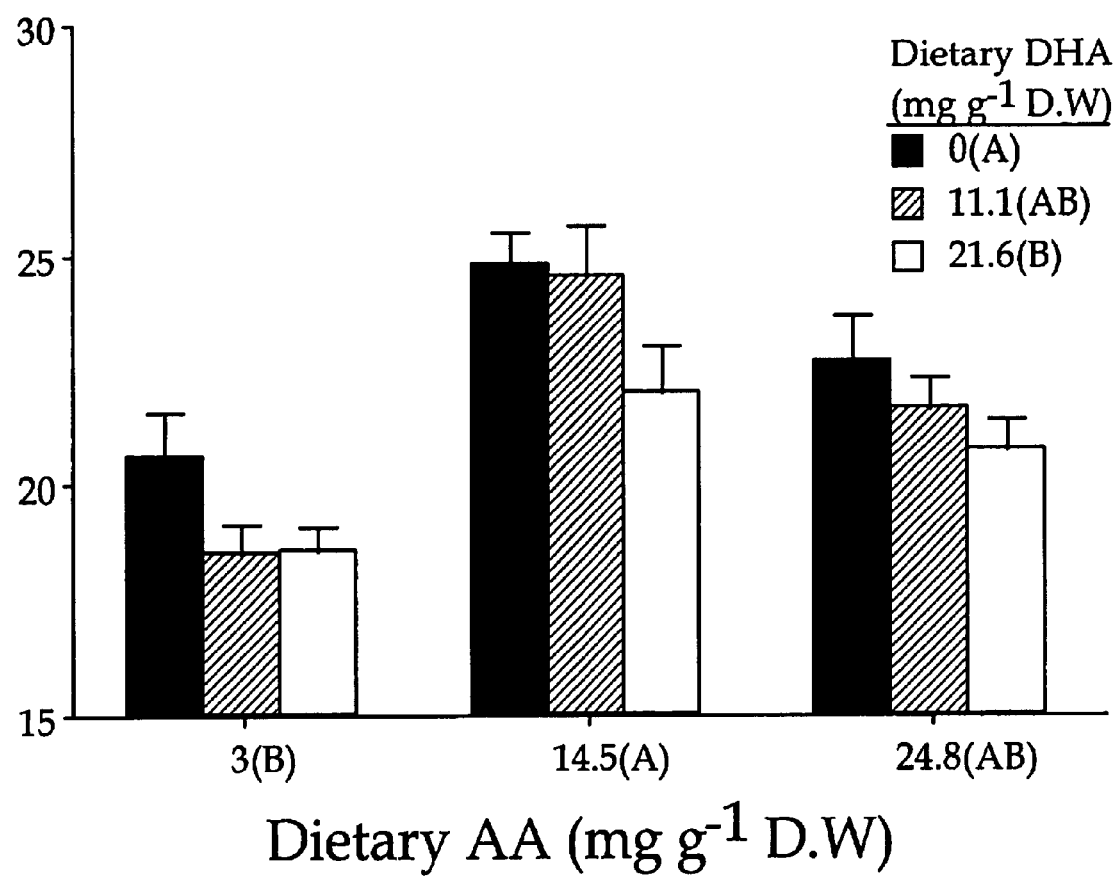
FIG. 1. Dietary DHA and AA effect on growth of striped bass larvae. Larvae were fed from day 24 to day 46 post-hatching with *Artemia nauplii* enriched with emulsions containing varying proportions of DHA and AA. Error bars indicate the SEM of duplicate treatments. Different letters within each dietary treatment indicate significant difference ($p<0.05$).

Dietary treatments did not have a significant effect on larval survivorship (56.0±2.4%, p>0.05). However, significant differences were observed in larval growth rates when fed varying proportions of DHA (p=0.0065) and AA (p=0.0001). Larvae fed the lowest quantity of AA (3 mg g$^{-1}$ lipids) were the smallest regardless of the dietary DHA level (FIG. 1, plotting larval weight, in milligrams dry weight, as a function of dietary AA against parametric values of dietary DHA).

In general, larval growth was negatively correlated with dietary DHA levels, while AA fed larvae exhibited optimal growth at moderate levels of AA (14.5-mg g$^{-1}$ lipids). When the growth data were overlaid by the dietary treatments, the change in mean growth was significantly greater in larvae fed AA than in larvae fed DHA (F-Value for AA treatment was 20.5 versus only 5.1 for the DHA treatment).

Larval growth decreased slightly from a mean of 22.7-mg dry weight to 20.4-mg dry weight with increasing dietary levels from zero to 21.6-mg DHA $g^{-1}$ lipids. On the other hand, larval weight increased significantly from 19.4-mg dry weight in larvae fed with 3-mg AA $g^{-1}$ lipids up to 23.7-mg dry weight in larvae fed Artemia enriched with 14.5-mg AA $g^{-1}$ lipids (p=0.0001). However, further addition of AA to the diet was associated with a significant reduction in larval growth (p=0.0033).

Dietary DHA:AA Effects on Larval Survival in Response to High-salinity Stress A preliminary exposure showed that low salinity reared striped bass larvae were highly sensitive to saline water. Acute exposure to 45-psu saline-water resulted in all larvae dying within 15 min. At 25-psu approximately 50% of the larvae survived even after 30-min.

Considering that maximum plasma cortisol increase in striped bass is reached after 30 min exposure to stress (Noga et al. 1994), we selected as our high-salinity stress exposure 30 min at 25-psu. Mean survival after 15-min exposure was 92.5±1.2% with no significant effect of dietary treatments (p>0.05). However, after 30 min of exposure, high mortality of over 80% was observed in AA deficient larvae (3 mg $g^{-1}$ lipids dietary AA, Table I). Increasing the level of dietary AA to 14.5 mg $g^{-1}$ lipids was associated with a dramatic improvement in larval survivorship (61.8±4.2%, p<0.05). Further dietary increase, although not significantly different, resulted in lower larval survival (p>0.05, Table I, below). Addition of DHA to larval diet was associated with only a modest effect on larval survivorship, though a general trend of improved survivorship was observed with increasing dietary DHA levels.

Dietary DHA/AA Effects on Larval Body Cortisol Levels in Response to High-salinity Stress Basal levels of cortisol in whole larvae measured at time zero were not correlated with larval mass ($R^2$=0.071). Therefore, cortisol levels were pooled only by dietary treatments and exposure time to high-salinity. Larval survivorship was positively correlated with basal levels of cortisol ($R^2$=0.96), but not correlated with the magnitude of the response ($R^2$=0.03). Furthermore, increasing dietary AA from 3 to 14.5 mg AA $g^{-1}$ lipids resulted in an increase of nearly 40% in basal cortisol levels, as shown by the data in Table 1 below and the corresponding graph of FIG. 2 (in which cortisol, in picograms per milligram dry weight, is plotted as a function of time, for dietary DHA [upper portion of figure] and dietary AA [lower portion of figure]), while increasing levels of dietary DHA did not have a significant effect on cortisol basal levels (p=0.3215).

TABLE 1

Effect of dietary changes in DHA and AA acids content on striped bass, M. saxatilis, larval survival and body cortisol levels, after 30 minute exposure to high-salinity stress

| Dietary EFA | Survival (%) | Body Cortisol (pg $mg^{-1}$ D.W) | |
|---|---|---|---|
| (mg $g^{-1}$ D.W) | at 30 min | at 0 min | at 30 min |
| DHA | | | |
| 0.0 | 30.7 ± 4.9$^B$ | 123 ± 8$^A$ | 155 ± 16$^B$ |
| 11.1 | 48.3 ± 7.2$^{AB}$ | 128 ± 16$^A$ | 182 ± 22$^{AB}$ |
| 21.6 | 50.99 ± 5.8$^A$ | 118 ± 11$^A$ | 193 ± 26$^A$ |
| AA | | | |
| 3.0 | 19.5 ± 1.8$^B$ | 106 ± 10$^B$ | 171 ± 18$^A$ |
| 14.5 | 61.8 ± 4.2$^A$ | 142 ± 15$^A$ | 192 ± 27$^A$ |
| 24.8 | 48.7 ± 5.0$^A$ | 122 ± 10$^{AB}$ | 167 ± 20$^A$ |

The data for larval survival and whole body cortisol were analyzed by pooling all levels of DHA or AA within each dietary treatment. Means in the same column and within each dietary treatment that share the same superscript were not significantly different (p>0.05).

Figure 2:
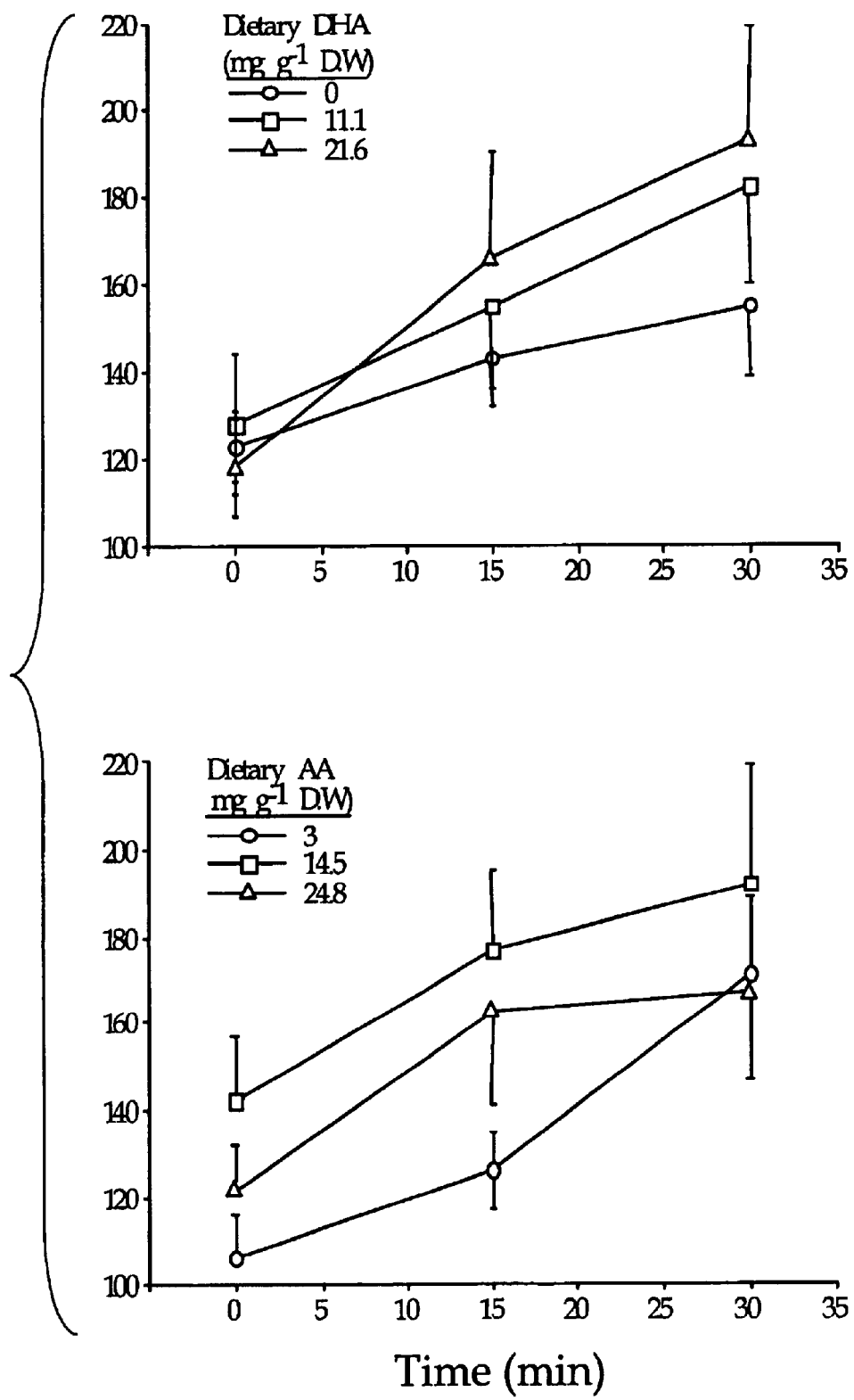
FIG. 2. Cortisol response in striped bass larvae during 30-min exposure to high-saline water. Larvae were previously fed from day 24 to day 46 post-hatching with *Artemia nauplii* enriched with varying proportions of DHA (upper figure) and AA (lower figure). Cortisol level in whole larvae body extract was measured individually for a total sample of five larvae at times 0, 15 and 30 min exposure in fresh water containing 25-psu NaCl. Error bars indicate the SEM of six-pooled treatment replicates.

The magnitude of the cortisol response to high-salinity stress was greatest in both the AA deficient larvae and the high DHA fed larvae (3 and 21.6 mg $g^{-1}$ lipids, respectively, FIG. 2). In general, increasing levels of dietary DHA were associated with a stronger cortisol response as compared with increasing levels of AA.

Figure 3:
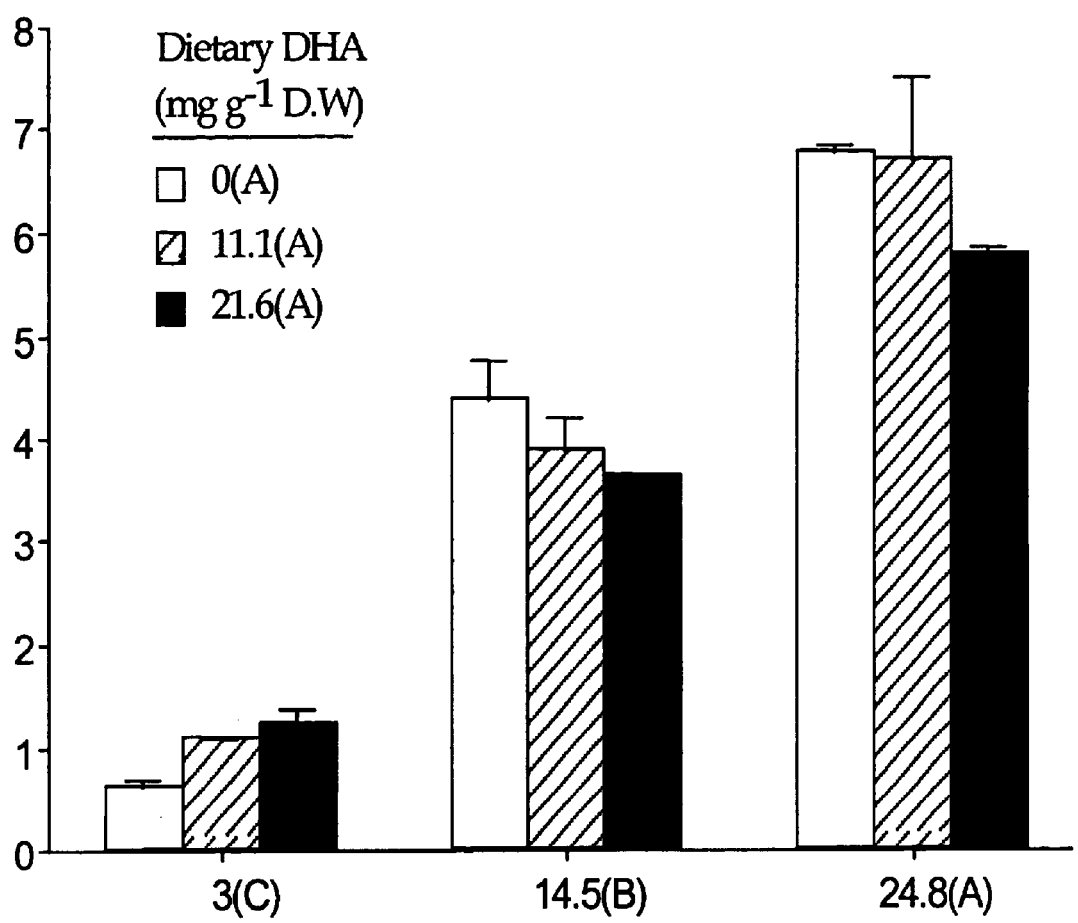
FIG. 3. Dietary DHA and AA effect on the AA/EPA ratio in striped bass larva gill tissue. Larvae were fed from day 24 to day 46 post-hatching with *Artemia nauplii* enriched with emulsions containing varying proportions of DHA and AA. Error bars indicate the SEM of duplicate treatments. Different letters within each dietary treatment indicate significant difference ($p<0.05$)

DHA/AA dietary effects on AA (20:4n-6)/EPA (20:5n-3) ratios in gill tissue are shown in FIG. 3 (where the AA/EPA ratio in gill tissue is plotted as a function of dietary AA in mg per gram dry weight, against dietary DHA in mg per gram dry weight as a parameter). The AA/EPA ratios in gills increased significantly with the increase in dietary AA but did not changed with dietary increases in DHA (p>0.05). Larval gills maintained almost equal proportions of both AA and EPA at low dietary AA input, but accumulated 4 and 6 times more AA over EPA when fed Artemia enriched with 14.5 and 24.8 mgAA $g^{-1}$ lipids, respectively. High gill AA/EPA ratios were also associated with high basal levels of cortisol but with a lower rate of response to high-salinity stress.

Effect of Formalin-fixed Staph-a Injection on Larvae Immune Response

No mortality occurred following larval injection with either saline or formalin-fixed Staph-a. However changes in the distribution of circulating leukocytes were observed in larvae injected with formalin-fixed Staph-a as compared with saline injected larvae (FIG. 4, wherein lymphocyte percentage, monocyte percentage, and neutrophil percentage are plotted as a function of time, in hours, for saline injection (○) and Staph-a injection (□)).

Figure 4:
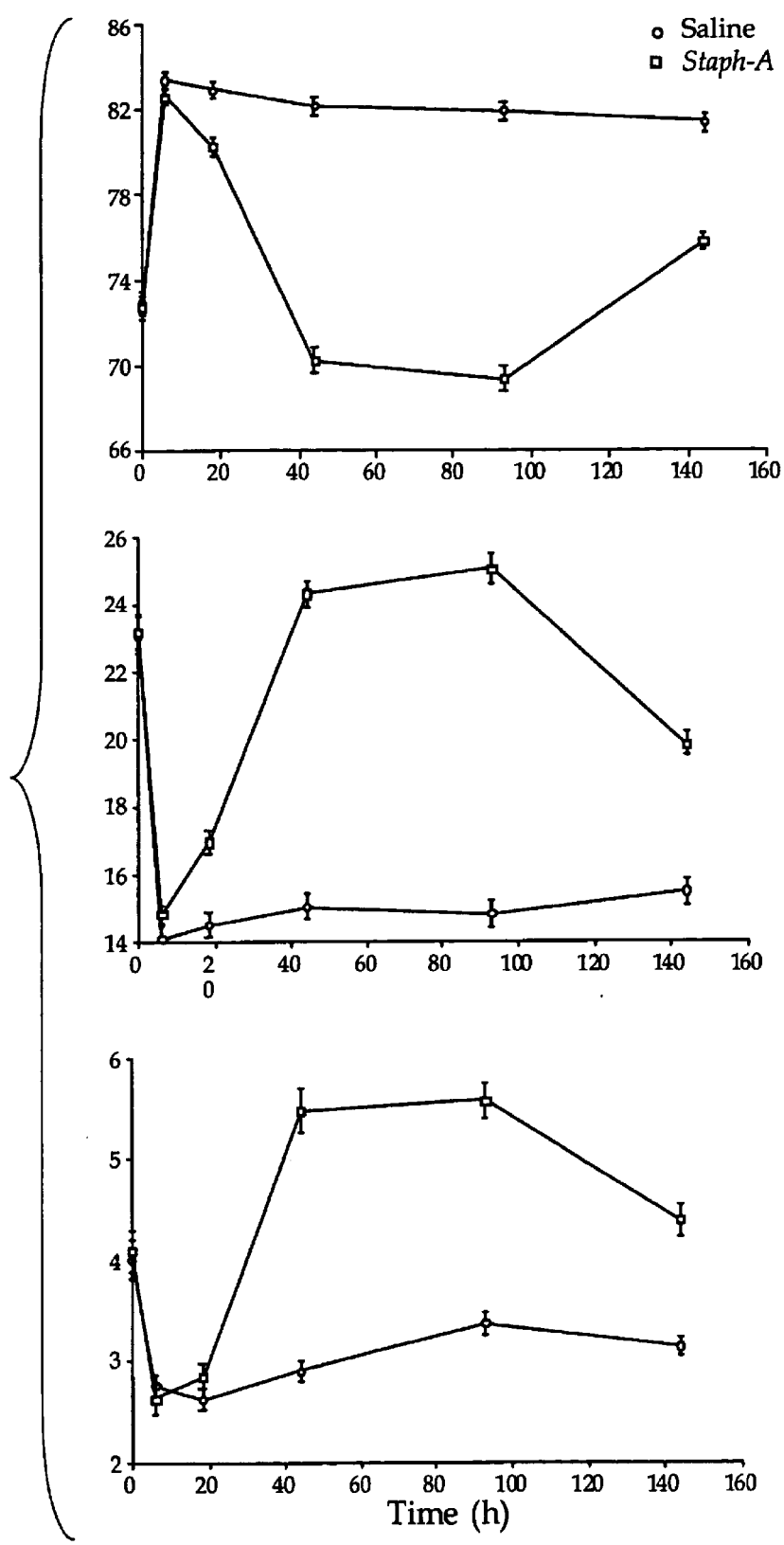
FIG. 4. Fractional distribution of striped bass larvae blood leukocytes. Larvae were injected with either saline or formalin-fixed *Staphylococcus aurous* (Staph-A), and the fractional distribution of blood lymphocytes, monocytes and neutrophils was measured during 143 h post injection. Error bars indicate the SEM of 27 pooled replicates.

FIG. 4 presents the pooled data for all saline or formalin-fixed Staph-a injected larvae (n=27). Leukocyte distribution in peripheral blood of saline injected larvae first experienced a drop in lymphocyte percentage and an increase in both monocyte and neutrophil percentage, then returned to constant levels after 43 hours. Lymphocyte percentages in formalin-fixed Staph-a injected larvae increased moderately from 72.7±0.6% to 82.6±0.4% over the first six hours, followed by a rapid decrease to 70.2±0.6% by 43-h post-injection. A recovery trend then was exhibited after 93-h towards the initial percentages.

Monocytes and neutrophils percentages of total leucocytes decreased significantly (monocytes decreased from 23.2±0.5% to 14.8±0.3% and neutrophils from 4.1±0.2% to 2.6±0.2%, p=0.0001) in the first six hours post injection but rebounded strongly after 43 hours in the formalin-fixed Staph-A challenged larvae.

Unlike monocytes, neutrophils in formalin-fixed Staph-A challenged larvae did not exhibit an increase to those in saline injected larvae until after 18 hours post injection. Leucocyte distributions return to the initial values by 141 hours post injection.

Dietary DHA:AA Effects on Larval Immune Response

Overall, larval fish fed diets high in DHA had a lower percentage of lymphocytes and higher percentages of both monocytes and neutrophils during all sampling periods. Larvae fed higher amounts of AA also had higher percentages of both monocytes and neutrophils at all time points. However, the maximum dietary effect on leucocytes distribution was achieved at the highest dietary combination of both DHA and AA (DHA—21.6 and AA—24.8 mg $g^{-1}$ lipids).

Figure 5:
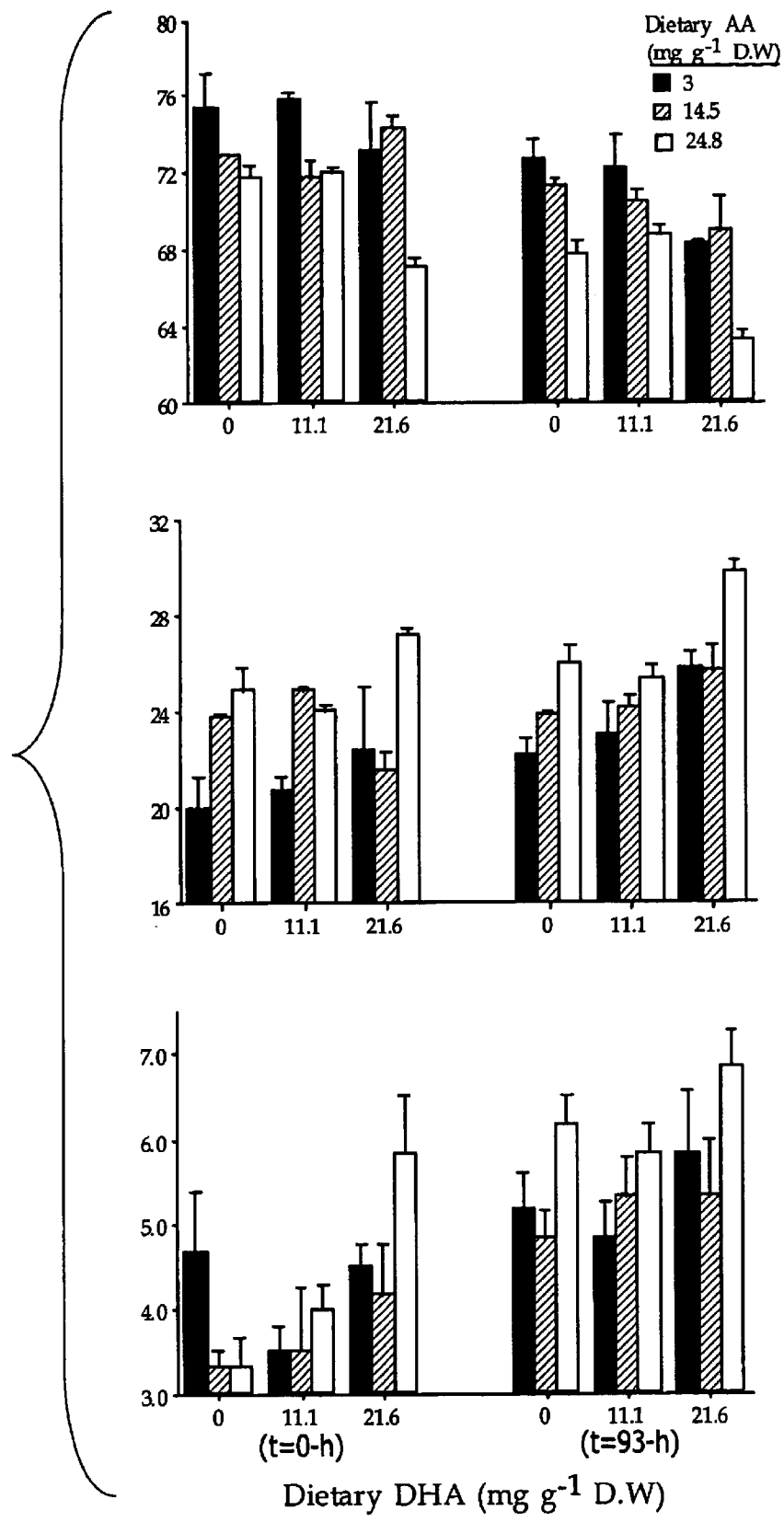
FIG. 5. Dietary DHA and AA effect on the fractional distribution of striped bass larvae blood leukocytes. Larvae were previously fed from day 24 to day 66 post-hatching with *Artemia nauplii* enriched with varying proportions of DHA and AA. Larvae were then injected with formalin-fixed *Staphylococcus aurous,* and the fractional distribution of blood lymphocytes, monocytes and neutrophils was measured at times 0-h and 93-h post injection. Error bars indicate the SEM of duplicate treatments.

FIG. 5 presents the leucocytes fractional distribution in formalin-fixed Staph-a challenged larvae as a function of various dietary combinations of DHA and AA at times 0-h and 93-h, the points of maximum effect.

In FIG. 5, lymphocyte percentage, monocyte percentage, and neutrophil percentage (upper, middle and lower portions of the figure) are plotted at time 0 (left-hand part of each of the upper, middle and lower portions of the figure) and 93 hours (right-hand part of each of the upper, middle and lower portions of the figure), with the dietary DHA level (in mg per gram dry weight) of 0, 11.1 and 21.6 being identified on the graph.

At time 0-h, lymphocyte percentage was highest in both AA and DHA deficient larvae and lowest in larvae fed highest amounts of both DHA and AA (75.3±1.9% and 67.0±0.6%, respectively). This same pattern exists at 93-h where increasing dietary levels of either DHA or AA were associated with a decreasing percentage of lymphocytes.

The proportional distribution of monocytes was changed in an opposite direction to the lymphocyte change at both sampling time points, being lowest (20.0±1.3%) in deficient larvae and highest (27.2±0.3%) in high DHA and AA fed larvae. Neutrophils, although representing only a few percent in the total leucocytes population, responded dramatically to formalin-fix Staph-a challenge. Neutrophil abundance at time 0-h was high in both deficient diets or high DHA and AA fed larvae (4.7±0.7% and 5.8±0.6% respectively) and changed little by 93-h post injection. All other dietary combinations of DHA and AA, except these two extreme levels, were associated with lower initial neutrophils percentages and with a strong redistribution at time 93-h (FIG. 5). However, the effect of increasing levels of dietary AA on neutrophil response was more dramatic than the effect of increasing levels of dietary DHA (F-values for DHA—12.9 and for AA—23.5).

Discussion

Growth rates of striped bass larvae were depressed by increasing levels of dietary DHA. This result was unanticipated in view of the marine habitat of this species, and since previous studies indicated that striped bass larvae emulate marine fish regarding their EFA nutrition and bioconversion capabilities of linolenic acid (18:n3) to longer n-3 PUFAs (Tuncer and Harrell 1992; Watanabe 1993; Webster and Lovell 1990). It is possible that the n-3 PUFA requirement for larval growth was sufficiently met by EPA in the Artemia nauplii, which could be converted to DHA in critical tissues such as brain and neural system tissues. It is also possible that the striped bass larvae adapted to the low salinity environment (2–4-psu), and reduced the requirement for n-3 PUFAs. In support of this explanation, Lall and Bishop (Lall and Bishop 1979) found that dietary inclusion of n-3 PUFA was more critical if rainbow trout were raised in salt water rather than in fresh water. Other studies have shown that changes in salinity can profoundly affect biosynthetic activity and fatty acid composition in fish cell membranes. For example, Leray et al. (Leray et al. 1984) observed that the transfer of fish from fresh water to seawater was associated with a significant increase in phospholipid DHA content.

Although DHA was not directly required for striped bass larval growth in the present study, an increased mortality was evident when the larvae fed the DHA deficient diet were challenged with high-salinities, indicating that DHA may be required more specifically for osmoregulatory homeostasis.

In contrast to the adverse effect of dietary DHA, larval growth was significantly improved by the dietary addition of AA at optimal levels of 14.5-mg $g^{-1}$ lipids. While some preliminary study has been conducted showing a positive effect of dietary AA on fish growth, e.g., Estevez et al. 1997 (Estevez et al. 1997) and Castell et al. (Castell et al. 1994), other study of high level dietary AA has found no growth improvement (Estevez et al. 1999).

In the present work, the low AA level in the Artemia (3 mg $g^{-1}$ dry weight) was found to be insufficient to enhance growth in striped bass larvae and low AA fed larvae were most vulnerable to high-salinity exposure. Low AA dietary intake has been implicated in impaired eicosanoid production resulting in improper ratios of prostaglandins of the 2- and 3-series (Bell et al. 1996; Famdale et al. 1999). These fatty acid metabolites play a central role in modulating fluid and electrolyte balance in gill membranes (Van Praag et al. 1987). Recently, a dietary AA/EPA ratio of 1:1 for sea bass larvae, and an even lower 1:10 for turbot and halibut larvae, has been proposed (Sargent et al. 1999), but our own work indicates a higher optimal dietary AA/EPA ratio of 3:1 in striped bass larvae.

In this respect, it is to be noted that hydromineral disturbances involving variation in salinity and chemical make-up of the aqueous medium in which the larvae are cultured, can force the larvae to produce and leach large quantities of the AA metabolite—eicosanoids via the AA cascade. Evidence in the marine bivalve, Modiolus demissus, have shown that hypo-osmotic shock in low water salinity or in magnesium free seawater significantly increased the release of prostaglandins into the water (Freas and Grollman 1980).

Additionally, increased AA requirements are attributable to the extensive activities in metamorphosis of cell proliferation and apoptosis, in which AA and its metabolites play critical roles. AA involvement in cellular activities including cell proliferation, migration, and regulation of gene expression and enzyme activities such as phospholipases and kinases, has been the subject of recent mammalian studies (Kang et al. 1999; Rizzo et al. 1999; Shin et al. 1999).

Elevation of the level of cellular AA prior to larval metamorphosis, by dietary manipulations in accordance with the present invention, can be employed to facilitate and enhance the transformation of the larvae to its fish adult stage, in a timely and successful manner. The specific nutritional requirement for AA during critical periods of fish larval development may be readily empirically determined within the skill of the art, based on the disclosure herein.

Our results indicate that increasing levels of dietary AA can modulate the basal level of cortisol, while dietary increase in DHA modulates the kinetics of the cortisol response to high-salinity exposure. Basal cortisol levels in striped bass larvae varied between 106 and 142 pg $mg^{-1}$ dry weight and increased up to 192 pg mg$^{-1}$ dry weight after challenge. Assuming that approximately 90% of larval body mass is water and 5% blood, these basal cortisol values may be converted to blood concentrations in ng ml$^{-1}$ plasma for comparison with other cortisol studies in teleost fish. Cortisol baseline levels thus are from about 200 ng ml$^{-1}$ plasma up to about 400 ng ml$^{-1}$ plasma in stressed larvae. Typical levels of cortisol in unstressed fish are lower than 10 ng ml$^{-1}$ plasma, while in stressed fish plasma cortisol levels vary greatly between species. Levels as low as 53–125 ng ml$^{-1}$ have been reported in red gumard, Chelidonichthys kumu (Clearwater and Pankhurst 1994; Pankhurst and Sharples 1992), and cortisol levels of over 500 ng ml$^{-1}$ plasma have been measured in stressed coho salmon, Oncorhynchus kisutch (Mazeaud et al. 1994). Even higher cortisol levels (742-ng ml$^{-1}$ plasma) have been reported for subadult striped bass fish (215–260 mm standard length) exposed to a standardized confinement stress (Noga et al. 1994). Based on these comparisons, the striped bass larvae in the present study were already stressed at time-zero.

Cortisol is important to acquiring salt-water tolerance since it stimulates branchial Na$^+$, K$^+$-ATPasc activity and cellular differentiation of chloride cells (Khalfoun et al. 1997; Uchida et al. 1998). Animal models have suggested involvement of AA in the activity of interrenal axis through eicosanoids metabolites (Bemardini et al. 1989; Cambronero et al. 1992). AA metabolites have been studied in connection with expression of corticotropin-releasing factor (CRF) along the hypothalamus-pituatary-interrenal axis (Abou-Samra et al. 1986; Bemardini et al. 1990; Cambronero et al. 1992; Kuhn et al. 1998; Rollins-Smith 1998); see also (Ando et al. 1999) (stress response in salmonids).

Dietary increases in DHA exert a marked influence on both the magnitude of the cortisol response and immune responses to bacterial challenge, probably by modifying eicosanoid production and initiating a rise in the intracellular levels of reactive oxygen species (ROS) and lipid peroxidation products (Maziere et al. 1999). These abundant sources of free radical substances act as a stress stimuli that enhance cortisol response, which also lead to a redistribution and change in the functionality of blood leucocytes (Demers and Bayne 1997; Dhabhar et al. 1996). In the longer term, cortisol acts as an immuno-depressant and may exert deleterious effects on the activity of the immune system. However in the near term, the stress immunosuppressive effects may be preceded by a short-term enhancement (Demers and Bayne 1997). The present study did not reveal a dietary effect on the chronic level of cortisol before exposure to stress, since cortisol levels were already elevated (time-0). However, the data clearly show that larvae fed diets deficient in both DHA and AA produce a weak response to pathogen challenge, evident by the insignificant change in monocytes and neutrophils after 93-h following the formalin fixed Staph-A injection. Considering these results with other investigative efforts showing that dietary deficiencies in EFA produced a chronic elevation of cortisol (Montero et al. 1998), we conclude that EFA deficient diets may be responsible for chronic elevation of blood cortisol with potential immunosuppressive consequences.

Striped bass, even as two-month olds, possess a well-developed lymphoid system, as indicated by the presence of functional white blood cells and by their effective inflammatory response to foreign antigen. Generally in fish, especially at their early larval stage, the non-specific immunity is the key element in the host's defense reaction against pathogenic organisms (Jeney et al. 1997; Olivier et al. 1986; Vadstein 1996). The ability to mount cellular and humoral immune responses has been demonstrated in early stages in all fish classes, including jaw-less fishes—the most primitive vertebrates (Skjermo et al. 1995). For example, two-month old rockfish (*Sebastiscus marmoratus*) were able to mount an antibody response against sheep red blood cells and even elicit an allograft response in the same fashion as adults (Nakahishi 1986). In the carp, *C. carpio*, lymphocytes were able to reject allograft as early as day 16 post hatch (Botham and Manning 1981). Protective immunity is also evident in two-week-old rainbow trout, *Salmo gairdneri* (Tatner and Home 1983). Considering the inhibitory effects of n-3 PUFA, and especially DHA, on the function of the immune system, through lymphocyte proliferation and production of inactive inflammatory mediators such as prostaglandin E$_2$ (PGE$_2$) and leucotriene B$_4$ (LTB$_4$) (Harbige 1998; Kelley et al. 1999), it appears that excessive feeding of larvae with DHA may acutely compromise host immunity. In fact, our present results effectively demonstrate that either deficient or excessive doses of PUFA in larval diets can exert undesirable effect on the lymphoid system, associated with the chronic elevation in the proportional distribution of neutrophils at both dietary extremes.

Our work also showed that the larval non-specific immune response, expressed by the relative change in neutrophils and monocytes distribution, was more responsive to increasing levels of dietary AA than to increasing levels of dietary DHA. See (Thompson et al. 1996) (Atlantic salmon, *S. salar*, fed diets low in n-3/n-6 PUFA ratios were less resistant to infection than fish fed diets with high ratio of n-3/n-6 PUFA). Peripheral blood monocytes can function as accessory cells in the immune response through the secretion of cytokines, while neutrophils function as phagocytic cells. N-3 fatty acids are highly susceptible to oxidative degradation as compared to n-6 fatty acids (Mehta et al. 1994), and production of highly toxic ROS is the principal mechanism by which the non-specific immune system invokes its response.

Dietary DHA is more effective in facilitating a stronger response to a given number of leukocytes than dietary AA, probably through its highly degradable oxidative intermediates. This property of DHA in provoking stronger immune response was masked in the striped bass larvae injected with inviable Staph-a, since the fish larvae coped with this challenge over a period of six days post injection.

Our findings show that the amount, type and proportion of dietary essential fatty acids impact both stress and non-specific immune systems in fish larvae, and that such responses are more susceptible to dietary changes in AA than in DHA. Our results show that dietary manipulation of both DHA and AA dietary levels and ratios restrains the negative effects of environmental stress. Deficient or excessive dietary amounts of either DHA or AA can impair stress and immune functions in fish larvae.

EXAMPLE 2

In this example, we examined the extent to which extreme nutritional levels of DHA or AA or a combination of both would modulate lipid composition in larval tissues, in order to establish the combined nutritional requirements for both DHA and AA. The animals used in this study were metamorphosed white bass larvae (day 24–46), which were at a sensitive developmental stage in which high mortality generally occurs during normal culturing.

Materials and Methods

Formulation of enrichment emulsions. A 3×3 factorial design (two factors, DHA and AA at nine different combinations in duplicate blocks) was used to simultaneously study the effect of increasing dietary levels of DHA and AA on larval performances. Nine different emulsions having varying proportions of DHA-rich triacylglycerols from heterotrophically grown algae, Crypthecodinium spp. and AA-rich triacylglycerols from fungus, Mortierella spp. (DHASCO and ARASCO, Martek BioSci. Columbia, Md.) were formulated (Table.2). Triacylglycerol of the algae Crypthecodinium sp. and the fungi Marteriella sp. contain 49% DHA and 54% AA of the total fatty acids, respectively, and less than 0.5% EPA. A mixture of 2% alginic acid, 2% polyoxyethylene sorbitan mono-oleate (Tween-80), 1% ascorbic acid, 1% vitamin-E, 1% silicon based anti foaming agent (all made by Sigma Co. Mo.) and 5% soy lecithin (80% phosphatidylcholine, Archer Daniels Midland Co., Decatur, Ill.) were added to the oils (all additions made by weight). Oil mixtures were emulsified with equal amounts of distilled water by first homogenizing at low speed (Ultra-turrax T8, IKA Labortechnik, Staufen, Germany) for 15 seconds and then sonicating for an additional 15 seconds at one-third of the maximum sonication energy level (Sonifier 450, Branson Sonic Power Company, Danbury, Conn.). Fresh emulsions were prepared on a weekly base and stored at 4° C. for daily use.

drated in fresh water for 1 h and decapsulated in 0.1M NaOH solution containing 3% active chlorine. Hatching was carried out in 20 psu artificial seawater at 28 C., provided with vigorous aeration. The nauplii were harvested after 16 h, separated from unhatched cysts and hatching debris, thoroughly rinsed, and kept at room temperature for an additional 6–8 h until they reached instar-II stage (complete development of digestive system) before being transferred to the enrichment medium. A dose of 0.4 g/liter of each enrichment emulsion (doses were based on the oil quantity in the emulsion) was fed to Instar II-stage *Artemia nauplii* (200,000 *nauplii* per liter) at time 0 (17:00).

At 09:00 the following day (after 16 h) half of the *nauplii* were removed and fed to larvae. An additional 0.2 g/liter of enrichment emulsion was added and the remaining *nauplii* fed to the larvae at 16:00. A random set of samples of 16 h enriched *Artemia nauplii* were analyzed for lipid and fatty acid composition (Table 3).

TABLE 2

Lipid mixtures and fatty acid composition of the enrichment diets (% w/w and % of total fatty acids, respectively)

| TAG source | Diet #1 | Diet #2 | Diet #3 | Diet #4 | Diet #5 | Diet #6 | Diet #7 | Diet #8 | Diet #9 |
|---|---|---|---|---|---|---|---|---|---|
| DHA-TAG | 0 | 25 | 50 | 0 | 25 | 50 | 0 | 25 | 50 |
| AA-TAG | 0 | 0 | 0 | 25 | 25 | 25 | 50 | 50 | 50 |
| Olive-oil | 100 | 75 | 50 | 75 | 50 | 25 | 100 | 25 | 0 |
| FAME | | | | | | | | | |
| 14:0 | 2.8 | 5.3 | 7.1 | 2.4 | 5.0 | 7.6 | 1.7 | 4.4 | 7.5 |
| 16:0 | 6.3 | 7.0 | 8.2 | 6.6 | 7.6 | 8.9 | 7.0 | 8.5 | 9.8 |
| 16:1 | 5.2 | 7.6 | 5.7 | 7.5 | 5.5 | 3.5 | 5.1 | 3.1 | 0 |
| 18:0 | 1.6 | 1.2 | 0.7 | 3.8 | 3.7 | 3.8 | 6.1 | 6.3 | 6.6 |
| 18:1 | 80.4 | 64.8 | 51.9 | 62.1 | 49.2 | 37.8 | 46.2 | 34.9 | 20.9 |
| 18:2 | 3.3 | 4.0 | 3.2 | 5.1 | 4.7 | 4.5 | 6.1 | 5.7 | 5.0 |
| 20:4n-6 | 0 | 0 | 0 | 12.6 | 12.7 | 12.8 | 24.6 | 24.8 | 26.9 |
| 20:5n-3 | 0 | 0 | 0 | 0 | 0 | 0 | 0 | 0.6 | 0 |
| 22:6n-3 | 0.3 | 10.1 | 20.3 | 0 | 11.5 | 21.2 | 2.6 | 11.7 | 23.3 |
| Total Sat | 10.8 | 13.5 | 16.0 | 12.7 | 16.4 | 20.3 | 14.8 | 19.2 | 23.9 |
| Total Mono | 85.6 | 72.4 | 56.6 | 69.5 | 54.7 | 41.3 | 51.3 | 38.0 | 20.9 |
| Total Diene | 3.3 | 4.0 | 3.2 | 5.1 | 4.7 | 4.5 | 6.1 | 5.7 | 5.0 |
| Total Poly | 0.3 | 10.1 | 20.3 | 12.6 | 24.2 | 34.0 | 27.7 | 37.1 | 50.1 |

Abbreviation: Total Sat: percentage of saturated fatty acids in the diet, Total Mono: percentage of fatty acids containing one double bond, Total Diene: percentage of fatty acids containing two double bonds, Total poly: percentage of fatty acids containing three or more double bonds. DHA-TAG and AA-TAG are DHA and AA-rich triacylglycerols (49% DHA and 54% AA, respectively, obtained from Martek BioSci. Inc); commercial olive oil was obtained locally.

Enrichment of *Artemia nauplii*. Artemia cysts (premium grade, Sanders Brine Shrimp Co., Ogden, Utah) were dehy-

TABLE 3

Lipid and fatty acid composition of *Artemia nauplii* after 16 h enrichment with various DHA:AA dietary ratios (mg/g dry weight).

| | Diet #1 | Diet #2 | Diet #3 | Diet #4 | Diet #5 | Diet #6 | Diet #7 | Diet #8 | Diet #9 |
|---|---|---|---|---|---|---|---|---|---|
| Total Lipids | 224 | 244 | 265 | 251 | 243 | 267 | 226 | 251 | 252 |
| FAME | | | | | | | | | |
| 14:0 | 0.6 | 3.1 | 3.9 | 0.6 | 1.5 | 2.9 | 0.7 | 1.4 | 2.4 |
| 16:0 | 12.8 | 22.6 | 21.4 | 12.6 | 16.8 | 16.8 | 14.1 | 14.3 | 15.3 |
| 16:1 | 1.9 | 2.3 | 2.6 | 1.7 | 2.3 | 2.4 | 1.9 | 2.0 | 2.2 |
| 18:0 | 8.3 | 10.5 | 9.8 | 8.4 | 11.0 | 10.0 | 10.6 | 10.2 | 10.2 |
| 18:1 | 103.2 | 140.5 | 119.6 | 99.4 | 105.2 | 89.1 | 97.4 | 81.6 | 69.5 |
| 18:2 | 10.4 | 9.7 | 8.8 | 12.1 | 12.8 | 10.6 | 13.7 | 13.1 | 12.9 |
| 20:4n-6 | 1.5 | 2.8 | 4.9 | 12.5 | 15.4 | 15.7 | 23.9 | 25.0 | 25.3 |
| 20:5n-3 | 2.9 | 4.4 | 6.0 | 2.1 | 4.7 | 5.5 | 2.4 | 4.1 | 5.2 |
| 22:6n-3 | 0.0 | 5.0 | 13.0 | 0.4 | 3.8 | 8.3 | 0.5 | 4.1 | 7.4 |

TABLE 3-continued

Lipid and fatty acid composition of Artemia nauplii after 16 h enrichment with various DHA:AA dietary ratios (mg/g dry weight).

|  | Diet #1 | Diet #2 | Diet #3 | Diet #4 | Diet #5 | Diet #6 | Diet #7 | Diet #8 | Diet #9 |
|---|---|---|---|---|---|---|---|---|---|
| Total Lipids | 224 | 244 | 265 | 251 | 243 | 267 | 226 | 251 | 252 |
| 22:5n-3 | 0.0 | 0.0 | 0.5 | 0.0 | 0.0 | 0.4 | 0.0 | 0.0 | 0.4 |
| Total Sat | 13.0 | 12.7 | 15.5 | 13.3 | 14.4 | 15.7 | 14.0 | 16.1 | 16.7 |
| Total Mono | 78.6 | 67.5 | 59.5 | 63.4 | 57.6 | 53.6 | 54.7 | 54.5 | 45.5 |
| Total Diene | 5.7 | 5.3 | 4.8 | 6.1 | 6.2 | 5.8 | 7.1 | 6.9 | 6.6 |
| Total Poly | 2.7 | 14.5 | 20.1 | 17.3 | 21.7 | 24.8 | 24.2 | 22.5 | 31.2 |

See the footnote of Table 2 for abbreviations.

Larvae rearing. Newly hatched white bass, *Morone chrysops* larvae were obtained from AquaFutures Inc. (Turners Falls, Mass.). Larvae were grown for 17 days on rotifers, *Bracionus plicatilis* (2–5 rotifers/ml), which had been cultured on fresh water Chlorella (Martek BioSci. Inc. Columbia, Md.) paste (0.5 g/10$^6$ rotiferes/day). Larvae were randomly distributed in eighteen 60-liter larval rearing tanks at an initial density of 160 larvae per tank. The tanks were gently aerated and the water volume exchanged 1–2 times per day with biofiltered, U.V treated recirculating water. A 14:10 h light:dark photoperiod was maintained using fluorescent light tubes (Daylight; 40 watts; 800–1200 lux at the water surface). Temperature was maintained at 242° C. and salinity at 2–6 psu. Water quality was monitored daily and levels of total $NH_3$, unionized $NH_3$, $NO_2$ and pH were maintained below 0.2 ppm, 0.001 ppm, 0.3 ppm and at 8.02, respectively. Samples of 40 seventeen-day old larvae were taken for initial dry weight determinations (lyophilized to constant weight) and fatty acid analysis.

Newly hatched *Artemia nauplii* were introduced to the larvae from day 17 until day 24 (once a day at 20–40 nauplii/liter), while rotifer concentration was gradually reduced to complete removal by day 24. Larvae were then fed twice daily with previously enriched *Artemia nauplii*, as described above, at a concentration of 50–100 *nauplii*/liter for the next 22 days.

Feeding experiments were terminated on day 46, at which time 40 larvae were sampled from each rearing tank. Samples were washed with distilled water, dried on paper towels, placed into test tubes and lyophilized to constant weight. The dry weight of each larva was recorded to the nearest 0.1 g Nettler UMT2, Toledo, Switzerland). Muscle tissue, gill tissue and eyes (including contiguous brain tissue) were separated from freeze-dried larvae from each tank using a sharp forceps. Survivorship was determined based on the initial and final count of larvae in each rearing tank.

Lipid and fatty acid analysis. Total lipids were extracted from enriched *Artemia nauplii*, larvae muscle, gills and brain/eye tissues according to the method of Folch et al., 1957. Lipid weight was determined gravimetrically and expressed as percent dry weight. The fatty acid composition of total lipids from Artemia nauplii and larvae muscle, gills and brain/eye tissues were determined following the method of Morisson and Smith 1964. The lipid extracts, including internal standards (19:0 and 21:0 fatty acids, NU-Chek-Prep, Inc., Elysian, Minn.) were saponified with saturated KOH in methanol and methylated with 10% (w/w) $BF_3$/methanol (Supelco Inc., Bellefonte, Pa.). The fatty acid methyl esters were analyzed using a Hewlett-Packard 5890A gas chromatograph, equipped with a flame ionization detector and a 30 m×0.25 mm ID capillary column with 0.25 m film thickness (DB WAX, J&W Scientific, Folson, Calif.). The carrier gas was helium at 1 ml/min flow rate. Injector and detector temperature was 300° C. and the oven temperature was programmed from initial temperature and time of 50° C. and 2 min to 200° C. in 16 min, from 200° C. to 210° C. in 11 min and from 210° C. to 220° C. in 18 min. The integrated peak areas of the fatty acid methyl esters were identified by comparison with known standards and quantified through the use of known amount of internal standards.

Statistical analysis. Both Artemia nauplii enrichment and larvae feeding experiments were arranged in a complete block design (2 blocks), including DHA and AA as factors. All data were reported as means SEM. Analysis of variance was used (ANOVA, Statview 4.5, Abacus Concepts, Inc., Berkely, Calif., 1992) to determine differences between and within treatment means of survival, weight, lipid content and fatty acid composition. Percentage data were normalized by arcsine transformation prior to analysis. When significant differences between the means were detected, a Bonferroni multiple comparison test was applied. A significance level of 95% (P<0.05) was used throughout.

Results

Retention of lipid and fatty acids in *Artemia nauplii*. Table 3 presents the lipid and fatty acid composition in *Artemia nauplii* after enrichment for 16 h with various DHA/AA ratios. Overall, Artemia retained equal amounts of dietary lipids (P>0.05) regardless of enrichment treatments, whereas the essential fatty acid (EFA) composition reflected that of the dietary composition. However, retention efficiency of dietary EFA was significantly different (P<0.05) among treatments. AA retention by the Artemia was almost four times higher than that of DHA retention (25.3 mg AA/g dry weight versus 7.4 mg DHA/g dry weight).

Figure 6:
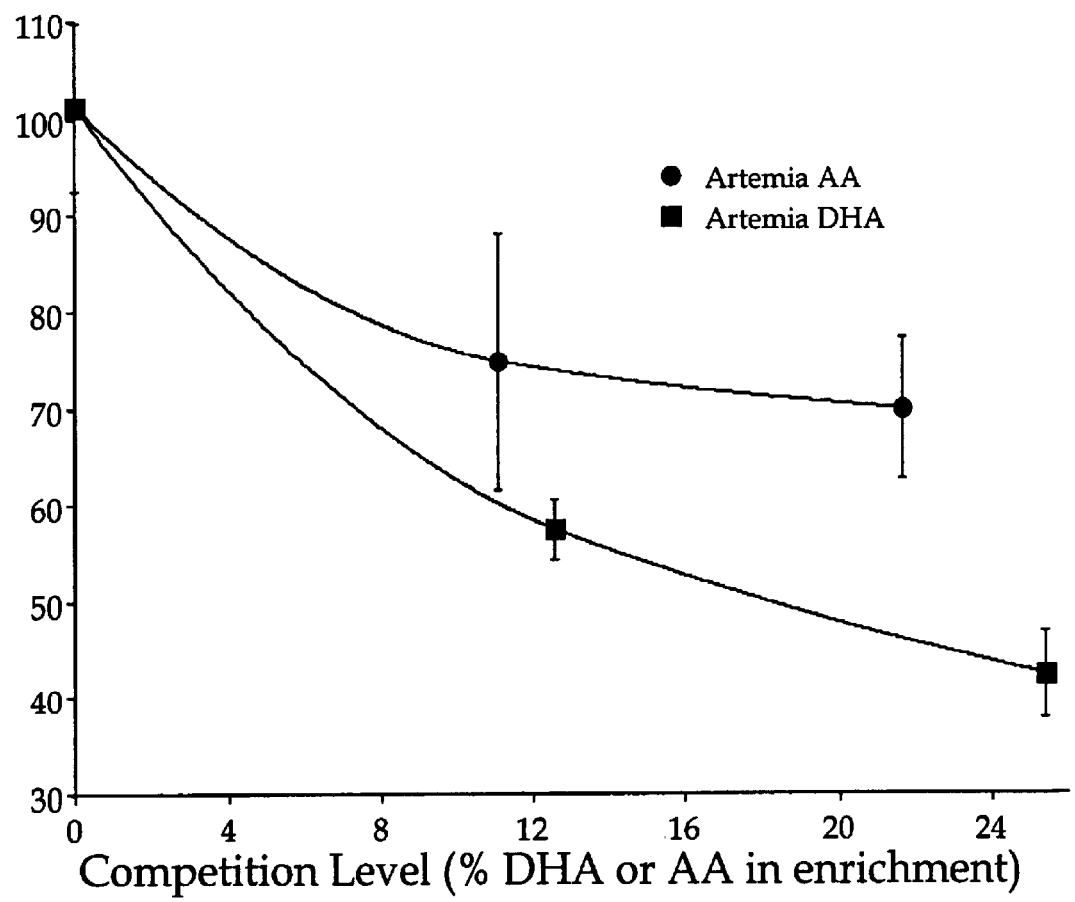

Retention efficiency of dietary AA and DHA by the Artemia as a function of increased competition between the two fatty acids is shown in FIG. 6. A reduction of over 55% of maximal DHA retention was observed in the presence of increasing levels of dietary AA, whereas reduction in AA retention as a result of increasing competition by dietary DHA was only 25% of its maximum levels. Moreover, the proportion of AA in Artemia lipids was generally equal to its dietary proportion, whereas DHA proportion was almost 25% lower than its dietary proportion. As a result of retro-conversion activities of the absorbed DHA, the relative proportion of EPA metabolite in Artemia lipids was also increased from its basal level of 1.6% of total fatty acids but leveled off at 3.5% of total fatty acids.

The highest production rate of EPA occurred at 2–4:1 DHA/EPA ratios (FIG. 7), while at higher ratios (DHA/EPA>4:1) the retro-conversion rate was reduced dramatically. The net increase in Artemia EPA was estimated to be approximately 20% that of the corresponding DHA increase, based on the mg/g dry weight values (net percentage increase in EPA/net increase in EPA+DHA) as derived from the data in Table 3.

Dietary effects on larval growth and survival. Larval growth was significantly affected after 22 days of dietary treatments (FIG. 8, P<0.05), while larval survival was not significantly different (64.91.7%, P>0.05). Larvae grew significantly slower (P<0.05) when fed a DHA-deficient Artemia diet regardless of AA levels.

Increasing dietary AA content at moderate DHA level (11.1% DHA of total fatty acids in enrichment lipids) resulted in a significant growth inhibition, as larval growth was reduced from 21.3±1.8 mg dry weight at no dietary AA to only 13.1±1.5 mg dry weight at 25.4% AA of enrichment total fatty acids (P<0.05). The growth inhibitory effect of high dietary AA was nearly eliminated by the inclusion of high dietary DHA level (21.6% DHA of total fatty acids in enrichment lipids). Nevertheless, increasing enrichment levels of DHA above 11.1% of total fatty acids regardless of AA levels did not result in further improvement in larval growth.

Dietary effects on lipid and fatty acid composition of larval body tissues. Larval total lipid content was not affected by dietary treatments (17.1±0.5% dry weight in all dietary groups, P>0.05). At the beginning of the experiment (at day 24), larval muscle and gill lipids were largely composed of monounsaturated fatty acids (49.2% and 47.7% of all fatty acids, respectively, Table 4), while the largest proportion of polyunsaturated fatty acids was found in brain/eye tissue lipids (44.6% of all fatty acids).

TABLE 4

Fatty acid composition of larvae white bass body tissues at the start of feeding experiment (mg/g dry weight)

| FAME | Muscle | Brain and eyes | Gills |
|---|---|---|---|
| 14:0 | 0.7 | 2.1 | 0.8 |
| 16:0 | 6.5 | 16.3 | 14.6 |
| 18:0 | 3.2 | 9.1 | 10.1 |
| 16:1 | 2.2 | 2.8 | 1.9 |
| 18:1 | 28.0 | 21.3 | 34.7 |
| 18:2 | 3.6 | 2.7 | 5.3 |
| 20:4 | 0.8 | 1.9 | 3.1 |
| 20:5 | 4.2 | 5.1 | 3.6 |
| 22:5 | 0 | 2.4 | 0 |
| 22:6 | 2.3 | 7.9 | 1.8 |
| Toal Sat | 20.2 | 38.4 | 33.6 |
| Total Mono | 59.1 | 33.7 | 48.2 |
| Total Diene | 7.0 | 3.8 | 7.0 |
| Total Poly | 14.2 | 24.2 | 11.2 |

See the footnote of Table 2 for abbreviations.

After 22 days of feeding the larvae with varying DHA/AA ratios, the lipid composition of all larvae tissues was responsive to dietary changes. However, most changes occurred in the proportion of both monounsaturated (n=1) and polyunsaturated (n>2) fatty acid classes. The proportion of polyunsaturated fatty acids in brain/eye tissue lipids increased from 31.0±1.1% to a maximum of 54.1±0.8%. The dramatic increase in the proportion of polyunsaturated fatty acids in brain/eye lipid was at the expense of a corresponding decrease in the proportion of monounsaturated fatty acids (Table 5).

TABLE 5

Fatty acid composition of larvae white bass brain and eye tissue after 22 days of dietary treatment (mg/g dry weight)

| FAME | Diet #1 | Diet #2 | Diet #3 | Diet #4 | Diet #5 | Diet #6 | Diet #7 | Diet #8 | Diet #9 |
|---|---|---|---|---|---|---|---|---|---|
| 14:0 | 0.6 ± 0.5 | 0.8 ± 0.6 | 1.8 ± 0.1 | 0 | 0.7 ± 0.5 | 1.8 ± 0.2 | 0.90.5 | 0 | 1.5 ± 0.1 |
| 16:0 | 23.62.5 | 29.21.4 | 30.50.7 | 21.4 ± 0.4 | 26.4 ± 1.2 | 31.6 ± 2.7 | 31.7 ± 5.0 | 26.1 ± 0.2 | 29.3 ± 0.5 |
| 18:0 | 15.11.3 | 18.01 | 18. ± 40.4 | 13.8 ± 0.3 | 16.6 ± 0.8 | 19.4 ± 1.2 | 20.4 ± 3.1 | 17.10 | 19.1 ± 0.7 |
| 16:1 | 4.10.1 | 4.00.4 | 3.10.2 | 3.10 | 3.0 ± 0.1 | 3.0 ± 0.3 | 4.6 ± 0.3 | 2.6 ± 0.1 | 2.1 ± 0.1 |
| 18:1 | 82.4 ± 12.6 | 68.0 ± 6.2 | 53.3 ± 4.5 | 52.8 ± 0.9 | 53.3 ± 2.0 | 52.6 ± 5.4 | 80.31 ± 0.3 | 47.7 ± 1.5 | 38.7 ± 4.2 |
| 18:2 | 9.8 ± 1.5 | 7.1 ± 0.4 | 5.5 ± 0.5 | 6.10 | 6.1 ± 0.2 | 6.2 ± 0.5 | 10.6 ± 1.3 | 6.2 ± 0.3 | 5.0 ± 0.6 |
| 20:4 | 6.5 ± 0.2 | 4.1 ± 0.1 | 3.5 ± 0.3 | 32.4 ± 1.4 | 23.2 ± 0.8 | 20.3 ± 0.3 | 59.9 ± 10 | 30.1 ± 0.7 | 22.7 ± 1.6 |
| 20:5 | 14.8 ± 1.0 | 12.4 ± 0.7 | 10.81 | 7.1 ± 0.3 | 7.2 ± 0.3 | 8.1 ± 0.5 | 9.2 ± 1.3 | 6.8 ± 0.1 | 6.2 ± 0.7 |
| 22:5 | 4.2 ± 0.1 | 3.7 ± 0.1 | 0 | 4.9 ± 0.4 | 3.2 ± 0.1 | 3.30 | 7.6 ± 1.3 | 3.3 ± 0.1 | 3.2 ± 0.2 |
| 22:6 | 1.8 ± 0.2 | 62.7 ± 3.4 | 79.8 ± 0.5 | 3.20 | 46.8 ± 0.9 | 65.7 ± 5.6 | 7.5 ± 1.2 | 37.81 | 58.2 ± 0.7 |
| Total Sat | 24.4 ± 0.1 | 22.7 ± 0.1 | 24.6 ± 0.3 | 24.3 ± 0.2 | 23.4 ± 0.6 | 24.9 ± 0.1 | 22.7 ± 0.4 | 24.3 ± 0.2 | 26.9 ± 0.5 |
| Total Mono | 53.2 ± 0.1 | 34.3 ± 0.8 | 27.2 ± 1.1 | 38.6 ± 0.4 | 30.2 ± 0.1 | 26.1 ± 0.5 | 36.6 ± 1 | 28.3 ± 0.6 | 21.7 ± 1.1 |
| Total Diene | 6.2 ± 0.1 | 3.3 ± 0.1 | 2.7 ± 0.1 | 4.2 ± 0.1 | 3.30 | 2.90 | 4.6 ± 0.1 | 3.5 ± 0.1 | 2.6 ± 0.1 |
| Total Poly | 16.5 ± 0.7 | 39.5 ± 0.7 | 45.6 ± 1.1 | 32.9 ± 0.7 | 43.1 ± 0.5 | 46.0 ± 0.3 | 36.1 ± 0.6 | 43.8 ± 0.5 | 48.6 ± 0.8 |

See the footnote of Table 2 for abbreviations.
Larvae were fed on *Artemia nauplii* enriched with nine different diets containing varying proportions of DHA:AA rich oils. Dietary ratios were formulated according to 3 × 3 factorial design at levels of 0, 12.5 and 25% of each essential fatty acids (detailed composition of diets and enriched Artemia are presented in Tables 1. and 2.). Data are mean SEM values for two blocks.

The same pattern of response to dietary changes was observed in larval muscle and gill tissues, although the alteration was not as pronounced (Tables 6,7).

minor selectivity to DHA, mostly at lower than 5% of total dietary fatty acids as compared to their 3–5 times higher selectivity for AA at lower dietary levels.

TABLE 6

Fatty acid composition of larvae white bass muscle tissue after 22 days of dietary treatment (mg/g dry weight)

| FAME | Diet #1 | Diet #2 | Diet #3 | Diet #4 | Diet #5 | Diet #6 | Diet #7 | Diet #8 | Diet #9 |
|---|---|---|---|---|---|---|---|---|---|
| 14:0 | 0.2 ± 0.2 | 0.7 ± 0.1 | 1.1 ± 0.1 | 0.2 ± 0.2 | 0.7 ± 0.1 | 1.1 ± 0.2 | 0.3 ± 0.3 | 0.8 ± 0.1 | 1.1 ± 0.1 |
| 16:0 | 7.8 ± 0.1 | 7.5 ± 0.7 | 7.5 ± 0.7 | 7.4 ± 0.7 | 8.5 ± 0.4 | 9.1 ± 1.2 | 7.3 ± 1.8 | 9.0 ± 0.5 | 10.1 ± 0.3 |
| 18:0 | 4.3 ± 0.1 | 3.2 ± 0.1 | 3.4 ± 0.3 | 4.1 ± 0.4 | 4.5 ± 0.3 | 4.7 ± 0.6 | 4.2 ± 1.0 | 5.0 ± 0.3 | 5.7 ± 0.1 |
| 16:1 | 2.3 ± 0.1 | 2.3 ± 0.2 | 2.2 ± 0.2 | 2.0 ± 0.3 | 2.0 ± 0.2 | 1.9 ± 0.3 | 1.8 ± 0.5 | 1.8 ± 0.1 | 1.6 ± 0.1 |
| 18:1 | 40.4 ± 0.1 | 37.1 ± 2.7 | 35.0 ± 3.6 | 35.1 ± 3.3 | 35.3 ± 2.9 | 36.2 ± 5.1 | 33.5 ± 8.5 | 36.12.5 | 35.20.2 |
| 18:2 | 4.6 ± 0.1 | 3.5 ± 0.2 | 3.5 ± 0.3 | 4.0 ± 0.5 | 4.1 ± 0.4 | 4.3 ± 0.5 | 4.5 ± 1.3 | 4.8 ± 0.3 | 4.8 ± 0.1 |
| 20:4 | 1.9 ± 0.1 | 1.0 ± 0.1 | 1.0 ± 0.1 | 11.3 ± 1.2 | 8.8 ± 1.3 | 8.1 ± 0.5 | 14.5 ± 4.2 | 13.1 ± 0.5 | 12.10.1 |
| 20:5 | 2.7 ± 0.1 | 2.8 ± 0.1 | 2.9 ± 0.3 | 1.4 ± 0.2 | 2.4 ± 0.3 | 2.9 ± 0.3 | 1.5 ± 0.5 | 2.20.1 | 2.80.1 |
| 22:5 | 0 | 0 | 0 | 0 | 0 | 0 | 0 | 0 | 0 |
| 22:6 | 0.4 ± 0.2 | 4.7 ± 0.1 | 8.1 ± 0.5 | 0.4 ± 0.0 | 5.3 ± 0.7 | 7.9 ± 1.1 | 0.7 ± 0.2 | 4.4 ± 0.1 | 7.6 ± 0.2 |
| Tot Sat | 19.1 ± 0.7 | 17.2 ± 0.2 | 17.8 ± 0.7 | 17.8 ± 0.3 | 18.6 ± 0.1 | 19.5 ± 0.1 | 17.5 ± 0.1 | 19.9 ± 0.4 | 21.10.1 |
| Tot Mono | 65.8 ± 0.1 | 63.9 ± 0.6 | 52.1 ± 5.5 | 56.6 ± 0.2 | 53.3 ± 1.7 | 50.1 ± 0.3 | 52.3 ± 0.1 | 48.5 ± 0.1 | 45.70.3 |
| Tot Diene | 7.0 ± 0.1 | 5.6 ± 0.1 | 5.0 ± 0.5 | 6.0 ± 0.1 | 5.6 ± 0.1 | 5.6 ± 0.1 | 6.5 ± 0.1 | 6.1 ± 0.1 | 6.1 ± 0.1 |
| Tot Poly | 7.7 ± 0.3 | 13.3 ± 0.3 | 17.9 ± 1.5 | 19.8 ± 0.2 | 23.6 ± 0.5 | 24.6 ± 0.3 | 24.9 ± 0.1 | 25.8 ± 0.5 | 27.9 ± 0.2 |

See the footnotes of Table 5 for abbreviations and experimental design.

TABLE 7

Fatty acid composition of larvae white bass gills tissue after 22 days of dietary treatment (mg/g dry weight)

| FAME | Diet #1 | Diet #2 | Diet #3 | Diet #4 | Diet #5 | Diet #6 | Diet #7 | Diet #8 | Diet #9 |
|---|---|---|---|---|---|---|---|---|---|
| 14:0 | 0 | 0.6 ± 0.6 | 0.8 ± 0.8 | 0 | 0 | 0.8 ± 0.8 | 0 | 0.6 ± 0.6 | 1.20 |
| 16:0 | 13.9 ± 2.5 | 15.3 ± 0.3 | 10.9 ± 3.5 | 14.7 ± 0.4 | 13.0 ± 0.1 | 15.8 ± 1.9 | 14.8 ± 0.7 | 12.6 ± 3.7 | 14.6 ± 0.1 |
| 18:0 | 9.4 ± 1.3 | 9.7 ± 0.7 | 6.5 ± 1.7 | 9.7 ± 0.1 | 8.80 | 9.9 ± 0.8 | 10.4 ± 0.5 | 9.2 ± 2.4 | 10.1 ± 0 |
| 16:1 | 3.5 ± 0.5 | 3.5 ± 0.3 | 1.4 ± 1.2 | 2.8 ± 0.1 | 2.1 ± 0.1 | 2.2 ± 0.3 | 2.5 ± 0.1 | 1.1 ± 1.0 | 0 |
| 18:1 | 59.4 ± 7.0 | 57.1 ± 4.3 | 33.5 ± 12.5 | 50.3 ± 0.4 | 36.3 ± 1.8 | 40.2 ± 4.44 | 6.5 ± 0.4 | 32.1 ± 9.4 | 31.10.4 |
| 18:2 | 7.3 ± 1.2 | 6.4 ± 0.4 | 4.0 ± 1.5 | 6.2 ± 0.1 | 4.7 ± 0.3 | 5.3 ± 0.5 | 6.7 ± 0.1 | 4.8 ± 1.5 | 4.80 |
| 20:4 | 4.0 ± 1.3 | 3.1 ± 0.3 | 3.3 ± 0.2 | 23.0 ± 0.4 | 16.5 ± 0.1 | 16.6 ± 0.7 | 30.01.4 | 18.75.5 | 18.5 ± 0.1 |
| 20:5 | 4.7 ± 1.1 | 6.5 ± 1.4 | 5.3 ± 1.9 | 2.6 ± 0.1 | 3.8 ± 0.1 | 4.9 ± 0.5 | 2.70 | 2.7 ± 0.8 | 3.60 |
| 22:5 | 0 | 0 | 0 | 0 | 0 | 0 | 0 | 0 | 0 |
| 22:6 | 0.3 ± 0.2 | 9.4 ± 2.5 | 12.5 ± 4.3 | 0.70 | 8.4 ± 0 | 13.2 ± 2.3 | 1.5 ± 0.2 | 5.4 ± 1.5 | 9.7 ± 0.2 |
| Total Sat | 24.4 ± 0.1 | 22.9 ± 2.0 | 22.5 ± 0.7 | 22.7 ± 0.3 | 22.6 ± 0.1 | 24.7 ± 0.3 | 23.1 ± 0.5 | 25.4 ± 0.2 | 27.90 |
| Total Mono | 53.2 ± 0.1 | 54.3 ± 0.1 | 47.7 ± 0.1 | 49.3 ± 0.3 | 38.5 ± 1.2 | 38.9 ± 0.4 | 44.0 ± 0.4 | 38.4 ± 1.6 | 34.0 ± 0.3 |
| Total Diene | 6.2 ± 0.1 | 5.8 ± 0.1 | 5.1 ± 0.3 | 5.8 ± 0.1 | 4.7 ± 0.1 | 4.9 ± 0.1 | 6.1 ± 0.1 | 5.5 ± 0.1 | 5.10 |
| Total Poly | 16.5 ± 0.7 | 16.9 ± 2.4 | 25.1 ± 0.6 | 24.5 ± 0.2 | 29.7 ± 0.1 | 32.0 ± 0.5 | 31.5 ± 0.8 | 31.61.6 | 34.30.2 |

See the footnotes of Table 5 for abbreviations and experimental design.

The gill tissue lipids were the most effective in increasing the proportion of polyunsaturated fatty acid over the course of the dietary treatments (over 60% increase, Tables 4 and 7), whereas brain/eye tissue lipids fed deficient diets lost 50% of their original proportions (Tables 4, 5).

All three larval tissues responded to AA dietary shortage by exhibiting a selective accumulation of AA at low dietary content (FIG. 10, AA relative enrichment, as a function of Artemia AA content, mg/g dry weight). Maximum selectivity was obtained when AA dietary content was lower than 2% of total fatty acids. On the other hand, none of these tissues maintained its preference for AA at high dietary content. Conversely, DHA was accumulated almost five times higher in brain/eye tissue than in gill and muscle tissue (FIG. 9, DHA relative enrichment, as a function of Artemia DHA content, mg/g dry weight). In addition, the accumulation rate of DHA in larvae brain/eye in response to dietary increase was two-fold higher than the accumulation rate of AA. The specific accumulation of DHA in larval brain/eye lipids reached its maximum rate at a dietary content of about 5% of total fatty acids, with only moderate reduction at higher dietary levels. Gills and muscle tissue exhibited only The overall preference of each larvae tissue for both DHA and AA over a wide range of dietary ratios is presented in FIG. 11 (DHA/AA ratio in larval tissue lipids, as a function of DHA/AA ratio in enriched Artemia, log scale). It is apparent that larval brain/eye tissue retains over 10 times more DHA than AA at any dietary ratio, while gill tissue maintains almost equal preferences for both DHA and AA. In addition, changes in DHA/AA ratios in larval tissues corresponded linearly with dietary changes at dietary ratios of less than about ten, while at higher dietary ratios, DHA predominance over AA in larvae tissues lipids increased exponentially.

Specific accumulations of linolenic acid, EPA and docosapentaenoic acid (DPA, 22:5n-3) in brain/eye tissue of larvae fed on both DHA and AA deficient diet was also noticed (Table 5). Although both linolenic acid and EPA was sufficiently present in all the enriched Artemia diets, the proportion of brain/eye tissue linolenic acid and EPA in larvae fed on DHA and AA deficient diet was almost double than that of non-deficient diet fed larvae. On the other hand, DPA was totally absent in muscle and gills tissue lipids, while EPA was not as responsive to DHA or AA dietary changes. FIG.

12 illustrates the ratios of both EPA:DHA and DPA:DHA in brain/eye tissue lipids relative to its DHA content. It clearly shows that larval brain/eye tissue compensates for its DHA shortage by dramatically increasing the proportion of both EPA and DPA. Compensation occurred mainly at levels lower than 10 mg DHA/g dry weight tissue, while at higher tissue DHA contents these two fatty acids as well as linolenic acid tended to level-off.

Competitive displacement rates for each essential fatty acid in larval tissues are summarized in Table 8.

TABLE 8

Rate of competitive displacement of DHA, AA and EPA from larvae white bass tissues as a function of increased comepetition.

| | Brain and eyes | Muscle | Gills |
|---|---|---|---|
| DHA | −1.02 mg DHA/mg AA ($R^2$ = 0.95) | −0.04 mg DHA/mg AA ($R^2$ = 0.93) | −0.07 mg DHA/mg AA ($R^2$ = 1) |
| AA | −0.75 mg AA/mg DHA ($R^2$ = 0.95) | −0.35 mg AA/mg DHA ($R^2$ = 1) | −2.9 mg AA/mg DHA ($R^2$ = 1) |
| EPA | −0.14 mg EPA/mg AA ($R^2$ = 0.93) | −0.1 mg EPA/mg AA ($R^2$ = 0.90) | −0.11 mg EPA/mg AA ($R^2$ = 1) |
| EPA | −0.05 mg EPA/mg DHA ($R^2$ = 0.96) | +0.03 mg EPA/mg DHA ($R^2$ = 0.99) | +0.11 mg EPA/mg DHA ($R^2$ = 1) |

Correlation between each competing pair of fatty acids was obtained by plotting the amount of each essential fatty acid that accumulated in the tissue (in mg/g dry weight) at equal dietary levels versus increasing tissue levels of other fatty acids. Each correlation plot was based on six data points, data points are mean SEM values for two blocks. Values are calculated based on data presented in Tables 5, 6 and 7.

In all three larval tissues the EPA displacement rate by increased AA competition was around 10–14%, while DHA was not in competition with EPA. In fact, increasing gill tissue DHA was associated with an 11% increase in EPA levels. Even more dramatic displacement rates were found for DHA and AA. Brain/eye DHA content was the most sensitive to competition from AA being displaced at rates of 1.02 mg DHA/mg increase in tissue AA, while muscle and gill tissue DHA was not sensitive to increasing levels of AA. On the other hand, AA content in gill tissue was the most sensitive to changes in DHA levels being displaced at rates of 2.9 mg AA/mg increase in tissue DHA. Brain/eye and muscle AA content was displaced at lower rates of 0.75 mg and 0.35 mg AA/mg increase in tissue DHA, respectively.

Discussion

Varying dietary DHA and AA ratios affect growth and tissue composition during larval development and metamorphosis of white bass, *Morone chrysops*. A question of particular interest was whether the larvae would show the capacity to regulate their essential tissue fatty acid composition at the higher dietary ratios. Our findings clearly show that white bass larvae poorly elongate and desaturate linolenic acid or EPA to DHA. Moreover, we observed a marked competition between essential fatty acids with both DHA and AA levels greatly fluctuating with the dietary changes, suggesting that white bass larvae are unable to regulate their EFA composition in the face of dietary changes. Our results specifically suggest that tissue AA may decrease exponentially at dietary DHA/AA ratios of higher than ten. Unlike mammals which can further elongate and desaturate dietary fatty acids precursors to maintain phospholipid composition, marine fish larvae require a continues dietary supplementation of the two main essential fatty acids AA and DHA in a correct balance.

Concerning the ability to convert 18:3n-3 and EPA to DHA, it was interesting to see whether white bass larvae retained such elongation/desaturation capabilities when raised under almost fresh water conditions (2–6 psu). Indeed, larvae brain/eye tissue retained only small amounts of DHA (as low as 1.80.2 mg/g dry weight) when fed on both linolenic acid and EPA rich but DHA deficient Artemia diets. These tissues compensated for the shortage in DHA by dramatically increasing EPA content, which is usually presented in brain only in trace amounts, and docosapentaenoic acid (DPA, 22:5n-3) levels. The latter fatty acid is a product of Δ-6 desaturases system and generally exhibits considerable enrichment only in brain/eye tissue, and probably has a low rate of further desaturation to DHA.

The maximum accumulation of both EPA and DPA in brain/eye tissue occurred at a level of 5 mg DHA/g dry weight, with a significant reduction at higher DHA levels. This may indicate that Δ-6 desaturase activity in fish larvae is suppressed by diets rich in HUFA, as was demonstrated in numerous dietary studies in mammalian hepatic Δ-6 desaturase activity. Based on our results, white bass larvae, in order to avoid compensation by less functional fatty acids in brain/eye tissue, require a minimum retention of 5 mg DHA/g dry weight.

Dietary supplementation of AA enhanced DHA accretion in larval brain/eye tissue but only when fed as part of DHA-deficient diets (an elevation from 1.80.2 mg DHA/g dry weight at no dietary AA up to 7.51.2 mg DHA/g dry weight at the highest content of dietary AA). By contrast, high levels of brain/eye DHA were associated with lower accumulation of AA (a reduction from 6.50.2 mg AA/g dry weight at no dietary DHA to 3.50.3 mg AA/g dry weight at the highest content of dietary DHA). However, despite its complete dietary removal AA was not as deficient as DHA in brain/eye tissue. This implies that saturation of brain/eye tissue lipids with AA could preserve a significant portion of DHA for use as a substrate in membrane lipid biosynthesis rather than to serve as a substrate for degradation. It may be that in a state of deficiency the metabolic conversion of EFA precursors to long chain metabolites is much more efficient than under normal conditions. Given that both n-3 and n-6 families share the same degradation and desaturation and chain elongation metabolic pathways, and that the conversion efficiency of EFA precursors increased in a state of dietary deficiency, it is not surprising that more DHA was accumulated at higher dietary AA. It may be further concluded from this observation that deficiency in larval brain/eyes DHA could be partially offset by supplementing n-6 metabolites but not n-6 precursors. Dietary supplementation of the n-6 long chain metabolite (such as AA) can be employed to free more desaturation and chain elongation resources for the efficient production of more n-3 metabolites.

Concerning the issue of whether diets rich in n-6 long chain metabolites can offset the need for n-3 long chain metabolites, results show that brain/eye of larvae fed a DHA-deficient but AA-rich diet accumulated a maximum of 7.5±1.2 mg DHA/g dry weight, which is slightly above the suggested minimum requirement of 5 mg/g dry weight (FIG. 9). Nonetheless, growth of these larvae was retarded almost by half, relative to that of DHA fed larvae. Further results suggested, however, that the growth impediment was probably a result of other tissues such as muscle and gills being severely deficient in DHA. Therefore, DHA can not be replaced by either its dietary precursors or by n-6 metabolites, since tissues other than brain/eyes seem to be much more limited in their anabolic capacity to metabolize n-3 precursors to longer chain fatty acids.

Our results clearly show that when both DHA and AA were supplemented in the diet, AA was more efficient in displacing DHA from larval white bass tissues than was DHA in displacing AA. Higher accumulation rates of AA relative to that of DHA were also observed in the enriched Artemia (FIG. 6). We envision two possible mechanisms for this phenomenon. Acyltransferases responsible for phospholipid synthesis favor AA as a substrate, thereby permitting more incorporation of AA over DHA into cellular membranes of the rapidly growing larvae. Alternatively, there may be differences as to how DHA and AA are channelled to different metabolic pathways. If DHA is a better substrate for peroxisomal-oxidation than AA, then it can be more efficiently channeled into the oxidation pathway rather than being used for phospholipid synthesis. Supportive evidence suggests that the peroxisomal-oxidation system chain shortens n-3 long chain fatty acids more rapidly than do the n-6 fatty acids. Thus, both the desaturation/elongation enzymes system and the peroxisomal-oxidation system seems to favor DHA over AA, one for anabolism and the other for catabolism. It is worthwhile mentioning that both biosynthesis and catabolism of PUFA are two totally separate processes that are compartmentalized within the cell. The anabolic reaction occur primarily in the endoplasmic reticulum, while the catabolic reaction occur mostly in mitochondrial and peroxisomes. Therefore, factors that stimulate fatty acid oxidation such as high HUFA diets could also at the same time decrease their availability in cell membranes, further increasing their depletion from tissue lipids.

In contrast with the tendency of DHA and AA to level off in muscle tissue lipids, the brain/eye lipids showed a strong exponential increase with increasing dietary ratios. This result suggests that it is the metabolism of the tissue itself that regulates either retention or incorporation of EFA into its lipids. Furthermore, there were major differences between brain/eye, muscle and gills tissues in response to dietary DHA/AA changes, with brain/eye preferentially accumulating DHA over AA, while muscle was equally responsive to both EFA, and gill progressively accumulating larger amounts of AA. Gills showed the lowest DHA/AA ratios but were also the most responsive to dietary changes.

Such specific regulatory responses reflect distinct and separate roles that each fatty acid may play in these tissues. During embryonic development, DHA accumulates preferentially in brain synaptic membranes, and in the photoreceptor rod outer segments. Besides DHA, AA also accumulates in brain phospholipids during embryonic and larval development, where it is actively participates in signal transduction and second messenger functions in neural cells. In addition, AA is important also as a precursor of eicosanoid production throughout the body. In the gills and kidney, eicosanoids are involved in the stimulation of ionic transport that regulate the osmotic pressure in the larvae during environmental changes.

Given the antagonistic effect of DHA on AA, and competition between DHA and AA that outweighs the preferential effect in different tissues, a dietary balance between the two is essential for the optimal growth and function in fish larval species. We have found that the maximum accumulation rate of DHA in brain/eyes was obtained at about 5 mg/g dietary content while the maximum accumulation rate of AA in gills was obtained at about 2 mg/g. The negative growth effect of high AA diets can be counteracted only with relatively higher doses of DHA.

We have found that DHA was almost completely eliminated from brain/eye tissue of larvae that fed on diets deficient in both DHA and AA. Diets deficient in DHA and AA were high in oleic acid, which also resulted in a significant elevation of oleic acid content in larvae tissues. This was particularly noticeable in brain/eye tissue, which doubled its monounsaturated fatty acid level in the case of EFA dietary deficiency. High intake levels of oleic acid (18:1n-9) are associated with reduced Δ-6 desaturation activity thereby further limiting the tissue capacity to produce EFA metabolites from precursors therefore. Our data extend these findings by demonstrating the dose-response nature of this relationship.

The present invention has implications for both the deprivation and excessive loading of long chain EFA in larval diets. Our results show that provision of EPA can help to offset the decrease in DHA observed in brain/eye tissue with high dietary AA. They also clearly support a trend toward regulatory limits on the incorporation of DHA into the larval tissues, showing a maximum tissue response at dietary DHA/AA ratio of approximately 5:1. At dietary ratios higher than 10:1, the imbalance in tissue lipids, EFAs, increase exponentially in favor of DHA.

EXAMPLE 3

In this example, the use of heterotrophically grown microalgae and its extracted oil was evaluated as a source of nutrients and essential fatty acids for live food and in formulated broodstock feeds in aquaculture. These heterotrophically grown microalgae and extracted oil sources are particularly rich in docosahexaenoic acid (DHA) and arachidonic acid (AA), and may be utilized for enhancing larval growth and survival, as well as contributing to egg and sperm quality when included in broodstock diets.

Materials and Methods

Algal Sources

Heterotrophicaly grown algal based materials included; spray-dried preparations of whole cell (WC-Cr), defated cells (DC-Cr), DHA rich triacylglycerols (TAG-Cr) and phospholipids (PL-Cr) extractions of *Crypthecodinium sp.*, whole cells (WC-CO) of *Chlorella s.*, and AA-rich phospholipids extract (PL-Mo) of the fungi, *Mortierella sp.* All these materials were obtained from Martek Bioscience Corp. (Columbia, Md.). Lipid and fatty acid compositions of these materials are presented in Table 9.

TABLE 9

Lipid (% material), DHA, EPA and AA (% of total fatty acids) composition of the algal and fungi materials

| | TAG-Cr | PL-Cr | PL-Mo | WC-Cr | DC-Cr |
|---|---|---|---|---|---|
| Lipid | 100 | 57.4 | 55.4 | 23.4 | 12 |
| DHA | 40 | 48 | N.D | 51 | 50 |
| EPA | <0.5 | <0.5 | N.A | <0.5 | <0.5 |
| AA | N.D | N.D | 56 | N.D | N.D |

TAG-Cr, DHA rich triacylglycerols extract of Crypthecodinium sp, PL-Cr, DHA rich phospholipids extract of Crypthecodinium sp, PL-Mo, AA-rich phospholipids extract of Mortierella sp, WC-Cr. whole Crypthecodinium sp. cells, DC-Cr, defated Crypthecodinium sp. cells. N.D, not detectable.

In addition, two enrichment mixes containing spray-dried WC-Cl and PL-Cr (50:50), or WC-Cr and PL-Mo (87.5:12.5) were also prepared. A mix of 4% alginic acid, 1% ascorbic acid, 1% vitamin-E and 2% silicon based anti foaming agent were added to each of the spray-dried algal materials. The effect of these algal and fungi sources on the nutritional status of the live food and fish larvae were compared with the commercial product Algamac-2000, a spray-dried algal meal based on the hetrotrphically grown

*Schizochytrium sp.* (Bio-Marine, Inc. Hawthorne, Calif.) and DHA-Selco, a fish oil based emulsion (INVE Aquaculture, Dendermonde, Belgium).

Broodstock Diet

The effects of heterotrophically grown algal-based sources were tested in the diet of striped bass, *Morone saxatilis* broodstock. Three diets, identical in their protein, lipid and energy levels and containing 8–11% of DC-Cr were prepared. They differed, however, in their levels of PL-Cr and PL-Mo. Diet-1 and -2 were supplemented with 2% and 4% of PL-Cr, respectively, while diet-3 was supplemented with 4% PL-Cr and 5% PL-Mo. A commercially available grow-out diet for striped bass (Moore-Clark, a Nutreco Company, Bellingham, Wash.) was used as the control diet (diet-4). Diet formulation, proximate and fatty acid and amino acid analyses are presented in Tables 10 and 11.

TABLE 10

Formulation of striped bass broodstock experimental diets

| Ingredients (% Weight) | Diet-1 | Diet-2 | Diet-3 |
|---|---|---|---|
| Squid meal (75% protein) | 40 | 40 | 40 |
| Soy proteins extract (47% protein) | 20 | 20 | 20 |
| Fish meal (64% protein) | 8 | 8 | 8 |
| Meat meal (50% protein) | 5 | 5 | 5 |
| Fish oil | 8 | 6 | 3 |
| DC-Cr | 11 | 11 | 8 |
| PL-Cr | 2 | 4 | 5 |
| PL-Mo | 0 | 0 | 5 |
| Dicalcium phosphate | 1.5 | 1.5 | 1.5 |
| Choline chloride | 0.5 | 0.5 | 0.5 |
| Vitamin premix | 0.5 | 0.5 | 0.5 |
| Mineral premix | 1 | 1 | 1 |
| L-Methionine | 0.5 | 0.5 | 0.5 |
| L-lysine | 1 | 1 | 1 |
| L-arginine | 0.2 | 0.2 | 0.2 |
| Vitamin-C | 0.2 | 0.2 | 0.2 |
| Vitamin-E | 0.2 | 0.2 | 0.2 |

Formulation is based on weight percentages. Squid meal was obtained from APC Inc. Ames, IA. All ingredients were of industrial grade. Diets were extruded (10 mm pellet size) at Integral Fish Foods, Grand Junction, CO.

TABLE 11

Composition of the striped bass broodstock experimental and control diets

|  | Diet -1 | Diet -2 | Diet -3 | Diet -4 |
|---|---|---|---|---|
| Proximate composition (% Weight) | | | | |
| Protein | 50 | 50 | 51 | 42 |
| Fat | 14 | 12 | 11 | 26 |
| Fiber | 3 | 3 | 4 | 2 |
| Ash | 9 | 9 | 10 | 8 |
| Moisture | 10 | 12 | 13 | 7 |
| Peroxide value | 0.8 meq/kg | 0.1 meq/kg | 0.1 meq/kg | 1.0 meq/kg |
| AA | 0 | 0 | 2% | 0 |
| DHA + EPA | 0.85% | 2.5% | 4.5% | 4.5% |

Essential amino acid composition in all diets was similar except lysine. Diets-1, -2, -3 contained about 9% lysine of the total amino acids, while diet-4 contained only 6%. Proximate and amino acid analyses, and peroxide value were performed at New Jersey Feed Laboratory, Inc. Trenton, N.J.

After the fish were biopsied for sex determination, each diet was fed to a group of 15 fish (5 males and 10 females, 3–6 kg each) in a 4 m$^3$ circular tank. Each tank was supplied with 4–6 psu synthetic sea water (15° C.) recirculated through a drun-filter and bio-filter system and exposed to natural photoperiod. Fish were given a total ration of 15-g kg$^{-1}$ BW per day, starting one month before spawning and continuing throughout the year until the next spawning season. Average female and male weights in each dietary treatment at the beginning of feeding trails and at the beginning of second spawning season are given in Table 12.

TABLE 12

Weight gain of striped bass males and females fed with algal meal derived diets.

| Diet | Sex | Initial Weight (kg) | Weight (kg) after 1-month | Weight (kg) after 12-months |
|---|---|---|---|---|
| Diet -1 | Male | 3.3 ± 0.7 | 3.2 ± 0.4 | 4.2 ± 0.8[A] |
|  | Female | 5.0 ± 0.6 | 4.6 ± 1.0 | 6.00.3[A] |
| Diet -2 | Male | 3.6 ± 0.4 | 3.2 ± 0.4 | 3.7 ± 0.4[B] |
|  | Female | 4.8 ± 0.7 | 4.5 ± 0.5 | 5.2 ± 0.3[B] |
| Diet -3 | Male | 4.0 ± 0.4 | 3.5 ± 0.5 | 4.3 ± 0.2[AB] |
|  | Female | 4.90.8 | 4.6 ± 0.6 | 5.8 ± 0.1[AB] |
| Diet -4 | Male | 3.9 ± 0.4 | 4.1 ± 0.3 | 4.8 ± 0.5[A] |
|  | Female | 5.1 ± 0.7 | 5.7 ± 0.6 | 6.2 ± 0.4[A] |

Values in each sex group sharing the same superscript are not significantly different (P > 0.05). Values are MeansS.E. for ten females and five males.

All fish were again biopsied at the beginning of the second spawning season. One mature female reaching a final stage of gonadal development (oocyte diameter >800 m) was implanted with controlled-release implants containing a GnRH analog (50-g kg$^{-1}$ BW, Mylonas et al., 1998). Two spermiating males were also induced by implanting with similar GnRH implants (20-g kg$^{-1}$ BW). The induced fish were placed in a separate spawning tank, under similar water conditions as the original tank, and then the water temperature increased overnight to 17° C. Fish commenced natural spawning ca 48-h following spawning induction. A similar procedure was repeated during the second spawning season until three different females from each dietary treatment were spawning successfully. Each spawning tank was equipped with a net basket attached to the overflow for collecting the naturally spawned eggs, which were harvested every few hours, and their total wet biomass recorded. The eggs were then placed in 60-liter incubation tanks equipped with gentle aeration having a 150% daily water exchange. A sample of viable eggs from each spawning female was taken, washed in distilled water and kept at −80° C. for later lipid and fatty acid analysis.

Enrichment Feeds for Rotifers and *Artemia nauplii*

A series of experiments were performed in which the effect of WC-Cr, PL-Cr and a mix of both materials (WC-Cr/PL-Cr) on rotifer and *Artemia nauplii* survival, lipid content and DHA absorption were evaluated. The enrichment efficiency of these fatty sources to increase the DHA content and DHA:EPA ratios in rotifers and Artemia was compared with a widely used commercial enrichment products containing either heterotrophically grown microalgae (Schizochytrium sp., Algamac-2000) or fish oil based emulsion (DHA-Selco).

Decapsulated *Artemia nauplii* (premium grade, Sanders Brine Shrimp Co., Ogden, Utah) were hatched and kept at room temperature for 6–8 h until they reached instar-II stage (complete development of digestive system) before being transferred to the enrichment medium. *Artemia nauplii* were enriched for 16-h at a density of $200 \times 10^{-3}$ nauplii L$^{-1}$ in 20-psu artificial sea water (281° C.). Two rations of 0.3-g L$^{-1}$ of each enrichment diet were fed at time-0 and 8-h.

Rotifers were cultured in either 30-liter or 100-liter conical tanks, at a density of 200–600×10$^{-3}$ rotifers liter$^{-1}$ of 20-psu artificial sea water (241 C), and fed 0.5-g WC-Cl per 10$^6$ rotifers day$^{-1}$. During enrichment, the rotifers were fed their respective diets for 8-h at a density of 500×10$^{-3}$ rotifers L$^{-1}$ at 20-psu artificial sea water (281 C.). Two rations of 0.05-g or 0.1-g L$^{-1}$ of each enrichment diet were fed at time-0 and 4-h. The density of rotifers and Artemia nauplii in each enrichment container was recorded at the beginning and termination of the enrichment (after 8-h and 16-h, respectively). Rotifer and Artemia survival, as a result of their enrichment diets, was recorded and samples of these zooplankters were collected, washed well in tap and DDW before being stored at −80° C. for later lipid and fatty acid analysis.

Larvae Rearing

Striped bass, *Morone saxatilis* larvae obtained from spawns of diet-4 fed broodstock were raised on rotifers, *Brachionus plicatilis* (2–5 rotifers ml$^{-1}$). Seventeen day-old post-hatched larvae were randomly distributed in eighteen 60-liter rearing tanks (160 larvae tank$^{-1}$) and grown according to Harel et al. (2000).

Newly hatched *Artemia nauplii* were fed in one ration to the larvae from day 17–24 at a concentration of 200–400 *nauplii* L$^{-1}$, while the rotifer concentration in the tanks was reduced gradually to complete removal by day 24. Larvae were then fed twice daily *Artemia nauplii*, previously enriched with either PL-Cr or Algamac-2000. The feeding experiment was terminated on day 46. Larval survival data were recorded and samples of 40 larvae were washed with DDW, blotted dry, and lyophilized to constant weight. The dry weight of individual larvae was determined (Mettler UMT2 ±0.1 mg, Toledo, Switzerland). The samples then were stored at −80° C. until analysis for lipid and fatty acids composition.

Gilthead sea bream, *Sparus aurata* and European sea bass, *Dicentrarchus labrax* larvae originated from spawns of locally maintained broodstock were stocked over three days with two-day-old larvae (40,000 larvae tank$^{-1}$). Sea bream larvae from day 3 to day 20 were fed twice daily rotifers that were previously enriched on first phototrophically grown Nannochloropsis sp. and then on either Algamac-2000 or PL-Cr. Rotifer and Artemia enrichments and larval feeding were carried out as described in Koven et al. 2001. Sea bream larval growth and survival as a function of enrichment materials was recorded on day 34. European sea bass larvae were maintained in darkness until day-8 when they started feeding on non-enriched *Artemia nauplii* until day 11. From day-11 to day-21, the larvae were fed twice daily under low illumination (approximately 100-lux) Algamac-2000 or PL-Cr enriched *Artemia nauplii*.

The rearing system for Atlantic halibut, *Hippoglossus hippoglossus* larvae included two 1500-L circular tanks with flat bottom and dark walls. These tanks were supplied with continuous freshly filtered and temperature-controlled sea water (121° C., 32-ppt). The tanks were stocked with newly hatched larvae (7 larvae L$^{-1}$), from spawns of locally maintained broodstock. Live photosynthetic algae, Tetraselmis sp. were added three times daily to the larvae culture medium, at a density of 20,000 cells ml$^{-1}$. During the first 10 days the larvae were fed three times daily with *Artemia nauplii* enriched for 16-h with DHA-Selco or PL-Cr. From day-10 to day-90, the larvae were fed a mixture of young (24-h post hatch) and old (72-h post hatch) enriched Artemia. These enrichments were carried out for 16-h in 1700-L conical tanks containing well-aerated sea water (25-ppt) at 271° C. and stocked with up to 200 *nauplii* ml$^{-1}$. Both young and old *Artemia nauplii* were fed one ration (0.3-g L$^{-1}$) of their respective enrichment media at the beginning of the enrichment period and another ration after 12-h. Old Artemia were obtained by culturing the nauplii in a suspension of extra fine marine fish diet (10 mg/L, Marine Start, FK). A sample of 40 halibut larvae were weighed at the end of the feeding experiment (Day-90), and visually checked for the completion of pigmentation and eye migration. Larvae were then lyophilized for 48-h and kept at −80° C. for later lipid and fatty acid analysis.

Lipid and Fatty Acid Analysis

Total lipids were extracted from triplicate samples. Lipid weight was determined gravimetrically (Mettler UMT2 ±0.1 mg, Toledo, Switzerland) and expressed as percent DW of sample. Fatty acid methyl esters (FAME) were prepared from the whole lipid extract, and the lipid classes separated, saponified and transmethylated as described by Harel et al. (2000).

Data Analysis

All data were reported as Means S.E. Analysis of Variance was used to determine differences between treatment means of survival, growth and fatty acid percentage. Survival and fatty acids percentages were normalized by arcsine transformation prior to analysis. When significant differences between the means were detected, a Bonferroni multiple comparison test was applied. Differences were considered significant at $P<0.05$.

Results

Striped Bass Broodstock

In general, fish fed the control diet maintained body weight during the first month of feeding, while fish fed the experimental diets lost about 10% of their initial weight, possibly as a result of their adaptation to the new diets. However, after 12 months of feeding, weights within each sex group of fish fed diets-1, -3 and -4 were similar ($P>0.05$), whereas fish fed diet-2 grew significantly slower ($P<0.05$, Table 11). Males fed diet-2 grew little during the 12 month feeding period, and females only gained 0.4-kg as compared to over 1-kg in females fed diets-1, -3, -4. The fact that the control diet (diet-4) contained 26.2% lipids while diets-1, -2, -3, contained only 16.7% did not appear to influence the final weight gain.

The greatest number of fish with developed gonads were found in the control diet fed group. All males fed diet-4 were spermiating by the beginning of the second spawning season, and most diet-4 and diet-1 fed females advanced in their gonadal final maturation stage (FMS, oocyte diameter >800 m). This compared to only 20–40% spermiating males and 50–60% FMS females in diets-2, -3 fed groups (Table 13). Fish fed diet-2 performed poorest, not only in terms of weight gain as described earlier but also exhibited the slowest reproductive development.

Gonadal development represents the percentage of spermiating males and females at the final maturation stage (FMS, oocyte diameter >800 m) in each dietary treatment. Values for egg biomass (g eggs per 1-kg female BW) and hatching rate are the Mean S.E. of triplicate spawning of three different females within each dietary treatment. Dietary treatments sharing the same superscript are not significantly different ($p>0.05$). Egg DHA/EPA/AA ratio represents the proportion between the three fatty acids (relative to 10 parts of DHA) in the egg total lipids extract.

Fecundity and Egg Hatching Rate

The average egg biomass per 1-kg BW female and egg hatching rate (%) are presented in Table 13.

TABLE 13

The effects of algal meal derived diets on striped bass broodstock gonadal development, fecundity, and egg hatching rate and fatty acid composition.

| Diet | Spermiating Males (%) | FMS Females (%) | Egg Biomass (g/l-kg BW) | Hatching Rate (%) | Egg DHA/EPA/AA |
|---|---|---|---|---|---|
| Diet -1 | 40 | 100 | 280 50$^A$ | Hatch 1 | 0:8:0.5 |
| Diet -2 | 20 | 50 | 400 90$^A$ | 15 5.4$^{AB}$ | 10:6:0.5 |
| Diet -3 | 40 | 60 | 290 20$^A$ | 22 8.5$^A$ | 10:5:1.5 |
| Diet -4 | 100 | 80 | 26050$^A$ | 8.1 5.9$^B$ | 10:5:0.5 |

Gonadal development represents the percentage of spermiating males and females at the final maturation stage (FMS, oocyte diameter >800 m) in each dietary treatment. Values for egg biomass (g eggs per 1-kg female BW) and hatching rate are the Mean S.E. of triplicate spawning of three different females within each dietary treatment. Dietary treatments sharing the same superscript are not significantly different (p>0.05). Egg DHA/EPA/AA ratio represents the proportion between the three fatty acids (relative to 10 parts of DHA) in the egg total lipids extract.

Egg production was not significantly affected (p>0.05) by dietary treatments, however the hatching rate of eggs from fish fed diet-3 (High DHA and high AA) was almost three-fold higher (P<0.05) than the control diet-4. The eggs of fish fed diet-1 (low in DHA) contained the lowest DHA levels (19.5-mg g$^{-1}$ DW) and were mostly unfertilized or died shortly after spawning, whereas eggs from all the other 3 dietary treatments demonstrated significantly (P<0.05) higher DHA content (23.60.4-mg DHA g$^{-1}$ DW). The level of AA in eggs from broodstock fed diet-3 was markedly higher (30.1-mg AA g$^{-1}$ DW) than eggs from fish fed diets-1, -2 and -4 (1.60.2-mg AA g$^{-1}$ DW). Dietary treatments also affected the relative ratios of egg EPA, AA and DHA (DHA/EPA/AA, Table 13).

DHA/EPA/AA Enrichment Efficiency of Rotifers and *Artemia nauplii*

The effect of WC-Cr, PL-Cr, WC-Cr/PL-Mo and WC-Cl/PL-Cr enrichment preparations, in comparison with commercially available materials, on lipid, DHA and AA accumulation in rotifers and *Artemia nauplii* is shown in Table 14.

TABLE 14

Lipid and DHA, EPA and AA accumulation in rotifers and *Artemia nauplii* fed with fish-oil and algal-based enrichment preparations.

| DHA- | Algamac-Selco | PL-Cr 2000 | WC-Cl/PL-Cr | WC-Cr | WC-Cr/PL-Mo |
|---|---|---|---|---|---|
| Rotifers |  |  |  |  |  |
| Lipid (% DW) | 19.40.5 | 20.30.4 | 19.90.8 | 22.20.6 | 17.40.6 | 18.60.8 |
| AA (% TFA) | 0.90.1 | 1.50.1 | 0.60.1 | 0.90.1 | 0.50.1 | 7.10.3 |
| EPA (% TFA) | 6.60.1 | 3.30.4 | 2.90.2 | 3.50.3 | 2.30.2 | 3.20.2 |
| DHA (% TFA) | 8.80.6 | 23.40.7 | 24.51.1 | 10.50.4 | 22.31.0 | 21.50.2 |
| DHA/EPA/AA | 10:7:1 | 10:5:1 | 10:1:0 | 10:3:1 | 10:1:0 | 10:2:3 |
| Artemia |  |  |  |  |  |
| Lipid (% DW) | 22.61.7 | 19.30.3 | 25.30.7 | 28.91.3 | 17.71.2 | 19.00.6 |
| AA (% TFA) | 2.20.2 | 3.40.6 | 2.80.2 | 3.10.3 | 2.10.3 | 7.90.3 |
| EPA (% TFA) | 9.30.3 | 5.60.2 | 4.40.1 | 4.80.2 | 4.70.2 | 3.70.1 |
| DHA (% TFA) | 10.80.8 | 7.40.2 | 17.21.0 | 19.50.8 | 12.50.9 | 10.60.2 |
| DHA/EPA/AA | 10:9:2 | 10:8:5 | 10:2:2 | 10:3:2 | 10:4:2 | 10:4:8 |

Algamac-2000 was obtained from Aquafauna Bio-Marine, Inc. Hawthorne, CA, and DHA-Selco from Inve Aquaculture, Dendermonde, Belgium. WC-Cl/PL-Cr is a spray-dried mix containing 50% WC-Cl with 50% PL-Cr. WC-Cr/PL-Mo is a spray-dried mix containing and 87.5% WC-Cr with 12.5% PL-Mo. DHA/EPA/AA represents the proportion between the three fatty acids (relative to 10 parts of DHA). Fatty acid levels are presented in percentage of total fatty acids (% TFA). Rotifers were enriched with two portions of 0.05-g/L each every 4-h, and Artemia with two portions of 0.3-g/L each every 8-h. Values are the Mean S.E. of triplicate enrichments.

DHA-Selco and WC-Cl/PL-Cr delivered the lowest levels of DHA to the rotifers, whereas Algamac-2000, PL-Cr, WC-Cr and WC-Cr/PL-Mo were equally effective in increasing the percentage of DHA in rotifers fatty acids to over 20% (P<0.05). However, the highest DHA/EPA ratios were obtained in rotifers fed with PL-Cr and WC-Cr diets. Moreover, the inclusion of 12.5% PL-Mo with WC-Cr diet was sufficient to elevate AA content in the rotifers up to 10-fold of their initial content. Rotifer survival was high in 0.1-g L$^{-1}$ of either Algamac-2000 or WC-Cr (81.7 and 89.9%, respectively), but was very sensitive to the amount of PL-Cr in the enrichment medium. At an enrichment level of 0.1-g L$^{-1}$, only 49.7% of rotifers survived after 8-h of enrichment, but reduced enrichment level to 0.05-g L$^{-1}$ resulted in a significantly higher survival, which was comparable to that of rotifers fed Algamac-2000 or WC-Cr diets (80.9%, P>0.05), demonstrating as well a similar lipid content (19.9% dry weight, P>0.05).

Over 75% of the Artemia survived after the 16-h enrichment period, with no significant deleterious effects (P>0.05) from the enrichment sources. During enrichment, the size of *Artemia nauplii* increased from 620-m in length at instar-II to ca. 900-m after 16-h regardless of dietary treatment (P>0.05). The greatest increase in lipid content was observed in PL-Cr enriched Artemia, whereas WC-Cr and Algamac-2000 enrichments resulted in lower lipid accumulations (P<0.05). Furthermore, the Triacylglycerol/Phospholipid ratio in PL-Cr enriched Artemia was significantly higher (P<0.05) than the other treatments (3.8 and 3.2, respectively). PL-Cr and WC-Cl/PL-Cr treatments were associated with the greatest accumulation of DHA in the nauplii (17.21.0% and 19.50.8% of TFA, respectively), whereas Algamac-2000 and DHA-Selco enriched Artemia demonstrated the lowest levels (7.4±0.2% and 10.8±0.8% of TFA, respectively). The high DHA incorporation in Artemia fed the WC-Cr or PL-Cr diets was also reflected in the significantly higher ratios of DHA/EPA (over 2.5), compared to those of Algamac-2000 and DHA-Selco enriched Artemia (1.1 and 1.2, respectively). The addition of 12.5% PL-Mo in the WC-Cr diet increased the Artemia AA content 3–4 fold over their initial content, without a significant reduction in the accumulation of DHA or EPA (P>0.05). The high levels of docosapentaenoic acid (22:5n-6) in Algamac-2000 was also reflected in the three-fold retroconverted AA levels in the enriched rotifers and Artemia.

Larval Growth

The growth of 17 to 46-day-old striped bass larvae fed olive oil enriched Artemia was the lowest (P<0.05) among all experimental groups (105±10% DW gain, Table 15).

TABLE 15

Effect of fish oil and algal based enrichment materials for rotifers and Artemia on final weight and DHA, EPA, AA accumulation in striped bass, European sea bass, gilthead sea bream and Atlantic halibut larvae

|  | Olive oil | Algamac 2000 | PL-Cr | DHA-Selco |
|---|---|---|---|---|
| striped bass |  |  |  |  |
| Final Weight (mg DW) | 19.6 ± 1.9 | 24.4 ± 1.6 | 26.4 ± 6.1 |  |
| AA (% TFA) | 2.3 ± 0.1 | 3.6 ± 0.1 | 2.9 ± 0.1 |  |
| EPA (% TFA) | 3.4 ± 0.7 | 6.1 ± 0.2 | 5.6 ± 0.1 |  |
| DHA (% TFA) | 2.8 ± 0.2 | 11.1 ± 0.3 | 13.8 ± 0.6 |  |
| DHA/EPA/AA | 10:11:8 | 10:5:3 | 10:4:2 |  |
| European sea bass |  |  |  |  |
| Final Weight (mg DW) |  | 4.1 ± 0.1 | 3.4 ± 0.2 |  |
| AA (% TFA) |  | 4.2 ± 0.1 | 1.6 ± 0.0 |  |
| EPA (% TFA) |  | 6.2 ± 0.1 | 6.7 ± 0.1 |  |
| DHA (% TFA) |  | 15.9 ± 0.1 | 20.1 ± 0.4 |  |
| DHA/EPA/AA |  | 10:4:3 | 10:3:1 |  |
| Sea bream |  |  |  |  |
| Final Weight (mg DW) |  | 1.7 ± 0.1 | 1.6 ± 0.2 |  |
| AA (% TFA) |  | 4.5 ± 0.1 | 1.8 ± 0.1 |  |
| EPA (% TFA) |  | 6.1 ± 0.0 | 7.4 ± 0.3 |  |
| DHA (% TFA) |  | 13.7 ± 0.3 | 17.5 ± 0.7 |  |
| DHA/EPA/AA |  | 10:4:3 | 10:4:1 |  |
| Atlantic halibut |  |  |  |  |
| Final Weight (mg WW) |  |  | 520 | 280 |
| AA (% TFA) |  |  | 1.7 | 1.8 |
| EPA (% TFA) |  |  | 9.8 | 11.6 |
| DHA (% TFA) |  |  | 15.9 | 13.0 |
| DHA/EPA/AA |  |  | 10:6:1 | 10:9:1 |

Algamac-2000 is a commercial product of Aquafauna Bio-Marine, Inc. Hawthorne, CA. DHA-Selco is a commercial product of INVE Aquaculture NV. DHA/EPA/AA represents the proportion between the three fatty acids, in whole body lipid extracts. Fatty acid levels expressed in percentage of total fatty acids (% TFA). Growth for striped bass, sea bream and European sea bass is expressed in mg DW and for Atlantic halibut in mg WW.

By contrast, the growth of larvae fed PL-Cr enriched Artemia showed the greatest DW gain (17523%). Not surprisingly, the tissue DHA level of larvae fed olive oil enriched Artemia was low and nearly equivalent to their EPA and AA levels (Table 15), while the DHA levels in tissue lipids of larvae fed the other treatments were two-fold higher than EPA and about three-fold higher than AA.

The growth of 5 to 34-day-old sea bream larvae was improved significantly by as much as 40% when fed DHA enriched rotifers and Artemia as compared to larvae fed no DHA containing rotifers and Artemia. The effect of rotifer and Artemia enrichment with either Algamac-2000 or PL-Cr on sea bream larval growth was not significantly different (1.7±0.1 and 1.6±0.2 mg DW larvae, respectively, P>0.05, Table 15). In experiments with 11 to 36-day-old European sea bass larvae, a growth advantage (P<0.05) was demonstrated in larvae fed Artemia enriched with Algamac-2000 compared to PL-Cr (4.1±0.1 and 3.4±0.2 mg final DW, respectively, P<0.05), although lower levels of DHA were provided compared to PL-Cr enriched zooplankton.

Atlantic halibut larvae fed PL-Cr enriched Artemia were almost 2-fold larger than larvae fed DHA-Selco enriched Artemia (Table 7). Moreover, 83% of the PL-Cr fed halibut larvae fully completed their pigmentation and eye migration process compared to 50% of the DHA-Selco fed larvae. The DHA-Selco enriched Artemia provided the larvae with almost equal amounts of DHA and EPA, whereas PL-Cr enriched Artemia provided over 60% more DHA than EPA. Both DHA-Selco and PL-Cr fed larvae accumulated similar amounts of AA.

Discussion

Heterotrophically grown algal and fungi supplemented diets are highly effective in delivering essential fatty acids either through larval live food enrichment or directly through the fish diet.

The current cost of producing algal materials is about U.S. $ 25-kg$^{-1}$, whereas Menhaden oil costs about U.S. $ 2.50-kg$^{-1}$. The level of DHA in Crypthecodinium sp. meal is an order of magnitude higher than Menhaden oil, therefore, on a weight basis, the amount of algal meal required to deliver sufficient levels of DHA would be much less than that of fish oil. In fact, of all the enrichment preparations tested in the current study, Crypthecodinium sp. based materials were the most efficient in delivering the highest DHA content and DHA/EPA ratio to both rotifers and Artemia nauplii. Moreover, striped bass, sea bream and Atlantic halibut larvae fed live food enriched with Crypthecodinium sp based materials performed better in terms of survival and specific growth rate than the other enrichment media. Successful metamorphosis in halibut larvae (i.e. normal pigmentation and eye migration) was more prevalent in larvae fed Artemia enriched with Crypthecodinium s. preparations, and compared well to metamorphosis rates achieved with wild zooplankton.

Fish oil is used in fish feed mainly because it offers a range of fatty acid classes, including the long chain n-3 PUFA, that contribute to the energy, growth and reproductive demands of the fish. However, the content of n-3 PUFA in fish oils varies depending on species, extraction procedure and storage conditions. In fact, standard available fish oils (Menhaden, anchovy, Herring etc.) do not offer sufficient levels of DHA or DHA/EPA ratios to completely satisfy the demands of reproduction (Harel et al. 1994) and larval growth (Harel et al. 2000). Consequently, marine oils where the DHA levels are particularly high due to its origin in specific fish tissues (Cod liver oil, tuna orbital oil), or through special extraction procedures (silage, cold acetone) have been recommended in broodstock diets and larval rearing enrichment preparations. The availability of these high DHA containing oils, however, is limited and they are often prohibitively expensive to produce.

Diets formulated from standard available fish oils are usually low in AA as well, an important factor since AA is desirable in the striped bass broodstock diet to ensure a high egg hatching rate. Additionally, striped bass larvae are desirably fed an AA supplemented diet, especially during osmotic challenge. A similar requirement of AA supplemented diet for optimal growth and health has been demonstrated in Atlantic salmon, Salmo salar undergoing parr-smolt transformation and osmoregulation activities of their body fluids. Increasing AA dietary levels during periods of environmental and developmental changes is useful to reduce the associated stress effects on the larvae. In white bass larvae the optimal DHA/AA and EPA/AA dietary ratios were established at 2:1 and 1:1, respectively. This contrasts with flat fish larvae such as turbot and Atlantic halibut which require much higher ratios, of over 10:1.

The results of this example show that a spray-dried mix of WC-Cr with 12.5% PL-Mo efficiently delivered both DHA and AA to the live prey of larvae. Rotifers and Artemia enriched in these preparations provided DHA/EPA/AA ratios of 10:2:3 and 10:4:8, respectively, compared to only a minor amount of AA in zooplankters fed the WC-Cr. It is notable that rotifers were more efficient than Artemia in absorbing dietary DHA but less so in incorporating AA, suggesting that rotifers may require a lower DHA/AA ratio in their enrichment than the Artemia, in order to supply sufficient levels of these fatty acids.

An additional consideration is the likelihood of DHA deficiency in vision and other neural tissues in larvae fed fish oil based diets, as has been observed in the larvae eyes of Atlantic halibut, Hippoglosus hippoglosus, even when fed Artemia enriched with DHA-fortified fish-oil. Using spray-dried mixes of different sources of algal meals and oils, this adjustment can be easily made to deliver optimal quantities and ratios or when a specific requirement may appear.

It is doubtful whether available fish oils would be able to satisfy these divergent DHA/EPA/AA needs of larvae and broodstock from the increasing number of farmed marine teleosts. Nonetheless, by using established and commercial fermentation techniques, lipids from heterotrophic algal groups, such as chrysophytes, cryptophytes and dinoflagellates, can produce high levels of EPA, DHA and AA (and therefore be combined to offer a broader range of fatty acids to meet species-specific dietary requirements). Examples include the algal species Schizochytrium sp and Crypthecodinium cohnii, which can produce high levels (up to 50%) of DHA, while the dried biomass from Nitzschia sp., Nanochloropsis, Navicula sp. can offer a rich source of EPA. Similarly, extracted oils from the heterotrophic fungi, Mortierella sp containing up to 54% AA, can be readily produced.

Another potential use of heterotrophic algal preparations, which could be highly useful in hatcheries of marine finfish, shrimp and oysters, is to partially substitute or supplement a live algae diet of the larvae. The value of live algae supplement to the culture medium of many marine larvae is well-established. However, live algae production is costly and inconsistent and may represents up to 30% of the cost of larval production. The partial or total replacement of living algal supplements using spray-dried heterotrophically-grown algal biomass therefore affords a major improvement in process economics of the appertaining aquaculture operation.

In sum, the heterotrophic, large-scale production of algal biomass represents a potential substitute for fish ingredients in aquaculture feeds. Specifically, algal whole cell preparations and algal and fungal oil extracts offer a superior alternative source for DHA, EPA and AA enrichment products in a wide variety of fish larval feeds and in broodstock diets. Current production levels of heterotrophic algae are insufficient to replace the worldwide use of fish byproducts in aquaculture. On the other hand, fishery is a dwindling resource that can vary in both quantity and quality, and where supplies and processing costs are likely to rise. There are therefore compelling reasons to resort to heterotrophic production as a cost-effective and stable source of marine type lipids in fish feeds and for the enrichment of live food in aquaculture operations.

While the invention has been illustratively described herein with reference to specific elements, features and embodiments, it will be recognized that the invention is not thus limited in structure or operation, but that the invention is to be broadly construed consistent with the disclosure herein, as comprehending variations, modifications and embodiments as will readily suggest themselves to those of ordinary skill in the art.

References

Abou-Samra, A. B., Catt, k. J. and Aguilera, G. 1986. Role of arachidonic acid in the regulation of adrenocorticotropin release from rat anterior pituitary cell cultures. Endocrinology 119:1427–1431.

Ainsworth, A. J., Dexiang, C. and Waterstrat, P. R. 1991. High physiological concentrations of cortisol in vivo can initiate phagocyte suppression. J. Aquat. Anim. Health 3:41–47.

Anderson, D. P. 1992. Immunostimulants, adjuvants and vaccine carriers in fish: applications to aquaculture. Annu. Rev. Fish Dis. 2:281–307.

Ando, H., Hasegawa, M., Ando, J. and Urano, A. 1999. Expression of salmon corticotropin-releasing hormone precursor gene in the preoptic nucleus in stressed rainbow trout. Gen. Comp. Endocrinol. 113:87–95.

Andrews, J. H. and Harris, R. F. 1986. r- and K-selection in microbial ecology. Adv. Microb. Ecol. 9:99–147.

Balm, P. H. M. 1997. Immune-endocrine interactions. In: Fish Stress and Health in Aquaculture Vol 62, pp. 195–221. Edited by G. K. Iwama, A. D. Pickering, J. P. Sumpter and C. B. Schreck. Cambridge University Press, Cambridge, UK.

Barry, T. P., Malison, J. A., Held, J. A. and Parrish, J. J. 1995. Ontogeny of the cortisol stress response in larval rainbow trout. Gen. Comp. Endocrinol. 97:57–65.

Barton, B. A. and Iwama, G. K. 1991. Physiological changes in fish from stress in aquaculture with emphasis on the response and effects of corticosteroids. Annu. Rev. Fish Dis. 1:3–26.

Bell, S. J., Chavali, S., Bistrian, B. R., Connolly, C. A., Utsunomiya, T. and Forse, R. A. 1996. Dietary fish oil and cytokine and eicosanoid production during human immunodeficiency virus infection. JPEN J Parenter Enteral Nutr 20:43–9.

Bemardini, R., Calogero, A. E., Mauceri, G. and Chrousos, G. P. 1990. Rat hypothalamic corticotropin-releasing hormone secretion in vitro is stimulated by interleukin-2 in an eicosanoid-dependent manner. Life Sci. 47:1601–1607.

Bernardini, R., Chiarenza, A., Calogero, A. E., Gold, P. W. and Chrousos, G. P. 1989. Arachidonic acid metabolites modulate rat hypothalamic corticotropin-releasing hormone secretion in vitro. Neuroendocrinology 50:708–715.

Blazer, V. S. 1992. Nutrition and disease resistance in fish. Annu. Rev. Fish Dis. 2:309–323.

Botham, J. W. and Manning, M. J. 1981. The histogenesis of the lymphoid organs in the carp (*Cyprinus carpio L.*) and the ontogenetic development of allograft reactivity. J. Fish Biol. 19:403–414.

Buschbeck, M., Ghomashchi, F., Gelb, M. H., Watson, S. P. and Borsch-Haubold, A. G. 1999. Stress stimuli increase calcium-induced arachidonic acid release through phosphorylation of cytosolic phospholipase $A_2$. Biochem. J. 344:359–366.

Calder, P. C. 1998. Immunoregulatory and anti-infammatory effects of n-3 polyunsaturated fatty acids. Braz. J. Med. Biol. Res. 31:467–490.

Calder, P. C., Bond, J. A., Harvey, D. J., Gordon, S. and Newsholme, E. A. 1990. Uptake and incorporation of saturated and unsaturated fatty acids into macrophage lipids and their effect upon macrophage adhesion and phagocytosis. Biochem. J. 269:807–14.

Cambronero, J. C., Rivas, F. J., Borrel, J. and Guaza, C. 1992. Role of arachidonic acid metabolism on corticotropin-releasing factor (CRF)-release induced by interleukin-1 from superfused rat hypothalami. J. Neuroimmunol. 39:57–66.

Castell, J. D., Bell, J. G., Tocher, D. R. and Sargent, J. R. 1994. Effects of purified diets containing different combinations of arachidonic and docosahexaenoic acids on survival, growth and fatty acid composition of juvenile turbot (*Scophthalmus maximus*). Aquaculture 128:315–333.

Chandra, R. K. 1988. Nutrition and Immunology. Contemporary Issues in Clinical Nutrition. Vol 11, pp. 342. Alan R. Liss, New York.

Christie, W. W. 1989. Gas Chromatography and Lipids: a practical guide. The Oily Press Ltd., Ayr, Scotland. 307 pp.

Clearwater, S. J. and Pankhurst, N. W. 1994. Reproductive biology and endocrinology of female red gurnard (*Chelidonichthys kumu*) from the Hauraki Gulf, New Zealand. Australian J. of Marine and Freshwater Res. 45:131–139.

Demers, N. D. and Bayne, C. J. 1997. The immediate effects of stress on hormones and plasma lysozyme in rainbow trout. Dev. Comp. Immunol. 21:363–373.

Dhabhar, F. S., Miller, A. H., McEwen, B. S. and Spencer, R. L. 1996. Stress-induced changes in blood leukocyte distribution. Role of adrenal steroid hormones. J. Immunol. 157:1638–1644.

Ellis, A. E. 1988. Ontogeny of the immune system in teleost fish. In: General principles of fish vaccination pp. 20–31. Edited by A. E. Ellis. Academic Press, New York.

Estevez, A., Ishikawa, M. and Kanazawa, A. 1997. effects of arachidonic acid on pigmentation and fatty acid composition of Japanese flounder (*Paralichthys olivaceus*). Aqua. Res. 28:279–289.

Estevez, A., McEvoy, L. A., Bell, J. G. and Sargent, J. R. 1999. Growth, survival, lipid composition and pigmentation of turbot (*Scophthalmus maximus*) larvae fed live-prey enriched in arachidonic and eicosapentaenoic acids. Aquaculture 180:321–343.

Farndale, B. M., Bell, J. G., Bruce, M. P., Bromage, N. R., Oyen, F., Zanuy, S. and Sargent, j. R. 1999. Dietary lipid composition affects blood leucocyte fatty acid compositions and plasma eicosanoid concentrations in European sea bass (*Dicentrarchus labrax*). Aquaculture 179:335–350.

Fletcher, T. C. 1997. Dietary effects on stress and health. In: Fish Stress and Health in Aquaculture Vol 62, pp. 223–246. Edited by G. K. Iwama, Pickering A. D., Sumpter J. P. and Schreck C. B. Cambridge University Press, Cambridge, UK.

Folch, J., Lees, M. and Stanley, G. H. S. 1957. A simple method for the isolation and purification of total lipids from animal tissues. Journal of Biological Chemistry 226:497–509.

Freas, W. and Grollman, S. 1980. Ionic and osmotic influences on prostaglandin release from the gill tissue of a marine bivalve (*Modiolus demissus*). J. Exp. Biol. 84:169–185.

Galli, C. and Marangoni, F. 1997. Recent advances in the biology of n-6 fatty acids. Nutrition 13:978–85.

Gapasin, R. S. J., Bombeo, R., Lavens, P., Sorgeloos, P. and Nelis, H. 1998. Enrichment of live food with essential fatty acids and vitamin C: effects on milkfish (*Chanos chanos*) larval performance. Aquaculture 162:3–4.

Harbige, L. S. 1998. Dietary n-6 and n-3 fatty acids in immunity and autoimmune disease. Proc. Nutr. Soc. 57:555–62.

Hardie, L. J., Fletcher, T. C. and Secombes, C. J. 1991. The effect of dietary vitamin C on the immune response of the Atlantic salmon (*Salmo salar L.*). Aquaculture 95:201–214.

Jeney, G. and Anderson, D. P. 1993a. Enhanced immune response and protection in rainbow trout to Aeromonas salmonicida bacterin following prior immersion in immunostimulants. Fish Shellfish Immunol. 3:51–58.

Jeney, G. and Anderson, D. P. 1993b. Glucan injection or bath exposure given alone or in combination with a bacterin enhance the none-specific defence mechanisms in rianbow trout (*Oncorhynchus mykiss*). Aquaculture 116:315–329.

Jeney, G., Galeotti, M., Volpatti, D., Jeney, Z. and Anderson, D. P. 1997. Prevention of stress in rainbow trout (*Oncorhynchus mykiss*) fed diets containing different doses of glucan. Aquaculture 154:1–15.

Johnston, P. V. 1985. Dietary fat, eicosanoids, and immunity. Adv. Lipid Res. 21:103–141.

Kanazawa, A. 1997. Effects of docosahexaenoic acid and phospholipids on stress tolerance of fish. Aquaculture 155:1–4.

Kang, L. T., Philips, T. M. and Vanderhoek, J. Y. 1999. Novel membrane target proteins for lipoxygenase-derived mono(S)hydroxy fatty acids. Biochim. Biophys. Acta. 1438:388–398.

Kelley, D. S., Taylor, P. C., Nelson, G. J., Schmidt, P. C., Ferretti, A., Erickson, K. L., Yu, R., Chandra, R. K. and Mackey, B. E. 1999. Docosahexaenoic acid ingestion inhibits natural killer cell activity and production of inflammatory mediators in young healthy men. Lipids 34:317–24.

Khalfoun, B., Thibault, F., Watier, H., Bardos, P. and Lebranchu, Y. 1997.

Docosahexaenoic and eicosapentaenoic acids inhibit in vitro human endothelial cell production of interleukin-6. Adv. Exp. Med. Biol. 400B:589–597.

Kiron, V., Fukuda, H., Takeuchi, T. and Watanabe, T. 1995. Essential fatty acid nutrition and defence mechanisms in rainbow trout (*Oncorhynchus mykiss*). Comp. Biochem. Physiol., A:361–367.

Kraul, S., Brittain, K., Cantrell, R., Nagao, T., Ako, H., Ogasawara, A. and Kitagawa, H. 1993. Nutritional factors affecting stress resistance in the larval mahimahi (*Coryphaena hippurus*). J. World Aquacult. Soc. 24:186–193.

Kuhn, E. R., Geris, K. L., van der Geyten, S., Mol, K. A. and Darras, V. M. 1998. Inhibition and activation of the thyroidal axis by the adrenal axis in vertebrates. Comp. Biochem. Physiol., A. 120:169–174.

Lall, S. P. and Bishop, F. J. 1979. Studies on the nutrient requirements of rainbow trout (*Salmo gairdneri*) grown in sea water and fresh water. In: Advances in Aquaculture pp. 580–584. Edited by T. V. R. Pillay and W. A. Dill. Fishing News Books, Farnham, England.

Leray, C., Chpelle, S., Duportail, G. and Florentz, A. 1984. Changes in fluidity and 22:6n-3 content in phospholipids of trout intestinal brush-border membrane as related to environmental salinity. Biochim. Biophysic. Acta. 778:233–238.

Mazeaud, M. M., Mazeaud, F. and Donaldson, E. D. 1994. Primary and secondary effects of stress in fish: some new data with a general review. Trans. Am. Fish. Soc. 106:201–212.

Maziere, C., Conte, M. A., Degonville, J., Ali, D. and Maziere, J. C. 1999. Cellular enrichment with polyunsaturated fatty acids induces an oxidative stress and activates the transcription factors API and NFkappaB. Biochem. Biophys. Res. Commun. 265:116–22.

Mazur, C. F. and Iwama, G. K. 1993. Handling and crowding stress reduces the number of plaque-forming cells in Atlantic salmon. J. Aquat. Anim. Health 5:98–101.

Mehta, R. S., Gunnett, C. A., Harris, S. R., Bunce, O. R. and Hartle, D. K. 1994. High fish oil diet increases oxidative stress potential in mammary gland of spontaneously hypertensive rats. Clin. Exp. Pharmacol. Physiol. 21:881–889.

Mills, D. E., Huang, Y. S., Narce, M. and Poisson, J. P. 1994. Psychosocial stress, catecholamines, and essential fatty acid metabolism in rats. Proc. Soc. Exp. Biol. Med. 205:56–61.

Montero, D., Tort, L., Izquierdo, M. S., Robaina, L. and Vergara, J. M. 1998. Depletion of serum alternative complement pathway activity in gilthead seabream caused by alpha-tocopherol and n-3 HUFA dietary deficiencies. Fish Physiol. Biochem. 18:399–407.

Mughal, M. S. and Manning, M. J. 1986. The immune system of juvenile thick-lipped grey mullet (*Chelon labrosus R.*): Antibody responses to soluble protein antigens. J. Fish Biol. 29:177–186.

Nakahishi, T. 1986. Ontogenetic development of the immune response in the marine teleost (*Sebastiscus marmoratus*). Bull. Jap. Soc. Sci. Fish. Nissuishi 52:473–477.

Noga, E. J., Kerby, J. H., King, W., Aucoin, D. P. and Giesbrecht, F. 1994. quantitative comparison of the stress response of striped bass (*Morone saxatilis*) and hybrid striped bass (Morone saxatilis X Morone chrysops and Morone saxatilis X Morone americana). Am. J. Vet. Res. 55:405–409.

Olivier, G., Eaton, C. A. and Campbell, N. 1986. Interaction between Aeromonas salmonicida and peritoneal macrophages of brook trout (*Salvelinus fontinalis*). Vet. Immunol. Immunopathol. 12:223–234.

Palmblad, J. E. 1987. Stress-related modulation of immunity: a review of human studies. Cancer. Detect. Prev. Suppl. 1:57–64.

Palombo, J. D., DeMichele, S. J., Boyce, P. J., Lydon, E. E., Liu, J. W., Huang, Y. S., Forse, R. A., Mizgerd, J. P. and Bistrian, B. R. 1999. Effect of short-term enteral feeding with eicosapentaenoic and gamma-linolenic acids on alveolar macrophage eicosanoid synthesis and bactericidal function in rats. Crit. Care. Med. 27:1908–15.

Pankhurst, N. W. and Sharples, D. F. 1992. Effects of capture and confinement on plasma cortisol concentrations in the snapper (*Pagrus auratus*). Australian J. of Marine and Freshwater Res. 43:345–356.

Pickering, A. D. and Pottinger, T. G. 1987. Crowding produces prolonged leucopenia in salmonid fish, despite interrenal acclimation. J. Fish Biol. 30:701–712.

Pickering, A. D. and Pottinger, T. G. 1989. Stress and disease resistance in salmonid fish: Effects of elevated plasma cortisol. Fish Physiol. Biochem. 7:253–258.

Raible, M. D. 1999. Color Atlas of Hematology: An Illustrated Field Guide Based on Proficiency. Arch. Pathol. Lab. Med. 123:748.

Rizzo, M. T., Leaver, A. H., Yu, W. M. and Kovacs, R. J. 1999. Arachidonic acid induces mobilization of calcium stores and c-jun gene expression: evidence that intracellular calcium release is associated with c-jun activation. Prostaglandins Leukot. Essent. Fatty Acids 60:187–198.

Rollins-Smith, L. A. 1998. Metamorphosis and the amphibian immune system. Immunol. Rev. 166:221–230.

Ruglys, M. P. 1985. The secondary immune response of young carp (*Cyprinus carpio* L.) following injection of cortisol. J. Fish Biol. 26:429–434.

Sargent, A., Bell, G., McEvoy, L., Tocher, D. and Estevez, A. 1999. Recent developments in the essential fatty acid nutrition of fish. Aquaculture 177:191–199.

Shin, E. A., Kim, K. H., Han, S. I., Ha, K. S., Kim, J. H., Kang, K. I., Kim, H. D. and Kang, H. S. 1999. Arachidonic acid induces the activation of the stress-activated protein kinase, membrane ruffling and $H_2O_2$ production via a small GTPase Racl. FEBS Lett. 452:355–9.

Skjermo, J., Defoort, T., Dehasque, M., Espevik, T., Olsen, Y., Skjaak-Break, G., Sorgeloos, P. and Vadstein, O. 1995. Immunostimulation of juvenile turbot (*Scuphthalmus maximus* L.) using an alginate with mannuramic acid content administrated via the live food organism Artemia. Fish Shellfish Immunol. 5:531–534.

Tatner, M. F. and Home, M. T. 1983. Susceptibility and immunity to vibrio anguillarum in post-hatching rainbow trout fry (*Salmo gairdneri* R.). Dev. Comp. Immunol. 7:465–472.

Thompson, I., White, A., Fletcher, T. C., Houlihan, D. F. and Secombes, C. J. 1993. The effect of stress on the immune response of Atlantic salmon (*Salmo salar* L.) fed diets containing different amounts of vitamin C. Aquaculture 114:1–18.

Thompson, K. D., Tatner, M. F. and Henderson, R. J. 1996. Effects of dietary (n-3) and (n-6) polyunsaturated fatty acid ratio on the immune response of Atlantic salmon (*Salmo salar* L.). Aquacult. Nutr. 2:21–31.

Tort, L., Gomez, E., Montero, D. and Sunyer, J. O. 1996. Serum haemolytic and agglutinating activity as indicators of fish immunocompetence: Their suitability in stress and dietary studies. Aquacult. Int. 4:31–41.

Tuncer, H. and Harrell, R. M. 1992. Essential fatty acid nutrition of larval striped bass (*Morone saxatilis*) and palmetto bass (*M. saxatilis x M. chrysops*). Aquaculture 101:1–2.

Uchida, K., Kaneko, T., Tagawa, M. and Hirano, T. 1998. localization of cortisol receptor in branchial chloride cells in chum salmon fry. Gen. Comp. Endo. 109:175–185.

Vadstein, O. 1996. The use of immunostimulation in marine larviculture: possibilities and challenges. Aquaculture 155:401–407.

Van Praag, D., Farber, S. J., Minkin, E. and Primor, N. 1987. Production of eicosanoids by the killifish gills and opercular epithelia and their effect on active transport of ions. Gen. Comp. Endocrinol. 67:50–57.

Watanabe, T. 1993. Importance of docosahexaenoic acid in marine larval fish. J. World Aquacult. Soc. 24:152–161.

Webster, C. D. and Lovell, R. T. 1990. Response of striped bass larvae fed brine shrimp from different sources containing different fatty acid compositions. Aquaculture 90:49–61.

We claim:

1. A method of using a culturing medium to enhance stress and defense mechanisms of fish larvae, comprising: administering to said larvae in the culturing medium a nutritional diet comprising docosahexaenoic acid (DHA) and arachidonacid (AA) in a DHA:AA ratio effective to enhance the stress and defense mechanisms of said fish larvae wherein the DHA and AA together comprise from about 10 to about 30% of total fatty acids in enrichment lipids, and wherein the dietary ratio of DHA:AA ranges from about 4 to about 0.75.

2. The method of claim 1, wherein said stress and defense mechanisms comprise at least one of the characteristics of stress resistance, immunoresistance, hyperosmotic stress resistance or pathogenic resistance.

3. The method of claim 1, wherein the stress and defense mechanisms comprise hyperosmotic stress resistance.

4. The method of claim 1, wherein the stress and defense mechanisms comprise pathogenic resistance.

5. The method of claim 1, wherein said ratio of DHA and AA, DHA:AA, is from about 0.75 to about 1.5.

6. The method of claim 1, wherein said fish larvae comprise larvae of a fish species selected from the group consisting of Morone chrysop and Morone saxatilis.

7. The method of claim 1, wherein said fish larvae comprise larvae of a fish species selected from the group consisting of seabream, sea bass, turbot, halibut and bass.

8. The method of claim 7, wherein said live feed comprises Artemia nauplii or rotifers.

9. The method of claim 1, wherein said diet comprises a single cell heterotroph or a product or component thereof containing DHA and AA.

10. The method of claim 1, wherein said nutritional diet comprises algal food.

11. The method of claim 1, wherein said nutritional diet comprises a single cell heterotroph material containing DHA and AA, and selected from the group consisting of intact cells, biomeal formed therefrom, triacylglycerols extracted therefrom, and phospholipids extracted therefrom.

12. The method of claim 1, wherein the nutritional diet comprises feed dosing said fish larvae with from about 11 to about 21.6 milligrams of DHA per gram of body weight of said fish larvae.

13. A method of increasing survival of fish larvae exposed to environmental stress, comprising administering to said larvae a nutritional diet comprising docosahexaenoic acid (DHA) and arachidonacid (AA) in a ratio DHA:AA effective to increase survival of larvae exposed to environmental stresses, wherein the ratio ranges from about 4 to about 0.75, and wherein the DHA and AA together comprise from about 10 to about 30% of total fatty acids in said diet.

14. A method of enhancing stress resistance and survival of fish larvae to hyperosmotic conditions, comprising administering to said larvae in a nutritional diet essential fatty acids comprising docosahexaenoic acid (DHA) and arachidonacid (AA) in a ratio effective to enhance stress resistance and survival of fish larvae to said hyperosmotic conditions, and wherein the ratio ranges from about 4 to about 0.75.

15. A method of enhancing stress resistance of fish larvae to a pathogenic infection, comprising administering to said larvae in a nutritional diet essential fatty acids comprising docosahexaenoic acid (DHA) and arachidonic acid (AA) in a ratio ranging from about 4 to about 0.75 to enhance stress resistance of fish larvae to pathogenic infection of less than 10 and effective to substantially increase blood count of monocytes and neutrophils in exposure to said microbial infection, relative to levels produced by said fish larvae in response to exposure to said pathogenic infection when the larvae is fed a corresponding nutritional diet lacking the effective ratio.

16. The method of claim 15, wherein said substantial increase is at least a two-fold increase.

* * * * *

UNITED STATES PATENT AND TRADEMARK OFFICE
CERTIFICATE OF CORRECTION

PATENT NO. : 7,067,145 B2
APPLICATION NO. : 09/949104
DATED : June 27, 2006
INVENTOR(S) : Allen R. Place et al.

It is certified that error appears in the above-identified patent and that said Letters Patent is hereby corrected as shown below:

In the References Cited: Other Publications section, page 1, second column, line 31, "secretion in vitro." should be -- secretion in vitro. Neuroendocrinology 50:708-715 --

In the References Cited: Other Publications section, page 2, second column, line 21, "Jeny" should be -- Jeney --

In the References Cited: Other Publications section, page 3, second column, line 61, "Gonález" should be -- González --

At column 1, lines 9-11, "VATYING DIETARY RATIOS OF ARACHIDONIC ACID ON LARVALTISSUE" should be --VARYING DIETARY RATIOS OF ARACHIDONIC ACID ON LARVAL TISSUE --

In column 1, line 35, "C and F" should be -- C and E --

In column 8, line 15, "unionized N-3" should be -- unionized $NH_3$--

In column 15, line 21, "$K^+$ -ATPasc" should be -- $K^+$ -ATPase --

In column 19, line 51, "0.1 g Nettler UMT2" should be -- 0.1 g (Nettler UMT2 --

In column 28, line 39, "(WC-CO)" should be -- (WC-Cl) --

In column 30, line 2, "drun-filter" should be -- drum-filter --

In column 39, line 47, "interleukin-2" should be -- interleukin-1 --

In column 39, line 50, the paragraph break should be removed.

In column 41, line 49, the paragraph break should be removed.

UNITED STATES PATENT AND TRADEMARK OFFICE
CERTIFICATE OF CORRECTION

PATENT NO. : 7,067,145 B2
APPLICATION NO. : 09/949104
DATED : June 27, 2006
INVENTOR(S) : Allen R. Place et al.

It is certified that error appears in the above-identified patent and that said Letters Patent is hereby corrected as shown below:

In column 43, lines 64-66 (claim 1), "administering to said larvae in the culturing medium a nutritional diet" should be -- administering live feed to said larvae in the culturing medium, wherein the live feed is fed a nutritional diet --

In column 44, lines 38-39 (claim 13), "administering to said larvae a nutritional diet" should be -- administering live feed to said larvae, wherein the live feed is fed a nutritional diet --

In column 44, line 47 (claim 14), administering to said larvae in a nutritional" should be -- administering to said larvae live feed, wherein the live feed is fed a nutritional --

In column 44, lines 54-55 (claim 15), "administering to said larvae in a nutritional diet essential" should be -- administering to said larvae live feed, wherein the live feed is fed a nutritional diet of essential --

Signed and Sealed this

Twelfth Day of December, 2006

JON W. DUDAS
*Director of the United States Patent and Trademark Office*